US008083592B2

(12) United States Patent
Wells

(10) Patent No.: US 8,083,592 B2
(45) Date of Patent: Dec. 27, 2011

(54) APPARATUS AND METHOD FOR RETROFITTING CANDLE DEVICES ON A GAMING MACHINE

(75) Inventor: William R. Wells, Carson City, NV (US)

(73) Assignee: Leap Forward Gaming, Reno, NV (US)

( * ) Notice: Subject to any disclaimer, the term of this patent is extended or adjusted under 35 U.S.C. 154(b) by 0 days.

(21) Appl. No.: 12/943,792

(22) Filed: Nov. 10, 2010

(65) Prior Publication Data

US 2011/0195786 A1 Aug. 11, 2011

Related U.S. Application Data

(60) Provisional application No. 61/303,106, filed on Feb. 10, 2010.

(51) Int. Cl.

*G06F 21/06* (2006.01)
*G06F 11/30* (2006.01)
*G06F 17/00* (2006.01)
*G06F 13/14* (2006.01)
*A63F 9/00* (2006.01)

(52) U.S. Cl. ................ 463/42; 463/46; 463/29; 463/25; 463/24

(58) Field of Classification Search .................... 463/46, 463/42

See application file for complete search history.

(56) References Cited

U.S. PATENT DOCUMENTS 5,091,713 A 2/1992 Horne et al.
5,531,309 A 7/1996 Kloss et al.
5,605,506 A * 2/1997 Hoorn et al. .................... 463/42
5,611,730 A 3/1997 Weiss
5,769,269 A 6/1998 Peters
5,844,808 A 12/1998 Konsmo et al.
5,908,354 A 6/1999 Okuniewicz
6,146,276 A 11/2000 Okuniewicz
6,286,756 B1 9/2001 Stinson et al.
6,379,246 B1 4/2002 Dabrowski
6,533,659 B2 3/2003 Seymour et al.
6,548,967 B1 4/2003 Dowling et al.
6,638,170 B1 10/2003 Crumby
6,846,238 B2 1/2005 Wells (Continued)

FOREIGN PATENT DOCUMENTS

EP 0 744 786 11/1996

(Continued)

OTHER PUBLICATIONS

U.S. Office Action mailed Sep. 6, 2011, from U.S. Appl. No. 12/943,798.

*Primary Examiner* — Dmitry Suhol
*Assistant Examiner* — Carl V Larsen
(74) *Attorney, Agent, or Firm* — Beyer Law Group LLP

(57) ABSTRACT

A gaming peripheral for a gaming machine is described. The gaming peripheral can be configured to emulate the functions of a lighting device, such as a candle. The gaming peripheral can be configured to provide enhanced gaming features such as 1) enhanced networking capabilities, 2) enhanced peripheral device monitoring and upgrade capabilities, 3) enhanced player monitoring and security capabilities 4) enhanced gaming function capabilities and 5) enhanced player reward capabilities. The enhanced gaming features can be provided in a non-intrusive manner such that regulated software executed on a gaming machine does not have to be altered.

34 Claims, 29 Drawing Sheets

U.S. PATENT DOCUMENTS

| | | | | |
|---|---|---|---|---|
| 6,897,624 | B2 | 5/2005 | Lys et al. | |
| 6,924,903 | B2 | 8/2005 | Brooks et al. | |
| 6,997,803 | B2 | 2/2006 | LeMay et al. | |
| 7,014,563 | B2 | 3/2006 | Stephan et al. | |
| 7,099,035 | B2 | 8/2006 | Brooks et al. | |
| D529,966 | S | 10/2006 | LeSourd et al. | |
| D536,389 | S | 2/2007 | LeSourd et al. | |
| D536,742 | S | 2/2007 | Kaminkow et al. | |
| 7,178,941 | B2 | 2/2007 | Roberge et al. | |
| 7,202,613 | B2 | 4/2007 | Morgan et al. | |
| 7,270,605 | B2 | 9/2007 | Russell et al. | |
| 7,290,072 | B2 | 10/2007 | Quraishi et al. | |
| 7,309,965 | B2 | 12/2007 | Dowling et al. | |
| 7,311,598 | B2 | 12/2007 | Kaminkow et al. | |
| 7,311,604 | B2 | 12/2007 | Kaminkow et al. | |
| 7,385,359 | B2 | 6/2008 | Dowling et al. | |
| 7,390,257 | B2 | 6/2008 | Paulsen et al. | |
| 7,442,125 | B2 | 10/2008 | Paulsen et al. | |
| 7,529,868 | B2 | 5/2009 | Brooks et al. | |
| 7,550,931 | B2 | 6/2009 | Lys et al. | |
| 7,641,554 | B2 | 1/2010 | Paulsen et al. | |
| 7,642,730 | B2 | 1/2010 | Dowling et al. | |
| 7,646,029 | B2 | 1/2010 | Mueller et al. | |
| 7,689,167 | B2 | 3/2010 | Sengupta et al. | |
| 7,704,147 | B2 | 4/2010 | Quraishi et al. | |
| 7,764,026 | B2 | 7/2010 | Dowling et al. | |
| 7,803,053 | B2 | 9/2010 | Atkinson | |
| 2001/0036866 | A1* | 11/2001 | Stockdale et al. | 463/42 |
| 2002/0016829 | A1 | 2/2002 | Defosse | |
| 2002/0115487 | A1 | 8/2002 | Wells | |
| 2002/0128932 | A1 | 9/2002 | Yung et al. | |
| 2003/0054880 | A1 | 3/2003 | Lam et al. | |
| 2003/0074106 | A1 | 4/2003 | Butler | |
| 2003/0081824 | A1* | 5/2003 | Mennie et al. | 382/135 |
| 2003/0109302 | A1 | 6/2003 | Rist | |
| 2003/0190958 | A1 | 10/2003 | Paulsen | |
| 2004/0043814 | A1 | 3/2004 | Angell et al. | |
| 2004/0082385 | A1 | 4/2004 | Silva et al. | |
| 2004/0132532 | A1* | 7/2004 | Brosnan et al. | 463/42 |
| 2004/0146975 | A1 | 7/2004 | Yaver et al. | |
| 2004/0153748 | A1 | 8/2004 | Fabrizi et al. | |
| 2004/0166917 | A1 | 8/2004 | Lam et al. | |
| 2004/0166932 | A1 | 8/2004 | Lam et al. | |
| 2004/0171423 | A1 | 9/2004 | Silva et al. | |
| 2004/0238319 | A1 | 12/2004 | Hand et al. | |
| 2004/0254006 | A1 | 12/2004 | Lam et al. | |
| 2004/0254013 | A1 | 12/2004 | Quraishi et al. | |
| 2005/0003890 | A1* | 1/2005 | Hedrick et al. | 463/29 |
| 2005/0041161 | A1 | 2/2005 | Dowling et al. | |
| 2005/0061605 | A1 | 3/2005 | Bell et al. | |
| 2005/0099824 | A1 | 5/2005 | Dowling et al. | |
| 2005/0159203 | A1 | 7/2005 | Bond et al. | |
| 2005/0216120 | A1 | 9/2005 | Rosenberg et al. | |
| 2005/0248299 | A1 | 11/2005 | Chemel et al. | |
| 2005/0261057 | A1 | 11/2005 | Bleich et al. | |
| 2005/0275626 | A1 | 12/2005 | Mueller et al. | |
| 2005/0277471 | A1 | 12/2005 | Russell et al. | |
| 2006/0046819 | A1* | 3/2006 | Nguyen et al. | 463/16 |
| 2006/0046849 | A1 | 3/2006 | Kovacs | |
| 2006/0073869 | A1 | 4/2006 | LeMay et al. | |
| 2006/0189391 | A1 | 8/2006 | Bird | |
| 2006/0217172 | A1 | 9/2006 | Roireau | |
| 2006/0178190 | A9 | 10/2006 | Okuniewicz | |
| 2006/0219777 | A1 | 10/2006 | Arora et al. | |
| 2006/0221386 | A1 | 10/2006 | Brooks et al. | |
| 2006/0287095 | A1* | 12/2006 | Mattice et al. | 463/42 |
| 2007/0010318 | A1 | 1/2007 | Rigsby et al. | |
| 2007/0021215 | A1 | 1/2007 | Russell et al. | |
| 2007/0111796 | A1 | 5/2007 | C. Giaimo, III et al. | |
| 2007/0119681 | A1 | 5/2007 | Blake et al. | |
| 2007/0123335 | A1 | 5/2007 | Okada | |
| 2007/0189026 | A1 | 8/2007 | Chemel et al. | |
| 2007/0243925 | A1 | 10/2007 | LeMay et al. | |
| 2007/0243934 | A1 | 10/2007 | Little et al. | |
| 2008/0020838 | A1* | 1/2008 | Slattery | 463/31 |
| 2008/0039972 | A1 | 2/2008 | Walker et al. | |
| 2008/0045345 | A1 | 2/2008 | Bird | |
| 2008/0076506 | A1 | 3/2008 | Nguyen et al. | |
| 2008/0113767 | A1 | 5/2008 | Nguyen et al. | |
| 2008/0215391 | A1 | 9/2008 | Dowling et al. | |
| 2008/0242408 | A1 | 10/2008 | Hwang | |
| 2008/0274795 | A1 | 11/2008 | Carpenter et al. | |
| 2008/0293494 | A1 | 11/2008 | Adiraju et al. | |
| 2008/0300046 | A1 | 12/2008 | Gagner et al. | |
| 2008/0313636 | A1 | 12/2008 | Goldstein et al. | |
| 2009/0029770 | A1 | 1/2009 | Nagano | |
| 2009/0082079 | A1 | 3/2009 | Kuhn et al. | |
| 2009/0094081 | A1* | 4/2009 | Wittern et al. | 705/7 |
| 2009/0137318 | A1 | 5/2009 | Russo et al. | |
| 2009/0138638 | A1 | 5/2009 | Russo et al. | |
| 2009/0172980 | A1 | 7/2009 | Heather et al. | |
| 2009/0174346 | A1 | 7/2009 | Hwang et al. | |
| 2009/0197673 | A1 | 8/2009 | Bone et al. | |
| 2009/0247281 | A1 | 10/2009 | Voutes | |
| 2009/0270159 | A1 | 10/2009 | Kato et al. | |
| 2009/0270167 | A1 | 10/2009 | Ajiro et al. | |
| 2010/0016073 | A1 | 1/2010 | Goldstein et al. | |
| 2010/0020546 | A1 | 1/2010 | Kukita | |
| 2010/0105454 | A1 | 4/2010 | Weber et al. | |
| 2010/0120518 | A1 | 5/2010 | Borissov et al. | |
| 2010/0124990 | A1 | 5/2010 | Crowder | |
| 2010/0127634 | A1 | 5/2010 | Dowling et al. | |
| 2010/0130278 | A1 | 5/2010 | Shimabukuro et al. | |
| 2010/0197404 | A1 | 8/2010 | Lum et al. | |
| 2010/0203961 | A1 | 8/2010 | Burke et al. | |
| 2010/0255902 | A1* | 10/2010 | Goldstein et al. | 463/29 |

FOREIGN PATENT DOCUMENTS

| | | |
|---|---|---|
| EP | 1 074 955 | 2/2001 |
| EP | 2 009 602 | 12/2008 |
| JP | 56168275 | 12/1981 |
| WO | WO 97/27576 | 7/1997 |
| WO | WO 2007/146316 | 12/2007 |

* cited by examiner

APPARATUS AND METHOD FOR RETROFITTING CANDLE DEVICES ON A GAMING MACHINE

CROSS REFERENCE TO RELATED APPLICATIONS

This patent application claims priority under 35 U.S.C. §119(e) to U.S. Provisional Patent Application Ser. No. 61/303,106 entitled "GAMING DEVICE AND METHOD FOR WIRELESS GAMING SYSTEM PROVIDING NON-INTRUSIVE PROCESSES" by Wells, filed Feb. 10, 2010 which is incorporated by reference in its entirety for all purposes.

This patent application is related to and incorporates by reference in their entireties for all purposes the following co-pending patent applications filed concurrently herewith:

(i) U.S. patent application Ser. No. 12/943,789 entitled "GAMING DEVICE AND METHOD FOR WIRELESS GAMING SYSTEM PROVIDING NON-INTRUSIVE PROCESSES" by Wells;

(ii) U.S. patent application Ser. No. 12/943,797 entitled "CANDLE DEVICES FOR GAMING MACHINES" by Wells;

(iii) U.S. patent application Ser. No. 12/943,798 entitled "DEVICE HEALTH MONITORING FOR GAMING MACHINES" by Wells;

(iv) U.S. patent application Ser. No. 12/943,802 entitled "DEVICE MONITORING AND WIRELESS COMMUNICATIONS FOR VENDING MACHINES" by Wells.

BACKGROUND

1. Field of the Invention

The invention relates to gaming devices and in particular to candle devices that provide communication capabilities and enhanced gaming functions on a gaming machine.

2. Description of the Related Art

Casinos derive most of their revenue from gaming machines such as mechanical and video slots and table games such as poker and twenty-one. Three important factors to casino operators related to providing these games are: 1) minimizing operating costs, 2) responding to the desires of players, their customers, which are constantly shifting and 3) providing a secure and honest gaming experience. Minimizing operating costs involves factors, such as minimizing the labor and maintenance costs associated with providing a game at a gaming machine or at a table. Responding to the desires of players involves factors, such as changing games on a gaming machine, providing new types of games, rearranging a layout and distribution of gaming machines and/or table games on a casino floor and providing player incentives via casino-sponsored loyalty programs. Finally, providing a secure and honest gaming experience involves such factors as providing tamper-proof gaming software and secure gaming platforms that meet regulatory requirements and providing security monitoring systems that help deter theft and other potential crimes.

The factors described above are reflected in the history of technology development associated with the gaming industry. For example, casino monitoring systems were introduced to minimize costs associated with gathering accounting data from gaming machines. Until the advent of casino monitoring systems the accounting of coin-in, coin-out, and other data associated with each machine was done manually. The introduction of casino monitoring systems provided the means for a casino operator to gather this data electronically using a communication network. This reduced the cost for the casino by reducing the expense of the manual data gathering associated with each gaming machine.

Another example of a technological advance that reduced operating costs is a Ticket-in, Ticket-out (TITO) system or cashless system. A TITO equipped gaming machine prints out a bar-coded slip of paper (ticket), which can then either be redeemed for cash, or inserted for play into other TITO equipped gaming machines. The machines utilize a barcode scanner built into the bill validator on the machine to accept and evaluate the ticket and a ticket printer to print the ticket. A network interface communicates with the TITO gaming system to track these tickets. This advance reduced labor costs associated with adding, removing, transporting and counting coins as well as damage to gaming machines, such as electrical shorts, resulting from coin dust. Coin dust also turned player's hand black which was undesirable.

A few examples of technological advances related to responding to player desires is the advent of link progressive games, wide area progressive games and player tracking systems. Link progressive gaming machines are linked together by a network. The progressive jackpot is funded by taking a percentage of all the money played into each of the linked gaming machines as a group. The jackpot continues to grow until a player wins this jackpot by a randomly selected combination of jackpot symbols. Typically, gaming machines in a linked progressive reside at one location, such as a single casino. The WAP system is similar to the link progressive, but the network allows multiple machines in multiple locations to communicate to a common server. WAP systems allow jackpots to grow to potentially large amounts due to the large number of players playing these games statewide or in multiple locations. For example, WAP jackpots can range in value from hundreds of thousands of dollars to millions of dollars. Player's tend to like link progressive games and WAP games because of the potential for larger jackpots that are afforded by these systems.

Player tracking systems allow a casino to reward players based on their assessed value to a casino. These rewards, desirable by players, have been found to increase player loyalty including repeat business by rewarded customers. Before the use of the player tracking system, casino operators used a manual method requiring casino employees to recognize returning and highly valuable players. The casino floor managers would write down the coin-in and play information and would reward those players with high play with a free room, food, etc. The player-tracking system provides the means of tracking this information electronically using a network. A casino player enrolling receives player card which has magnetic or punched ID number. The player inserts the card into a card reader provided on each machine. Once the card is inserted and read, the gaming machine automatically sends the ID information and all play data associated with the player to a server, which allows a player's value to be quickly assessed and rewards for the player to be easily determined.

To provide a secure gaming experience, gaming machines and table games include security measures, such as locked cabinets for securing resources that may be targets of theft or tampering, such as deposited money or gaming software. Further, external security systems, such as camera systems are provided for monitoring employee and player behavior including detecting illegal actions. To ensure an honest gaming experience, gaming machines tend to be highly regulated. For instance, gaming software and hardware associated with determining an outcome of game and dispensing money from a gaming machine can undergo a regulatory approval process that takes up to a year before the gaming software or hardware can be utilized in the field, such as on a casino floor. Further, after deployment, regulator approved gaming software and hardware are secured and monitored in a gaming device such that changes or modifications are readily detectable.

The technological advances, described above, each viewed in isolation, have contributed to minimizing operating costs, responding to the desires of players and providing a secure and honest gaming experience. However, these advances viewed as a whole have also created problems. Currently, gaming machines on a casino floor can be connected to many different and separately maintained networks. For instance, a single gaming machine on a casino floor, which may include thousands of gaming machines, can be connected via wired connections to separate WAP, player tracking, link progressive and TITO networks. Maintaining many different networks and their associated infrastructure can be quite costly. Further, reconfiguring the network, such as to change the layout of the casino floor to respond to shifting player desires, can also be very time consuming and labor intensive.

As a result of imposed security and regulatory requirements, it is fairly difficult to tamper with gaming machines in a way that would cheat a player. Thus, the player can be ensured of an honest gaming experience. However, the long lead times associated with obtaining necessary regulatory approvals and the technologies that make altering or tampering with gaming software difficult also make it difficult and cost prohibitive to change the functionality of a gaming machine via changing the regulated game software. Thus, in view of the above, apparatus and method are desired that reduce the cost, time and effort associated with an altering an existing gaming environment and introducing new gaming features into the gaming environment.

SUMMARY

Broadly speaking, the embodiments disclosed herein describe relate to providing enhanced gaming functionality to wagered-based gaming devices, such as but not limited to mechanical slot reel or video slot machines. In particular, the embodiments can be used on gaming devices that execute regulated gaming software to control a play of a wager-based game on the gaming device. The enhanced gaming functionality can include 1) enhanced networking capabilities, such as wireless communications and communication multiplexing, 2) enhanced peripheral device monitoring and upgrade capabilities, such as bill validator and printer health monitoring, firmware and software upgrades for various controllers located on the wager-based device, an ability to add and control new devices and custom ticket printing, 3) enhanced player monitoring and security capabilities, such as camera surveillance tied to fraud detection alerts or attract mode functions, 4) enhanced gaming function capabilities, such as providing opportunities for player participation in secondary or group games, and 5) enhanced player reward capabilities, such as printing reward tickets associated with game play or other promotional opportunities implemented by a gaming operator or approved third parties.

As described above, apparatus and method for providing the enhanced gaming function capabilities can be implemented on gaming devices and utilized in gaming systems including servers that communicate with the gaming devices. Gaming devices, such as gaming machines that provide wager-based games and servers that communicate with the gaming machines execute regulated gaming software. Regulated gaming software often requires a lead time of up to a year to allow for approval by a regulating entity, such as a government agency associated with a particular gaming jurisdiction. After approval and deployment to the field (e.g., casinos, sports book, race tracks, bingo parlors, bars and other gaming venues), any changes to the regulated gaming software, even minor changes, can require the gaming software to be resubmitted to the regulating entity, which is costly and time consuming. Further, by the time it is completed the game may have fallen out of favor with players. Therefore, in most instances, once gaming software is deployed to the field, it is not modified. Thus, the functions provided by the regulated gaming software, such as 1) what peripheral devices are supported, 2) what interactions between the supported peripheral devices and the game controller are provided, 3) how the game controller communicates with internal and external devices and 4) what game play features are generated remained fixed.

Recognizing that the gaming software utilized by a game controller on a wager-based gaming device will likely remain fixed once it is deployed, the apparatus and methods for providing enhanced gaming functionality described herein can be implemented on new gaming devices to provide a planned pathway for upgrading and changing a gaming machine's capabilities after it leaves the factory and is deployed to the field. For already deployed gaming devices, the apparatus and methods described herein can be implemented as part of a retrofit process. In the retrofit process, additional hardware can be added to a gaming device and/or existing hardware on the gaming device can be replaced. Then, the gaming device can be re-wired to include the new and/or replaced hardware.

The installation process can involve changing existing communication paths or adding new communication paths within the gaming machine. The changes to the communication paths can allow new gaming functions to be implemented. In particular embodiments, the retrofit can be implemented in a non-intrusive manner such that the regulated gaming software on the gaming device and/or associated gaming system servers does not have to be modified in any manner. This process avoids having to submit regulated gaming software executed on these gaming devices for re-approval.

In one embodiment, the apparatus and methods for providing enhanced gaming functionality can be implemented as part of a candle device. On a reel or video slot machine, the candle device is a lighting device that typically sits on top of the cabinet of the gaming machine. Traditionally, the candle device has been configured to provide visual alerts that indicate some operator intervention is needed at the gaming machine. For instance, the visual alerts can be generated in response to an award of a jackpot requiring a hand pay or a malfunction on the gaming machine. The candles devices described herein can be configured to provide traditional candle functions, i.e., visual indicators linked to events associated with a gaming device. Further, the candle devices can be used to provide enhanced gaming functionality.

In one aspect, the candles can be used in a retrofit process. In the retrofit process, an existing candle on a gaming device can be replaced with a candle device described herein to provide various enhanced gaming functions to a gaming device, such as a gaming machine. The retrofit process can involve establishing a number of new communication pathways. The new communication pathways can be between a game controller and a candle controller located on the candle. Further, the new communication pathways can be between one or more gaming machine peripherals and the candle controller. The new communication pathways can be implemented via wired and/or wireless connections and associated interfaces. After installation, the candle device can be configured to utilize legacy communication and power connections previously utilized by the replaced candle and emulate its legacy candle functions. Further, the candle can be configured to gather, process and/or transmit information from the game controller and gaming machine peripherals in a manner not possible prior to the retrofit.

In one embodiment, a candle device with an integrated assembly, that looks, fits and operates similar to a traditional gaming machine candle, is provided. The gaming machine candle can also be referred to as a tower. Internally, the candle can contain multiple software and hardware modules for providing one or more of (1) a wireless interface between the gaming machine and existing casino and/or lottery systems, (2) control of lights and graphical images, such as animations displayed on external surfaces of the candle, (3) control of the generation of sound effects via a speaker coupled to the candle, (4) communication within a game controller and one or more peripherals internal to the gaming machine including possible control of the one or more peripherals, (5) event monitoring and notification including security alerts, (6) attract and bonus mode features using peripherals that only receive commands from the candle controller and/or peripherals associated with gaming device that also receive commands from the game controller, (7) device emulation, (8) power conditioning and (9) extra power and/or communication interfaces. The device emulation, power conditioning and extra power and/or communication interfaces can be used to add new peripherals device to the gaming machine and re-configure power and/or data pathways on the gaming machine.

The candle can be configured to generate the enhanced gaming capabilities, described above, such that it is non-intrusive to the gaming machine's game and/or gaming system's regulated software. The software and hardware module can be provided on one or more separate PCBs disposed within the candle. In one embodiment, the PCB design can be modular such that different combinations of the functions can be provided using different combinations of modular boards.

In a particular embodiment, a number of the modular boards can be located in a cap of the candle. The modular boards can be formed from shaped PCBs, such as circular PCBs, to utilize the form factor associated with the candle. The modular boards can be provided in a standard size (e.g., a standard diameter) and used in candles with different cap and cylinder diameters. The modular boards can be packaged separately from a candle to allow the functionality described with respect to the candle embodiment to be provided without having to install a candle. For instance, one or more of the modular boards can be packaged together and installed in an interior portion of a gaming device, such as a table top gaming device. Then, the one or more boards can be connected to one or more peripherals and/or the game controller. In another example, the one or more modular boards can be installed on an exterior portion of the gaming device or even separately from the gaming device and then configured to communicate with the one or more peripherals and/or the game controller. Then, the one or more modular boards can be used to provide the enhanced gaming functionality described herein.

The candle devices can include power and data connectors compatible with candle power and data connectors provided on various models of gaming machines. Further, the candle device can include additional power and data connections that allow additional peripheral devices to be coupled to the gaming machine via the candle. Also, the candle data connections can be utilized to reconfigure one or more communication pathways on the gaming machines by adding or rerouting existing communication pathways on the gaming machine. In a new gaming machine, the candle power and data connections can provide a pathway for future upgrades to the gaming machine. In an existing gaming machine to which the candle device can be retrofit, the candle power and data connections can provide an immediate pathway for enhancing the functions of the gaming machine.

In another aspect, the gaming devices, such as the candle devices described herein, can be used to provide non-intrusive mechanisms for connecting a gaming device, such as gaming machine, with existing gaming systems. In the case of an existing gaming system, a communication connection, such as a wireless communication connection, can be implemented in a non-intrusive way via the candle device so that the gaming system software does not have to be altered. Further, the via the candle device, new communication pathways between the gaming device and remote devices can be established. For instance, a new communication pathway can be established between the gaming device and one or more back-room servers.

In particular embodiments, to provide additional gaming functions, the candle can be configured to intercept and modify communications to and from a game controller. For instance, the candle can be configured to intercept a command from a game controller to a coin hopper to dispense coins and instead generate a command to a printer to print out a ticket instead for the amount of coins to be dispensed. The candle can be configured to emulate the coin hopper so that a correct response, one that is expected by the game controller, is properly generated. Thus, the regulated gaming software on the game controller does not have to be modified. From, the point of view of the game controller a hopper command is being implemented. This method can be applied to many different commands issued by a game controller.

Via a back-room server, an operator can send commands to individual candles or groups of candles to provide various functions, such as but not limited to 1) controlling lights, colors, sound, graphical images and animation on the candle device or on another peripheral device associated with the gaming machine; 2) generating an attract sequence combining audio and images; 3) printing a promotional ticket for the player via printer located on the gaming machine; 4) requesting a peripheral device, such as the bill acceptor or printer in a certain gaming machine to send selected data, such as data used to determine a maintenance schedule for the printer or bill validator or data used to settle a dispute; or 5) outputting video data on the gaming machine's monitor or a second display associated with the gaming machine. In one embodiment, groups of candles can be controlled in a coordinate manner. For instance, a group of candles can be configured to generate a lighting pattern or a sound effect that is not possible just controlling an individual candle.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

Figure 1:
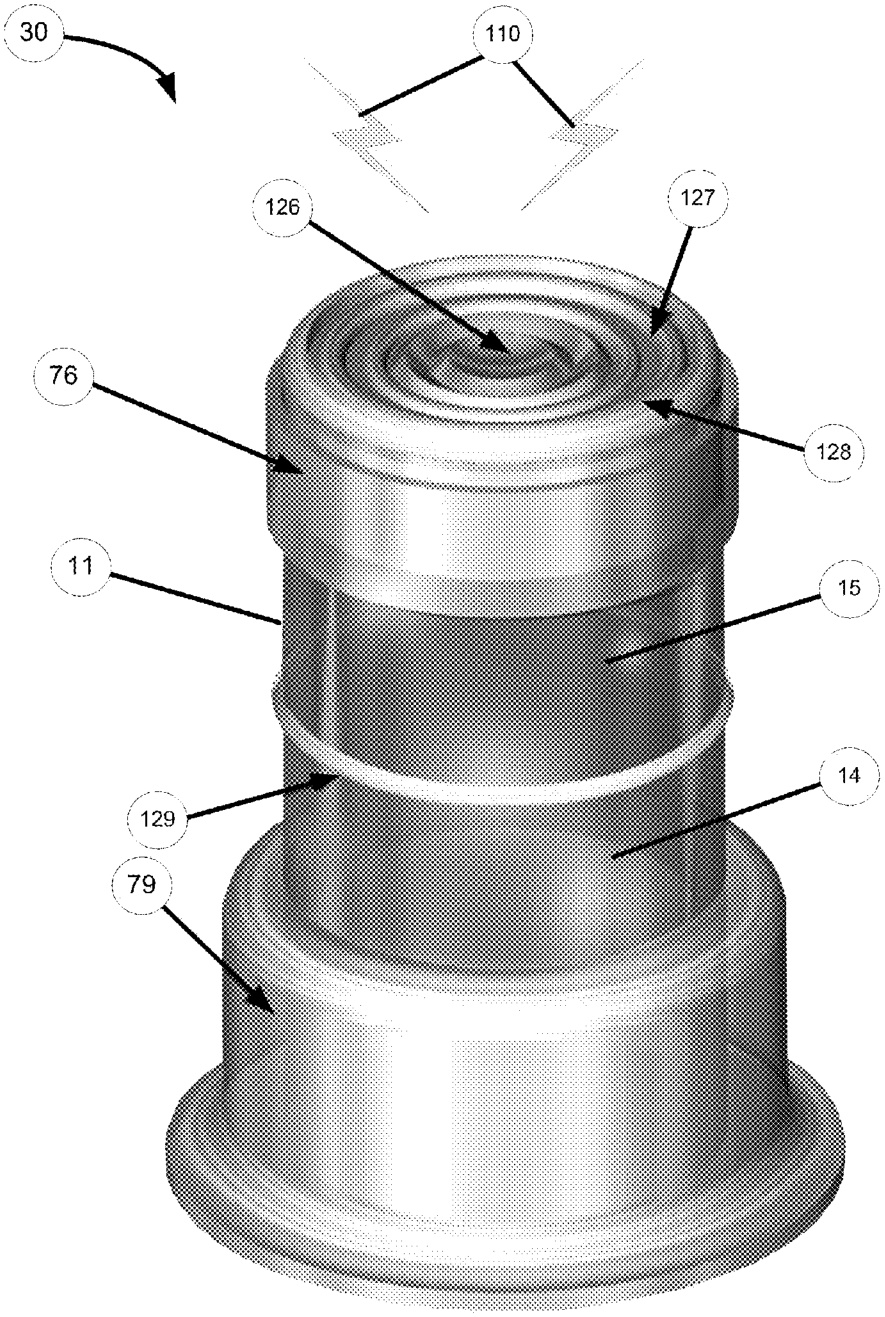
FIG. 1 is a perspective drawing of a candle in accordance with the described embodiments.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Player assistance and security events in a gaming establishment such as a casino or lottery location are very important to casino operators. Player jackpot confirmation, player requiring change, machine door openings, and machine failures are a few examples of important events that can require a response by a casino operator. In the gaming industry, a candle has been used to provide a visual indicator that may identify certain occurrences or servicing needs of that particular gaming machine, such as the player assistance and security events. On a gaming machine, it is often mounted on a top surface of the gaming cabinet so that it is easily visible. At a table game, it can be mounted on a pole to increase its visibility.

Traditional candles generally have an incandescent light bulb surrounded by a clear or translucent cylindrical shell. Inserted within the shell is generally a colored Mylar insert or colored plastic film. The candle is usually divided into a number of stages where each stage of the candle has a different colored film in order to provide the transmission of each particular color at each stage. Such arrangements have the disadvantage that if the colors of the candle ever need to be changed it may be a difficult and time consuming operation. For instance, if a gaming machine is moved from a first gaming jurisdiction to a different gaming jurisdiction with different candle requirements, such as different number of required stages and/or stage colors, then the candle may have to be replaced. Further, using traditional designs, many different candle models need to be provided to account for different candles requirements in different gaming jurisdictions.

Apparatus and method are described herein related to candles that can be easier to reconfigure than traditional candles. For instance, a single candle device can be configured to allow it be configured with a different number of stages and different stage colors. Thus, it may be possible to use a single candle design for many different gaming jurisdictions. Further, the candles devices described herein can include display capabilities that allow more detailed information to be displayed, such as textual and audio messages that are not possible with traditional candle designs. The display and audio capabilities can also be used to implement attract and bonus mode features not afforded by traditional candle designs. Embodiments of candle devices with these features are described in more detail primarily with respect to FIGS. 1-8, 10-11B and 16.

Casino operators are always looking for ways to improve the player experience. For example, casino operators periodically move their various gaming machines to new locations within their establishments. This is to improve player appeal and casino revenue. Unfortunately, such moves can be difficult, time consuming, and expensive. This is particularly true for casinos in which the gaming machines are connected to multiple gaming systems. In such cases, many or all of the wire connections among the machines must be pulled out and replaced during each move. In fact, reconfiguring the wires is often the most expensive part of a move.

Apparatus and method are describe herein related to wireless communications between a gaming machine and/or one or more gaming systems, such as player tracking systems, link progressive systems, wide area progressive systems and cashless systems. The wireless communications can be implemented in a manner that greatly simplifies the network infrastructure needed to maintain a network linking a large number of gaming machines in a casino environment. Further, apparatus and method for wireless communications can greatly reduces the costs and labors associated with rearranging gaming machines on a casino floor. In one embodiment, the apparatus and method can be implemented as part of a candle device but can also be implemented separately from a candle device. Examples of a candle device with wireless communication capabilities are described primarily with respect FIGS. 1-4. Examples of wireless communications and control are described primarily with respect to FIGS. 8, 9, 12-15B.

Value input devices, such as bill/ticket acceptors and value output devices, such as printers and coin hoppers, are critical devices on gaming platforms. The profitable operation of a gaming platform depends on keeping the value input and output devices in a good working condition. With respect to FIGS. 16A-16B, apparatus and method are described that can be used to improve the maintainability of these devices.

A problem with existing gaming machines is limited upgrade capability once the gaming machine leaves the factory. The upgrade capability is limited because features allowing upgrades are not incorporated into the original design. Further, upgrades are difficult because game controllers use regulated gaming software that is too costly and time consuming to modify to allow for upgrades. Methods and apparatus are described herein that can be used to establish an upgrade pathway allowing for enhanced gaming features to be added to a gaming machine over time. The methods and apparatus can be installed in a new gaming machine or applied to a gaming machine deployed in the field as part of a retrofit process. The methods and apparatus can be used to reconfigure a gaming machine with new devices, communications pathways and power connections. The new devices, communication pathways and power connections can be used to provide new gaming features and opportunities for peripheral device monitoring not afforded in traditional gaming machines. Apparatus and method related to gaming machine reconfiguration are primarily described with respect to FIGS. 5A and 5B, 8 and 17-22.

The apparatus and method described herein can be utilized with non-gaming platforms, such as vending platforms. Further, the apparatus and method in a gaming or non-gaming environment can be embodied with a form factor different from a traditional gaming candle. Embodiments related to non-gaming applications and configurations that differ from traditional gaming candles are described with respect to FIGS. 23-24B.

These and other embodiments are discussed below with reference to FIGS. 1-22. Nevertheless, those skilled in the art will readily appreciate that the detailed description given herein with respect to these figures is for explanatory purposes only and should not be construed as limiting. In particular, candle embodiments including internal and external perspective drawings of a candle are described in a section "Candle Embodiments," which includes descriptions of FIGS. 1-6A. Control and gaming functions provided by the gaming devices described are described with in the section "Gaming Device Control and Operation," which includes descriptions of FIGS. 7-15B. For instance, an embodiment of a candle controller is described in detail with respect to FIGS. 7-12 in this section. In the section entitled, "Gaming Machine Reconfiguration including Retrofitting," which includes FIGS. 17-22, methods and apparatus for implementing new communication and data pathways are described. These methods and apparatus can be applied as part of a retrofit process or an upgrade process on a gaming machine. For example, some of the communication pathways that can be implemented are described in detail with respect to FIGS. 21A-21K.

Candle Embodiments

FIG. 1 is a perspective drawing of a candle 30 in accordance with the described embodiments. The candle 30 includes a cap 76 that fits over a clear cylindrical shell 11. The shell 11 fits into a base 79. In a particular embodiment, the cap 76, shell 11 and base can be formed from a polycarbonate plastic. The cap 76 and base 79 can be metalized to provide a metal sheen if desired. In other embodiments, the cap and base can be formed from other materials, such as a metal.

The base 79 can include a mounting plate (not shown) that allows the candle 30 to be attached to a surface, such as a surface of gaming cabinet on a gaming machine. The gaming cabinet typically includes one or more apertures for passing a wiring bundle, including power and/or data connections for the candle 30, through an exterior surface of the gaming cabinet (e.g., see FIG. 18). In some embodiments, one or more of the power and/or data connections can be implemented wirelessly and the candle 30 can include power and/or data interfaces that allow power and/or data to be transmitted wirelessly from an interior of a gaming cabinet. If all of the power and/or data connections to and from the candle 30 are implemented wirelessly, then it may be possible to eliminate the wiring bundle and the one or more apertures in the cabinet for the wiring bundle.

Typically, a candle 30 is installed on a horizontal top surface of a gaming cabinet for visibility purposes. It can also be mounted on a pole when it is located near a gaming table. The pole can be coupled to a surface associated with the gaming table. In particular embodiments, the candle 30 can be configured to be installed on a slanted surface if desired. For instance, the base 79 and/or a bottom portion of the shell 11 can be sloped to match a slope of a slanted surface on which it is installed to allow the candle to be installed in a vertical position. In yet another embodiment, the base 79 can include a curved portion (e.g., an elbow that turns through an angle) such that the bottom of the base 79 is at an angle relative to the top surface of cap 76. For instance, the curved portion can turn through a 90 degree angle, such that the bottom of the base is at a right angle relative to the top surface. This configuration can be utilized to mount the candle to a vertical surface, such as the side of a gaming cabinet. It could also be used to mount the candle to a slanted surface.

In one embodiment, one or more divider rings, such as 129, can be placed over the cylindrical shell 11 to divide the shell into a number of stages. For instance, a single divider ring 129 can be used to form a two-stage candle including an upper stage 15 and a lower stage 14. More divider rings can be used to form candles with more stages (e.g., see FIG. 5B, which shows a four stage candle including 3 divider rings). Gaming machine candles, depending on the jurisdictional requirements, typically have 1 to 4 stages.

In other embodiments, a visual indicator can be used in lieu of a mechanical divider ring. For instance, one or more display devices can be used to generate a visible ring around the circumference of the cylindrical shell 11. The visible ring can serve as visual indication of a divide between two stages. The location of the visible ring and the number of visible rings can be varied to provide candles, such as 30, with a different number of stages. In yet other embodiments, a combination of mechanical divider rings, such as 129, and displayed divider rings can be used.

Figure 2A:
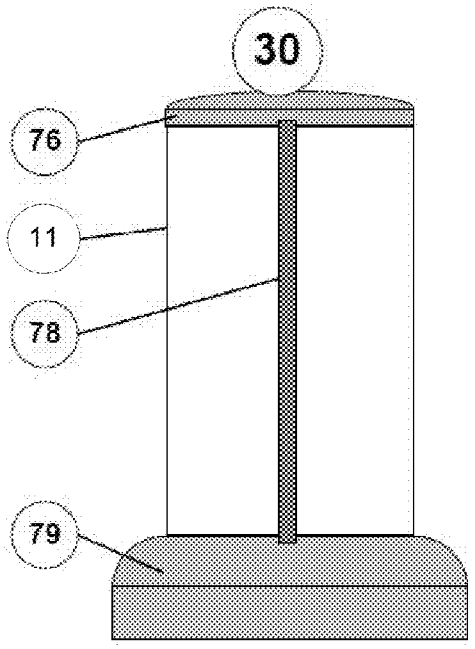
FIG. 2A is a diagram that illustrates a location of a PCB inside a candle in accordance with the described embodiments.

FIG. 2A is a side view of an external housing of a candle 30 with the display rings, such as 129 shown in FIG. 2A removed for ease of an interior view. The candle 30 includes a base 79 adapted to be mounted to a gaming machine. The base 79 can be adapted to fit a transparent (or translucent) cylindrical sleeve 11. As describe above, a number of lighting elements can be arranged to fit within the sleeve 11.

Figure 2B:
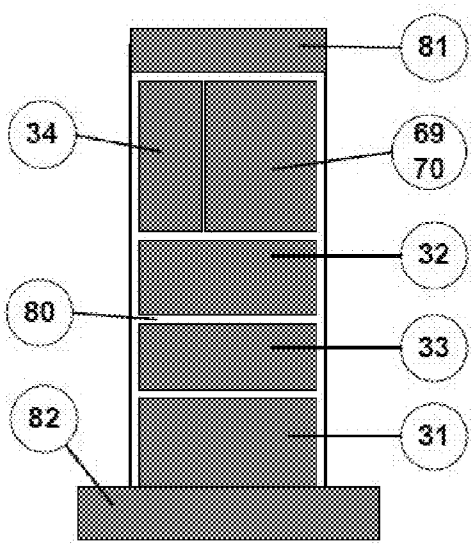
FIG. 2B is a diagram that illustrates the location of various modules on the PCB in accordance with the described embodiments.

In one embodiment, a rectangular PCB assembly 78 can be sized to fit along a bisecting plane of the cylindrical sleeve 11 as shown in FIGS. 2A and 2B. The cylindrical sleeve can provide security and environmental protection for the Printed Circuit Board (PCB) assembly 78 and any lighting elements that are mounted inside it. In another embodiment, which is described with respect to FIGS. 3 and 4, a number of shaped PCBs, such as circular PCBs, can be stacked along a center axis of the cylindrical sleeve. The shaped PCBs can provide functions associated with PCB 78. In various embodiments, one or more PCBs can be distributed in various locations and orientations within the candle 30, such as within the cap 76, the base 79 and within the cylindrical sleeve 11 to provide the functions associated with a candle that are described herein.

The cap 76 is adapted to fit the cylindrical sleeve and the PCB assembly at the top. In FIG. 2A, an upper surface of the cap 76 is shown as a solid surface. In other embodiments, the upper surface of the cap 76 can be constructed from a rigid or semi-rigid material. The upper surface can include apertures that allow an internally mounted audio device to emit sound. The rigid or semi-rigid material can help protect the audio device and any other components mounted within the cap 76 from environmental damage.

In another embodiment, a thickness of the cap 76 (i.e., vertical height) can be increased to allow additional components, such as PCB boards to be mounted within the cap. In yet another embodiment, devices, such as a speaker and/or an antenna can be mounted to the cap 76 such that a portion of the devices forms an upper surface of the cap. A few examples of candle embodiments including these features are described with respect to FIGS. 3 and 4.

In one embodiment, a number of electronic components can be located inside the cap 76 and/or integrally formed with the cap 76. For example, a speaker assembly is used to form a top surface of the cap 76 or can be placed on top of the cap 76. The speaker assembly includes a high-frequency component 126 and a bass radiator 128. The drivers for the speaker module can be located within the cap 76 (see FIGS. 3A-4).

An antenna 127, which can be used to send wireless communications 110 to other remote devices, is located on an external surface of the speaker assembly. In one embodiment, the antenna 127 can be integrally formed with the speaker module. For instance, the antenna 127 can be integrated into the structural support for the speaker module or can be integrated into one of the speaker components, such as around the cone for high-frequency component 127. In other embodiments, the antenna can be located separately from the speaker assembly in another location in the candle or even mounted separately from the candle. Details of other electronic components that can be located in the cap 76 and/or placed at other locations within the candle 30 as well as candle component configurations are described in more detail with respect to FIGS. 2A-5.

FIG. 2B is the front view of the PCB Assembly 78. In this embodiment the bottom section 82 may house the EMC (electromagnetic compatibility) connector and control, the power supply, battery backup and speaker components. The EMC can be related to electrostatic shock resistance associated with the device. The device can be configured to resist a shock voltage of up to 25,000 V. Towards this end, a number of plastic parts within the candle 30, such as plastic parts, may be coated with a metallic finish for grounding purposes.

The PCB 78 also includes a candle control 31, an attract mode control 33, a light control 32, wireless control 32, and the RF antennas 69 and 70. In one embodiment, the top section 81 can house attract mode control components such as but not limited to IR sensors, a camera and audio related components. The arrangement of components and the described functionality are provided for the purposes of illustration only.

The battery backup can allow security related data and other important gathered data from peripherals that is being handled and processed by the candle 30 to be preserved in the event of a power-failure or power interruption. For instance, the battery back-up can be used to provide power to the candle control 31 during a power-interruption. The candle control can be configured to operate in a low-power mode where some functionality including processing and communications is preserved. For instance, the lower power mode may be configured to prevent important data, such as data received from a bill validator, from being lost before it is stored to a non-volatile memory, such as a flash memory. The preserved data can be subsequently sent to a remote device when power is successfully restored.

As another example, in low power mode, some communications can be provided. For instance, the candle control 31 can be configured to transmit an alert message that power has been lost. In another example, the candle control 31 can be configured to transmit an alert if any security sensors coupled to the candle, such as a door open sensor, are activated during the power interruption.

In various embodiments, different board arrangements and multiple boards with different functions can be utilized. Further, different candle devices can have different combinations of features and thus, the components in each candle can vary from candle to candle. For example, in one embodiment, an antenna, such as 69 or 70, can be coupled to the candle 30 as a component separate from the candle housing and the candle 30 may not include an interior antenna or a surface mounted antenna.

Figure 2C:
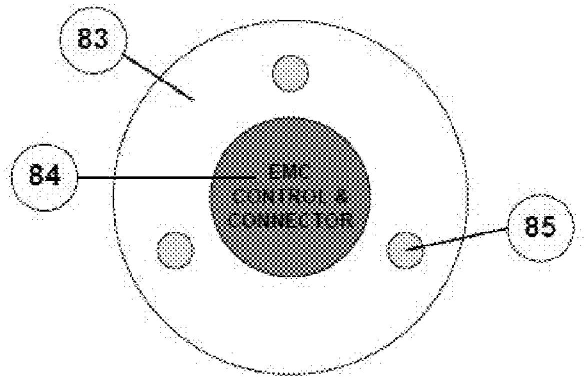
FIG. 2C is a diagram that illustrates the view of a candle base in accordance with the described embodiments.

FIG. 2C is the bottom view of the candle 30 with the mounting plate 83 and the mounting screws 85. The mounting plate 83 and mounting screws 85 can be used to attach the candle 30 to a gaming machine. A wiring harness to the gaming machine can be connected via the EMC control and connector 84. The EMC connector and control 85 may be related to controlling and responding to interference issues or limiting electromagnetic surges into the gaming machine from the candle. As is described in more detail below (e.g., see FIGS. 5A and 5B), the wiring harness can include wires that allow power to be received at and distributed from the candle and that allow communications between the candle and other devices, such as a game controller and various peripheral devices. For instance, the wiring harness can include a USB-compatible interface that allows another device to be communicatively connected and receive power from the candle 30.

Figure 3A:
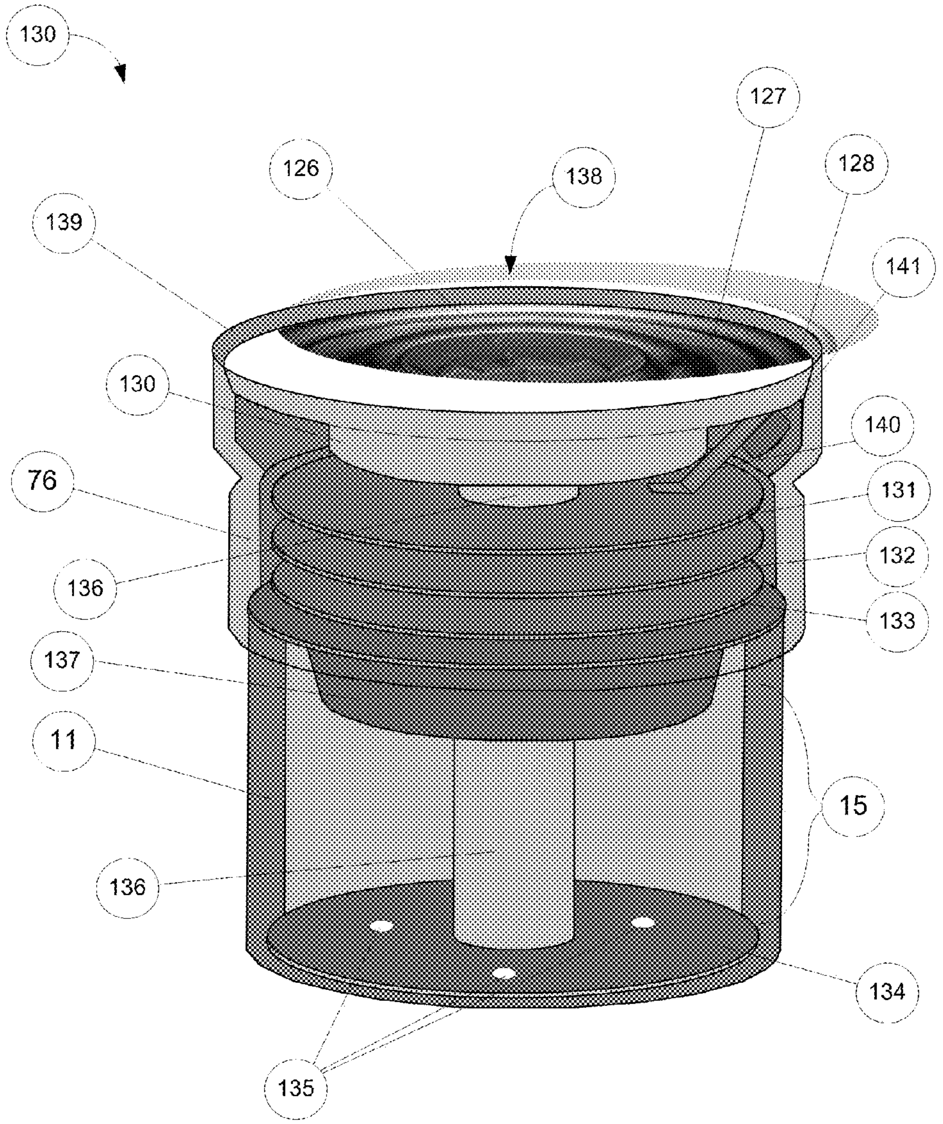
FIG. 3A is a perspective drawing including a partial cut-away of a top portion of a candle in accordance with the described embodiments.
Figure 4:
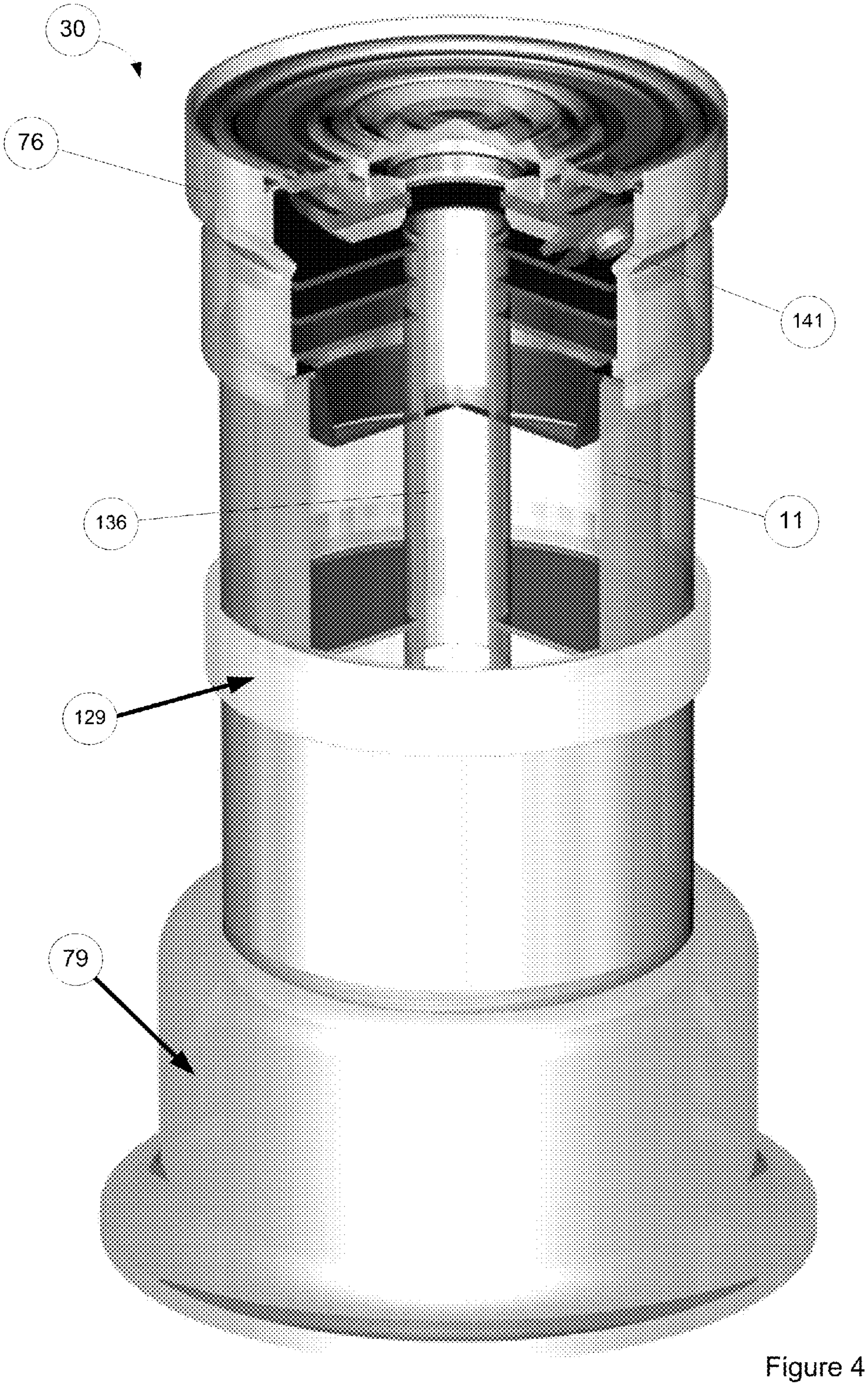
FIG. 4 is a perspective drawing including a partial cut-away of a top portion of a candle in accordance with the described embodiments.
Figure 5B:
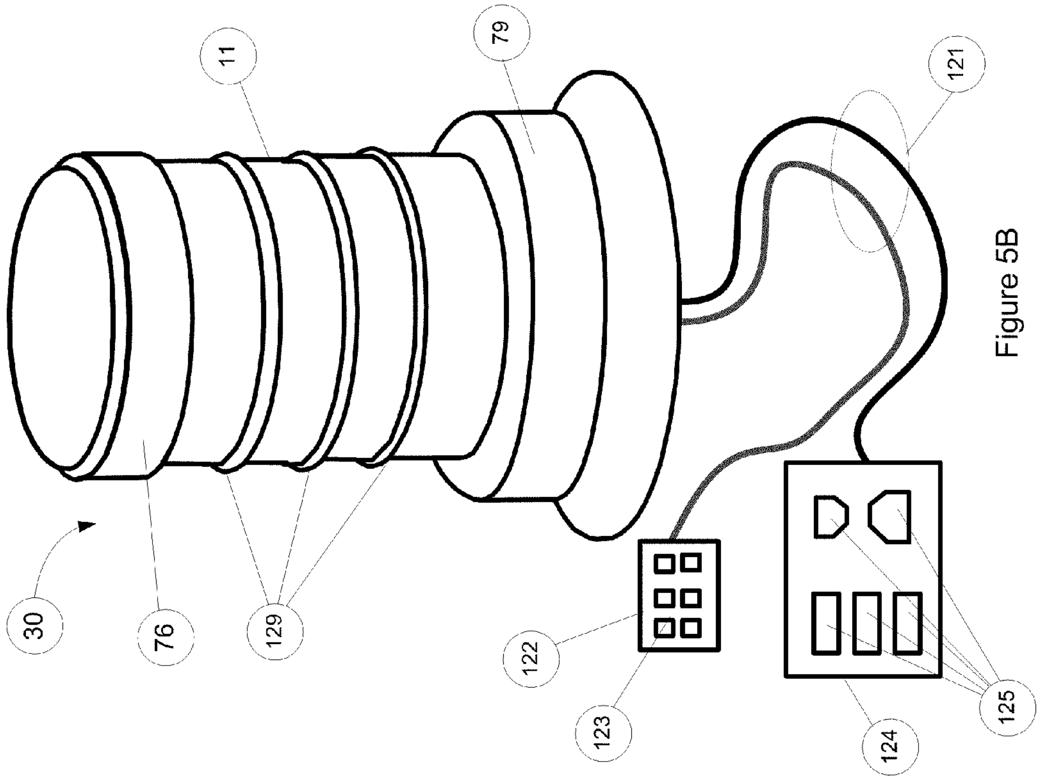
FIGS. 5A and 5B are perspective drawings of two examples of a candle in accordance with the described embodiments.
Figure 5A:
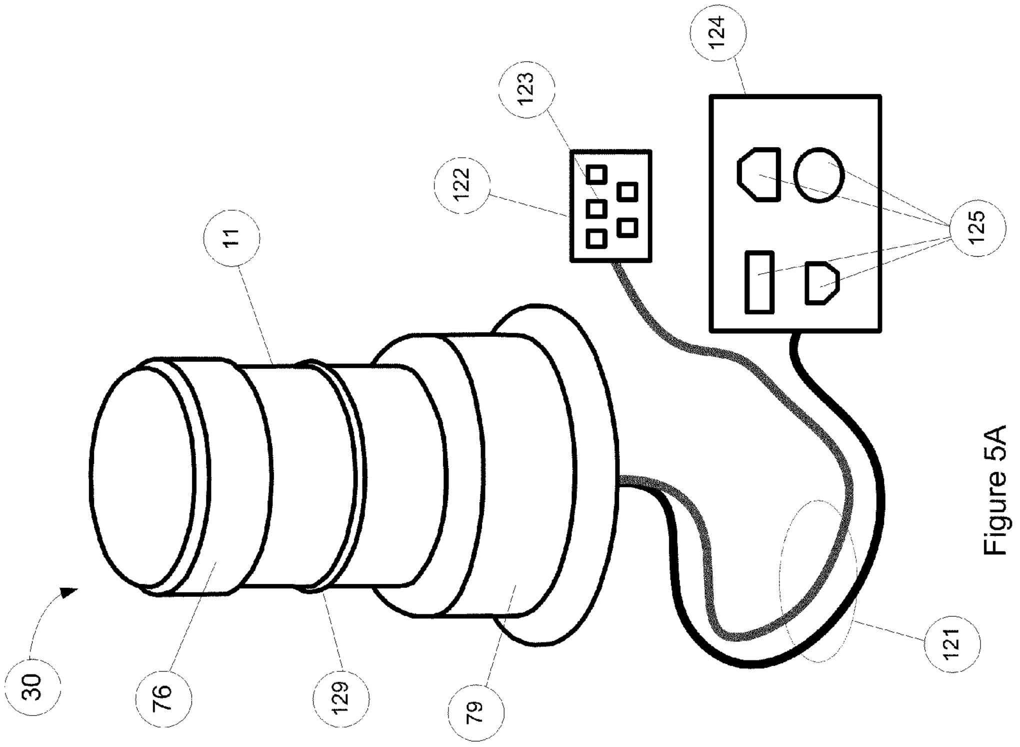

FIG. 3A is a perspective drawing including a partial cutaway of a top portion of a candle 30. A cap 76, such the cap shown in FIG. 1, rests on top of the cylindrical shell 11. The cylindrical shell 11 forms a number of stages associated with the candle. In FIG. 3A, only an upper stage 15 is shown. In FIGS. 4, 5A and 5B, additional stages are shown.

A PCB 134 including a number of LED lightings elements 135 can be located at a bottom portion of the upper stage 15. In one embodiment, the PCB 134 can be perpendicularly orientated to the center axis of the candle 30 and can be circularly shaped. The LED lighting elements 135 can be different colors. The LED lighting elements can provide colored illumination for the upper stage and/or back lighting for one or more display screens located on the inner surface of the cylinder 11. In one embodiment, the PCB 134 can include lighting elements on a top surface and a lower surface. The lighting elements on the lower surface can be used to illuminate a portion of the cylindrical shell 11 located below the PCB 134, such as a lower stage of the candle 30.

In one embodiment, a top portion of the cap 76 is formed as a speaker assembly 138. In other embodiments, the speaker assembly 138 can be placed in another location in the candle 30 or even provided separately from the candle 30. Thus, in other embodiments, the cap can be a solid surface, such as shown in FIG. 2A. A bottom portion of the cap 76 can be formed from the end cap 137. In one embodiment, the end cap 137 can rest on the top of cylindrical shell 11. The cap 76 can be configured such that its inner diameter is slightly larger the outer diameter of cylindrical shell 11 allowing it to fit over and around a top portion of the cylindrical shell 11. A ledge can be built into an inner surface of the cap 76 to limit the distance that the cap 76 slides over the top of the shell 11 (see FIG. 3B).

In one embodiment, a groove and key system can be used between the cap 76 and the shell. For instance, one or more spokes on the cap 76 can be inserted into grooves coupled to the shell configured to accept the spokes. The spokes can also be located on the shell and the grooves can be located on the cap. Alternatively, a combination of spokes and grooves can be located on the both the cap and the cylinder. The spoke and grooves can be configured to lock the cap 76 and the cylinder 11 in an orientation that is fixed relative to one another. A bonding agent, such as an epoxy, can also be used to fix the orientation of the cap 76 relative to the cylinder. One purpose of this mechanism is to prevent the cap 76 from being easily rotated relative to the cylinder 11 without breaking the spokes. If the cap 76 were easily rotatable then it would be possible to change an orientation of a camera to avoid surveillance which could comprise security.

A hollow conduit 136 can run from approximately the bottom of the speaker assembly housing 130, through the cap 76 and into the interior of the cylindrical shell 11. Then the conduit 136 can run to the base 79 of the candle 30 (e.g., FIG. 4). A number of PCBs, such as 131, 132, 133 and 134, with hollow interior portions can be mounted around the conduit 136. Power and data connections for the PCBs and the speaker assembly 138 can be routed through the conduit 138 to the base 79 where a wiring harness to the candle 30 can be attached. The end cap 137 can also include a hollow interior portion that allows for the passage of conduit 136.

A single board running down a center diameter of the candle 30 as shown in FIG. 2A can provide undesirable shadowing effects that make the appearance of the candle when lighted differ from more traditional candles. One advantage of using one or more PCBs in the cap 76 with connections running through conduit 136 is that shadowing effects can be minimized as compared to the single board design in FIG. 2A. Thus, this embodiment can provide lighting effects that are fairly indistinguishable from a traditional candle design.

Another advantage of designing the cap 76 with one or more PCBs arranged in the interior, such as 131, 132 and 133, is that a bottom can be placed on cap 76 and the cap portion can be used as a device separate from the candle 30. Many of the functions provided by the components in cap 76 are useful in a gaming device and do not have to be embodied as part of a candle design. Thus, all or a portion of the functions provide by electrical components in cap 76 can be used in embodiments not including candle functions. For instance, the cap could be mounted flush with a bar-top and coupled to one or more gaming machines built into the bar-top to provide the functions not related to a candle described herein. In this embodiment, the top portion of the cap 76 can be sealed to prevent damages from spills that can occur and allow for easy cleaning of the device.

In one embodiment, the cap 76 can include a beveled ledge and a speaker assembly 138 with a raised lipped portion 139 can be shaped to rest on the beveled ledge to form a top portion of the cap 76. The raised lipped portion 139 can partially conceal the speaker components 126 and 127 from view, such as from a player playing a game at a gaming machine where the candle is placed. In one embodiment, circuitry for driving the speaker is located below the speaker components in speaker assembly housing 130. The speaker assembly 138 can be secured from the inside to prevent the speaker assembly and/or the cap from being removed. An audio codec and other circuitry for providing sound processing and output capabilities can be located one of the PCBs, such as 131, 132 or 133.

An antenna 127 can be mounted on top of or integrally formed with the speaker assembly. In particular embodiments, speaker components 126, 128 and antenna 127 can be bare or can be covered in some manner. For instance, a cloth mesh may be placed over the components. In another example, a semi-rigid or rigid cover can be placed over the components. The cover can be selected to be sound permeable.

A number of shaped PCBs can be located below the speaker assembly housing 130 within the interior portion of the cap 76. These boards can be configured to perform various functions associated with the candle device 30. The functions, which can be embodied as various electrical components, are described above in more detail with respect to FIGS. 2A-2C and FIGS. 7-15B.

In one embodiment, a first board, such as 131, can include video processing functions including components for processing data received from a camera. A second board, such as 132, can include the candle controller and various candle control modules including a processor, a memory and audio processing capabilities, such as audio codecs. A third board, such as 133, can include power conditioning circuitry. The power conditioning circuitry can be used to convert an input voltage, such as 24 V DC into other voltages used by the electrical components on the candle 30 or one or more peripheral devices coupled to the candle 30. For instance, the 24V DC can be converted to 5 DC V, 3 DC V and/or 1.5 DC V in various embodiments.

The number of PCBs used can vary from embodiment to embodiment. For instance, if one board is used for video processing and video processing is not going to be used, then this board may not be included. Further, the cap can include slots for additional boards and is not limited to three boards as shown in FIG. 3A.

The diameter of a cylindrical shell, such as 11, can vary from device to device. In one embodiment, the PCBs, such as 131, 132, 133 and 134, can be sized to fit a cylindrical shell diameter for the smallest diameter device that is to be produced. For candles with larger cylindrical shell diameters, and hence a larger cap diameter, the same diameter boards can be used. Thus, custom boards do not have to be designed for different models of candles with different cylindrical shell diameters. Candle designs that have a different shell diameter but can use the same diameter PCBs mounted in a cap are shown in FIGS. 5A and 5B.

In one embodiment, a camera, such as 141, can be mounted within the cap 76. When a cap, such as 76, is formed from a clear material and then coated, such as metalized, a window can be provided that provides a view port for the camera 141. In other embodiments, a candle with multiple cameras can be provided. The cap 76 can include multiple cameras. Further, cameras can be placed in other locations, such as the base of the candle.

In a top mounted candle (mounted above the player), the camera 141 can be positioned in a downward facing orientation to capture images of players that will typically be located below the camera when the player is at a gaming machine. In a bar-top model, the camera 141 orientation may be tilted upward to capture an image of a player above the candle. In the bar-top example, only a portion of the candle may be used. For instance, the camera 141 can be mounted in the cap 76 and the cap can be mounted in the bar-top. The top of the cap can be flush with bar-top and the camera can utilize a viewing window through the top of the cap. In another example, all of a portion of the candle could be mounted in a ceiling above the bar-top. In this example, the candle can be mounted in an upside down orientation such that the top of the cap can be facing downwards towards the top of the bar-top.

In particular embodiment, the camera 141 can be mounted to a mechanism that allows an orientation of the camera 141 to be adjusted and then locked into place. In another embodiment, the mechanism can include a servo motor that allows an orientation of the camera to be adjusted in response to remote commands. In yet other embodiments, the camera can include a fixed focus or can be provided with a mechanically adjustable focus or optical zoom. Further, features, such as a digital zoom, can be provided with the camera. A sensor for the camera can be located on one of the PCBs, such as 131. A connector, such as a flex connector 140, can be used to couple the camera 141 to one of the PCBs.

In yet other embodiments, multiple cameras can be mounted in the cap. For instance, enough cameras can be used around a periphery of the cap to provide up to a 360 degree field view around the candle. The number of cameras that are used can depend on the diameter of the cap, the desired overall field of view around the cap and the field of view of each camera.

In one embodiment, a microphone (not shown) can be mounted within the cap 76 or another portion of the candle 30, such as the base 79. The microphone can be used to detect sounds proximate to the candle, such as an ambient noise level, gaming machine generated sounds, and player generated sounds. In one embodiment, the candle 30 can be configured to adjust a volume level of the speaker components in the speaker assembly 138 based upon ambient noise levels, such as making the speaker volume level louder when the ambient noise level is louder.

The microphone alone or in combination with the camera can be used to detect a presence of a player at the gaming machine or nearby the gaming machine. The camera can also be used separate from the microphone for this feature. When a player is detected nearby the gaming machine, an attract feature can be triggered on the candle device. In response, the candle, using peripheral devices it controls which can include devices shared with a gaming controller, can launch an attract mode feature. Further details of an attract mode feature are described with respect to FIGS. 11A and 11B.

In further embodiments, the candle can use its sensing devices, such as a camera 141 and/or a microphone, to detect a number of people in a vicinity of the candle. For example, image recognition software in conjunction with images received from the camera can be used to detect people proximate to the candle including possibly the number of people. As another example, sound recognition software in conjunction with sounds received from the microphone can be used to determine whether one or more people are proximate to the candle. Depending on the number of people that are detected, a bonus or attract mode feature can be adjusted. For instance, a bonus or attract mode feature can be made louder and flashier when more people are in detected in the vicinity of a gaming machine to draw their attention.

Figure 3B:
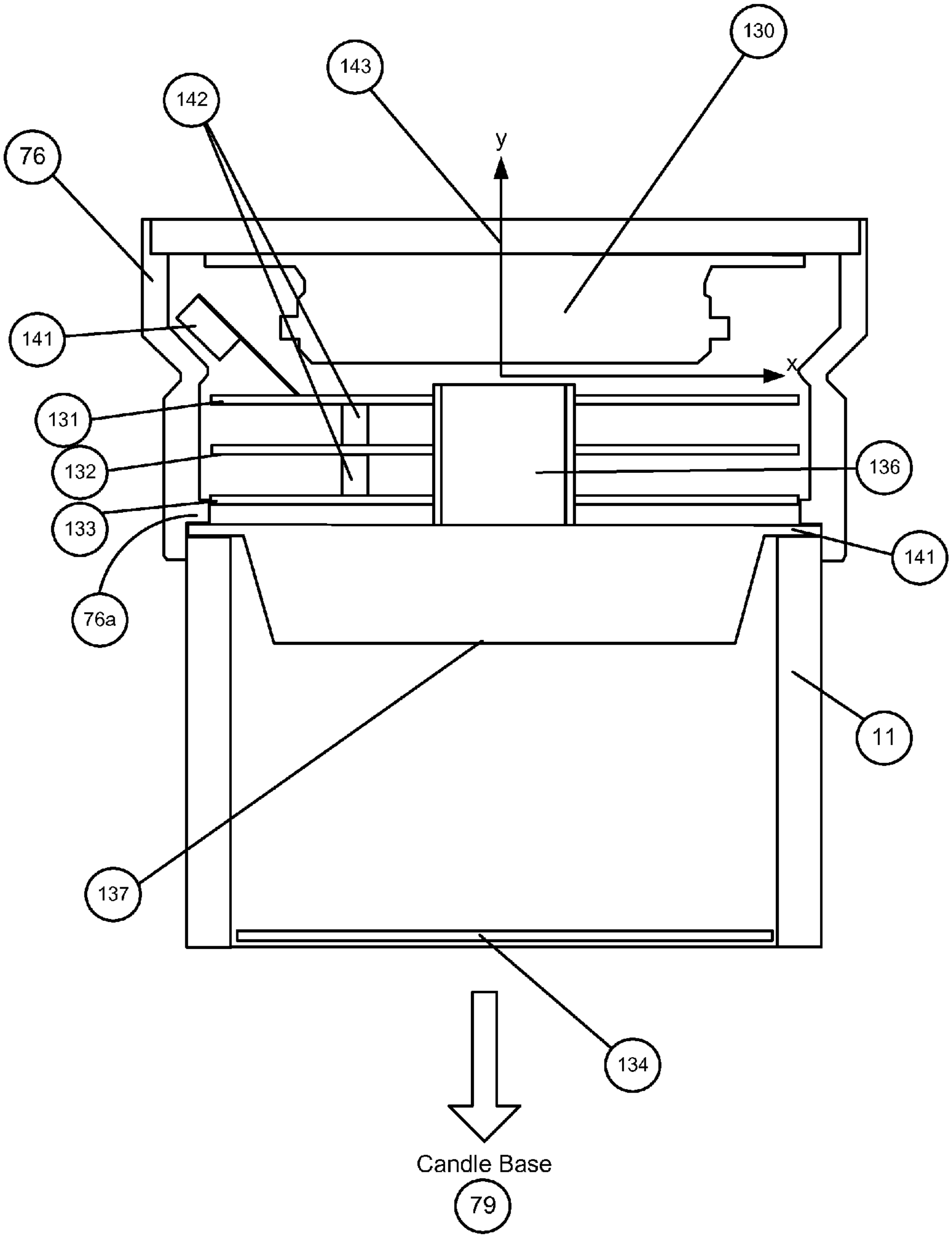
FIG. 3B is a cross-section of a top portion of a candle in accordance with the described embodiments.

FIG. 3B is a cross-section of a top portion of a candle 30 with an x-y axis 143. In this embodiment, the end cap 137 includes a ledge portion 141. The ledge portion 141 sits on top of the cylindrical shell 11. The notch **76*a* is provided in the cap 76. The notch 76*a* allows a portion of the cap 76 to fit over the ledge 141 and the top of the shell 11. The notch 76*a* determines how far the cap 76 slides over the cylindrical shell 11**.

The three PCBs, 131, 132 and 133 can be connected together. The connections can allow data and/or power to be transmitted between the boards. In one embodiment, rigid pin connectors 142 are used to connect the boards. In another embodiment, the connectors 142 can be flexible connectors. These connectors may be routed through the conduit 136 or can be routed outside the conduit.

In particular embodiments, the boards, 131, 132 and 133 can be mounted within the cap 76 such that an attempt to remove the cap 76 damages the board. For example, an attempt to unscrew the cap 76 may cause the boards to be damaged and become unworkable. Further, components on the board can be covered with epoxy such that an attempt to remove the component will damage it and/or the PCB to which it is attached.

The cap 76 and/or candle can include other mechanisms for detecting and preventing tampering. Sensors can be mounted in the 76 to detect whether an orientation of the cap has been altered. For instance, the cap 76 can be locked into place relative to the cylinder shell 11 such that portions of a sensor are aligned or coupled to one another in a first position where a change in orientation will result in a signal being generated by the sensor. In another embodiment, the cap 76 can be pressurized and sealed and a pressure sensor can be placed within the cap. The cap or a portion of the cap can be pressurized above or below atmospheric pressure. The cap 76 can be designed such that a rotation of the cap causes a seal to be broken and the pressure within the cap to change. This event can be detected by the pressure sensor and trigger a detectable event.

FIG. 4 is a perspective drawing of a candle 30 including a partial cut-away of a top portion of the candle 30. The candle 30 is a two stage candle. The candle 30 can include additional PCBs, such as a PCB including additional lighting elements located in the lower stage for illuminating the lower stage. The center conduit 136 can be seen extending into the lower stage of the candle 30. As described with respect to FIGS. 3A and 3B, power and data connections can run through the center conduit from the cap 76 and connect to one or more PCBs in the cap. The center conduit can be connected to a wiring harness that extends from the base of the candle 30. If the cap portion is utilized separately from the candle, then the wiring harness can extend from the base of the cap 76. Details of wiring harnesses are described with respect to FIGS. 5A and 5B as follows.

FIGS. 5A and 5B are perspective drawings of two examples of a candle 30. In FIG. 5A, the candle 30 is configured with a single divider ring 129. This candle can be implemented minimally as a two stage candle. However, as described above and below with respect to FIGS. 6A-6C, different lighting effects can be used to provide the appearance of additional stages. In FIG. 5B, the candle 30 includes 3 divider rings 129 and can be configured to operate at a minimum as a four stage candle.

The candle 30 in FIG. 5B is taller and has a greater shell diameter 11 than the candle 30 in FIG. 5A. However, the candle 30 in FIG. 5A has a thicker base 79 and thicker cap 76 than the candle in FIG. 5B. In both embodiments, the top of each cap 76 is a flat surface. In various embodiments, a speaker assembly may or may not be located below the flat surface. As described above, the cap 76 can include a number of shaped PCBs, such as circular PCBs. In particular embodiments, PCBs with the same dimensions can be used in both candle embodiments.

A wiring harness 121 extends from both candle devices. The wiring harnesses each include a primary connector 122 and a secondary connector 124. The primary connector 122 can be used to connect a legacy power and data connections on a gaming machine. It is shown as a single component but can comprise multiple components. The legacy power and data connectors can vary from gaming machine to gaming machine. Therefore, the primary connector 121 can vary from candle embodiment to candle embodiment.

As an example, the primary connector 122 in FIG. 5A includes five apertures 123 and the primary connector 122 in FIG. 5B includes six apertures 123 for compatibility with legacy communication and data connections on different gaming machines. In general, the form factors associated with the primary connectors 122 can vary, such as in size and shape, and the examples in FIGS. 5A and 5B where the number of apertures is different is provided only for the purposes illustration.

The secondary connectors 124 can be used to add new data and power connections on a gaming machine and to reconfigure existing data and power connections on a gaming machine. In FIG. 5A, the secondary connector 124 includes interfaces for up to four different communication and/or data connections 125. In FIG. 5B, the secondary connector 124 includes interfaces for five different communication and/or data connections 125. The form factor of the secondary connectors including the number and types of connections that can provided can be varied and are provided for the purposes of illustration only. Examples of power and/or data connections that may be included in a secondary connector include but are not limited to USB, DVI, HDMI, Ethernet, an audio jack, composite video, fiber optic, RS-232, RS-485, component video, VGA, RGB, digital audio, IEEE-1394, IEC, PS/2, PCI express, PCI, PCI-X, RJ45, RJ11, ATA, SCART and S-Video.

Figure 6A:
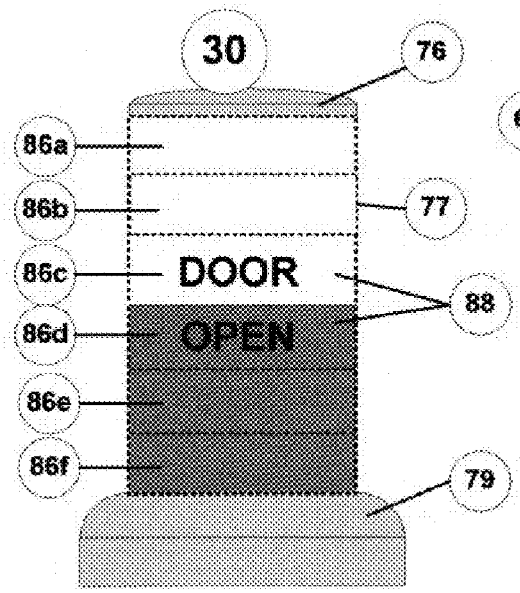
FIG. 6A is a diagram that illustrates the light and graphical rings of a candle in accordance with the described embodiments.
Figure 6B:
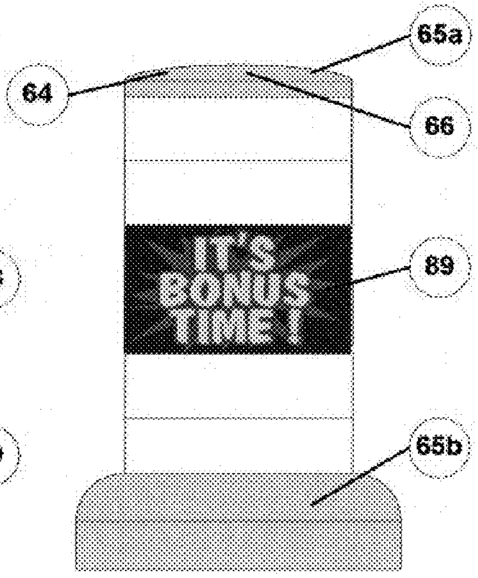
FIG. 6B is a diagram that illustrates the location of the peripheral candle devices in accordance with the described embodiments.
Figure 6C:
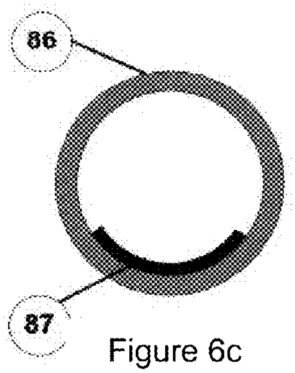
FIG. 6C is a diagram that illustrates a graphical ring in accordance with the described embodiments.

FIGS. 6A-6C are diagrams that illustrates the light and graphical rings of a candle 30 and the location of the peripheral candle devices in accordance with the described embodiments. In FIG. 6A, the candle assembly includes a base 79, a clear cylindrical shell 77 and a cap 76. Inside the cylindrical shell there are six RGB display rings 86*a*, 86*b*, 86*c*, 86*d*, 86*e*, and 86*f*. In different embodiments, more or fewer display rings can be utilized.

A basic display ring may be implemented as a cylindrical light guide which is bottom or side lit. In two embodiments, the lighting can be provided using an array of RGB LEDs or OLEDs. In FIG. 6A, the top three rings (86*a*, 86*b*, and 86*c*) display one color and the bottom three rings (86*d*, 86*e*, and 86*f*) display another color. The two colors may be used to emulate a particular model of a two stage candle. In embodiment of FIG. 6A, the candle can be programmed to emulate a one, two, or three stage candle model depending on the combination of the display rings. A controller can be configured to display different colors for each stage, which can vary from jurisdiction to jurisdiction. In one embodiment, the controller can be configured to detect in which jurisdiction it is located and then configure the candle with an appropriate color scheme. To accommodate more stages, additional display rings can be utilized.

In various embodiments, a graphical display ring may used to provide graphics or animation. The graphical display ring may be used in lieu of one or more of the basic display rings. The graphical display ring shown in FIG. 6C includes a basic display ring 86 with a graphical display 87 replacing a portion of the surface of the ring. The graphical display 87 may include flexible arrays of RGB, LEDs or OLEDs or a color E-paper display. Other low power display technology may be used.

In the embodiment of FIG. 6A, the two middle rings are implemented as graphical display rings. The graphical display rings can be used to display a message 88 as show in FIG. 6A or an image as shown in FIG. 6B. The messages can include still images and/or video data. The graphical display ring may use the red 59, green 60 and blue 61 outputs, but may use a video output 58, shown in FIG. 10.

In one embodiment, a wireless communication peripheral 64, such as a Bluetooth enabled peripheral, a sensor peripheral 66 and a microphone 65*a* are housed in the cap 76. A speaker 65*b* is housed in the base 79. It should be recognized that these peripherals may be housed in different locations. For instance, as is shown in FIGS. 1 and 3A-4, a speaker associated with an audio peripheral is located in the cap 76. In other embodiments, a portion of an audio peripheral, such as bass module, can be located in base 79 and another portion of the audio peripheral, such as a high frequency speaker can be located in cap 76. By having multiple lighting effects and sequences and audio capabilities, casinos or other gaming operators using gaming devices, such as gaming machines, can use the candles in many new and different ways to create marketing and promotional opportunities and create more excitement in the area where such gaming machine(s) are located.

Gaming Device Control and Operation

Figure 7:
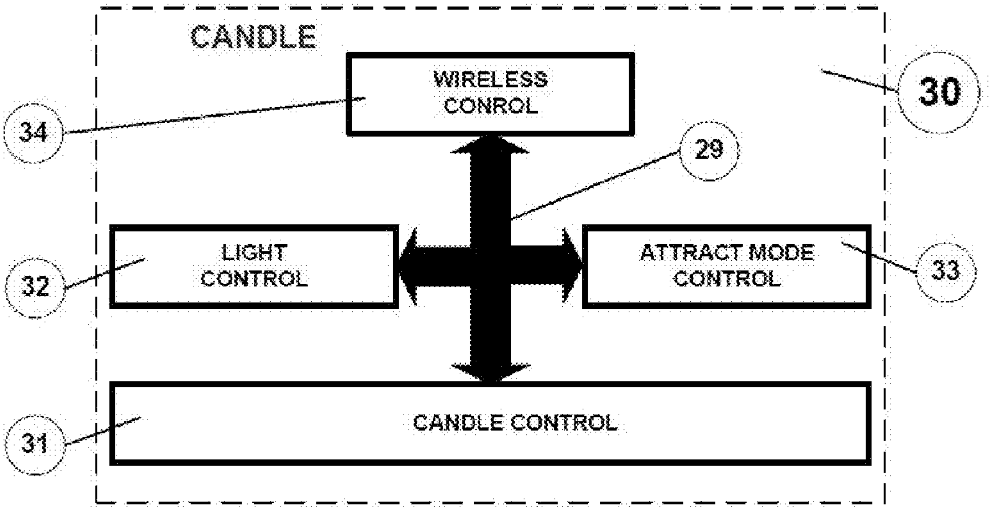
FIG. 7 is a simplified block diagram of a candle in accordance with the described embodiments.

FIG. 7 is a simplified block diagram of a candle 30. In one embodiment, the candle 30 may be abstracted to include four modules as shown in the block diagram FIG. 7. These modules are provided for the purposes of illustration only and different embodiments of the devices described herein can be abstracted to include more or less than the four modules shown in FIG. 7. For instance, some of the functions described with respect to one of the modules could be broken out and described as a separate module. Further, the combination of functions in each module can vary from embodiment to embodiment and is not limited to the example shown in FIG. 7. Hardware and software associated with the modules can be implemented as one or more PCBs, such as a single PCB described with respect to FIGS. 2A-2C or multiple PCBs as described with respect to FIGS. 3A-4.

In FIG. 7, a candle controller 31 is shown. The candle controller 31 can be configured to provide an external interface to and from a gaming device in which it is installed, such as a gaming machine and the operational control of the modules in the candle 30, such as an attract mode module 33, a light control module 32 and a wireless control module 34. In one embodiment, all of the modules are interconnected via address/data bus 29.

The light control module 32 can be configured to provide visual indicators such as lighting and graphical animations. The lighting and graphical animations can be implemented on the candle 30, on other peripheral devices coupled to the candle 30 or combinations thereof. For instance, in some embodiments, the candle 30 can be configured to communicate with and possibly control peripheral devices coupled to a gaming machine, such as lighting devices, sound devices, bonus devices (e.g., wheels or reels), a printer, a bill/ticket acceptor or a card reader. The peripheral devices coupled to the gaming machine can also be configured to receive commands from other devices, such as a game controller on the gaming machine.

The attract mode control module 33 can be configured to provide functions related to attracting and maintaining a player's interest on a gaming machine. As described above, the candle 30 can include one or more of a camera and a microphone. The candle can also include motion detectors or other sensors that provide data. The data provided from these sensors can be processed on the candle 30 to determine when to trigger an attract mode event. For instance, an attract mode can be triggered when it determines from image data that one or more individuals are near the gaming machine.

The wireless control module 34 can be configured to provide the wireless interface between the candle 30 and one or more remote gaming systems, such as WAP, player tracking and/or a cashless system. The wireless control module 34 can be configured to allow remote communication connections to be easily added or reconfigured on a temporary or on-going basis. For instance, the wireless control module 34 can be used to establish a temporary or one-time connection between the gaming machine and a remote device, such as but not limited to a third-party server, a user's mobile device or another gaming machine, or an on-going connection between the gaming machines and a remote device, such as a casino server. The capability to easily add or remove communication connections may be advantageous during such activities as rearranging gaming machine on a casino floor or moving a gaming machine from one location to another location. Further details of the control functions of a gaming device, such as a candle device are described with respect to FIGS. 8-12.

Figure 8:
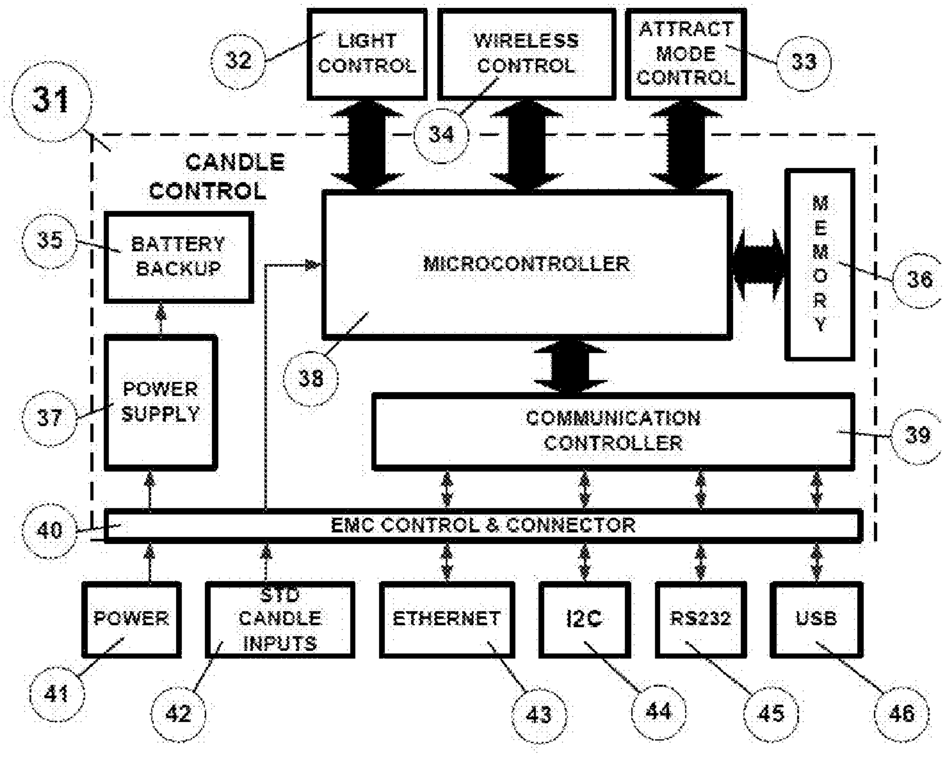
FIG. 8 is a block diagram of a candle control module shown in FIG. 7 in accordance with the described embodiments.

FIG. 8 is a block diagram of a candle control module 31 shown in FIG. 7. In one embodiment, all of the inputs and outputs pass through an EMC control & connector component 40, providing electromagnetic compatibility limiting unwanted emissions from the candle 31 and limiting the susceptibility or immunity from unplanned electromagnetic disturbances. This type of connector may be required to conform to EMC standards such as FCC Parts A & B, IEC, and CSAA.

The power input 41 can be configured to provide the input voltage source for the candle power supply 37. Typically, input voltages range 12V to 24VDC. The power supply provides the various output voltage sources for the internal circuits of the candle. The candle can include voltage conversion circuitry, such as step down circuitry that enables devices requiring varying voltages less than the input voltage to be supplied with power. The stepped down voltages can be provided to devices internal to the candle or to devices coupled to the candle via one of its power and/or data interfaces, such as a USB device coupled to the candle via interface 46. In one embodiment, the power input 41 can be used to provide the charging voltage source for the battery backup circuit 35.

Many gaming jurisdictions require certain devices, such as security monitoring circuitry on a gaming machine, to include a battery backup in case of casino or machine power failure. Further, the gaming jurisdictions can require a back-up transmission method for receiving data preserved and/or gathered during a power failure. The machine power failure could be a result of a main power grid failure or a local machine power failure that resulted from an attempted security breach (e.g., deliberately cutting power to the gaming machine) or other reasons. The security monitoring circuitry can be configured to detect and store any attempt to open any gaming machine door during the power failure. The monitoring circuits are typically part of the gaming machine's components. In one embodiment, the monitoring circuits can be linked to the candle.

A battery backed-up transmission method can be configured to provide a way to communicate security information during or immediately upon a power-up. In one embodiment, the method can allow for limited communications even during the power-interruption, such as an alert that a security related event is now in progress or that power has been lost to the gaming machine. The power-up can process can be initiated any time a gaming machine loses power, such as after a gaming machine is moved within the casino, transferred to another location outside the casino or following a power failure. The battery backup 35 can be used to provide a power back-up for one or more of the memories within the candle and provides a timing wake-up input to the candle control 31 and wireless control 34 to store and communicate any security information received at the candle from remote sensors, such as sensors within a cabinet of a gaming machine from which the candle can receive information, or security information detected from sensors associated with the candle. For instance, a camera in the candle can be used as a sensor to gather security information. This timing set point can be minutes or hours depending on jurisdictional or/and operator requirements.

In one embodiment, all of the communication channels routed through the candle interface with the communication controller 39. The communication channels can be associated with pass through communications, such as communications from an external device routed to the gaming machine via the candle or communications generated at the game controller, player tracking controller or a peripheral device and sent to a remote device via the candle. Further, communications sent from the microcontroller 38 or sent to the microcontroller 38 can be routed through the communication controller 39.

These communications channels may support various communication protocols. For instance, the communication channels can implement one or more of Ethernet 43, I2C 44, RS-232 45 and/or USB 46. Other communication protocols that may be used are RS-485, IEEE 1394 (Firewire), Netplex and other standard or proprietary communication interfaces used in the gaming industry. If available, these channels can be implemented as wired or wireless embodiments. For instance, a wireless communication protocol, such as wireless USB, can be implemented to allow for wireless communications between the candle and other devices within the gaming machine. Besides, wireless communications, wireless power transmission may also be supported in candle 30.

Depending on the number of gaming systems to which a gaming machine is connected (see FIGS. 14A and 14B), some gaming machines may utilize only a single external communication channel connection while others may utilize multiple channels. The communication controller 39 can be configured to provide the non-intrusive multiplexing and de-multiplexing of the communication interface data. Thus, the communication controller can be implemented with no change or interference to any protocol or related data from or to the gaming machine. The non-intrusiveness can allow an existing gaming machine to be equipped with a candle 30 utilized for external communications purposes without altering existing gaming software or gaming system software as well as without interference between protocols or related data from or to the gaming machine. In additional embodiments, the communication controller 39 can be configured to detect player messages from a player tracking unit and communicate with a player tracking system.

The microcontroller 38, which can comprise a processor and a memory, can be configured to provide the operational control for the candle modules, such as light control module 32, wireless control module 34, attract mode control module 33 and the candle control module 31. In one embodiment, the microcontroller can include one or more ARM processors, but other types of micro-processors can also be utilized. The operating system and static memory for the microcontroller 38 can be stored in the memory 36. In particular embodiments, the microcontroller 38 can be configured to receive software and/or firmware upgrades for itself, a game controller on the gaming machine and/or peripheral devices on a gaming machine from a remote device. The microcontroller can include functions for verifying the authenticity of downloaded firmware and/or software. Further, it can include hardware or software for decrypting the downloaded firmware and/or software. In general, the microcontroller can include hardware and/or software for encrypting and decrypting incoming or outgoing communications.

The candle control 31 can be configured to connect to one or more different legacy candle inputs 42. The legacy candle inputs can be associated with different gaming machine designs from different gaming manufacturers. In one embodiment, the legacy candle inputs are connected to a port of the microcontroller 38. The legacy candle inputs can be utilized when the candle is installed as part of a retrofit of a gaming machine deployed in the field. However, the legacy candle inputs 42 can also be used to connect the candle to a gaming machine in a factory setting as part of a new gaming machine.

Figure 9:
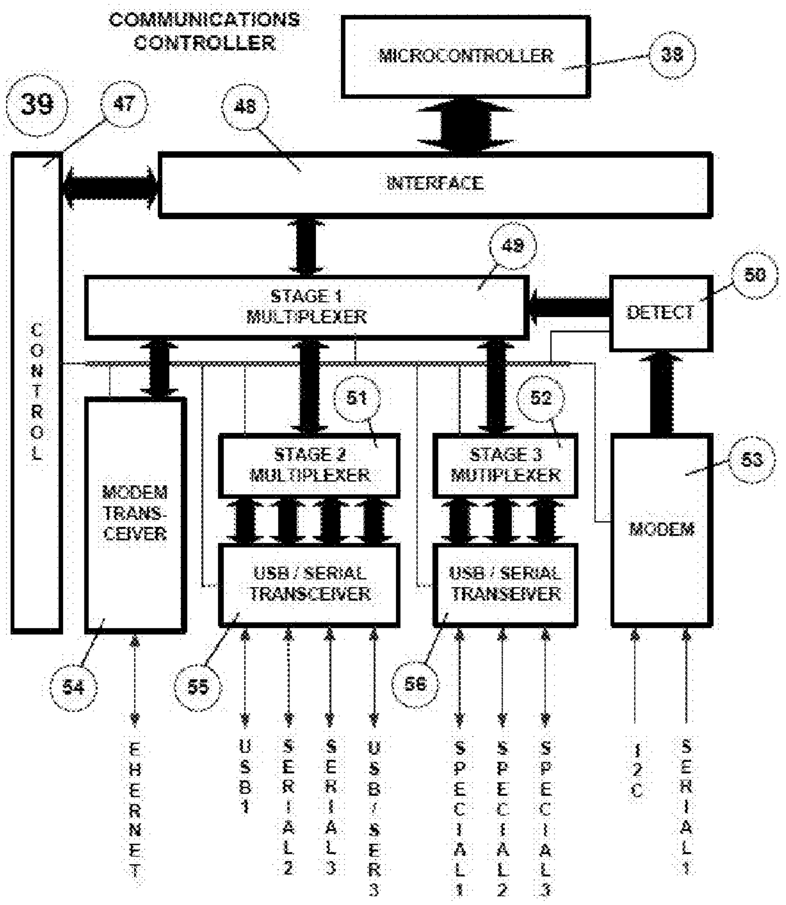
FIG. 9 is a functional block diagram of the communications controller shown in FIG. 8 in accordance with the described embodiments.

FIG. 9 is a functional block diagram of the communications controller 39 shown in FIG. 8. In one embodiment, the communication controller 39 is part of the candle control module 31. In other embodiments, the communication controller 39 can be implemented on a PCB separately from the candle control module 31. As described above, the communications controller 39 can be configured to provide non-intrusive multiplexing and de-multiplexing of communication data to and from a gaming machine. In other embodiments, the multiplexing and de-multiplexing can extend intra-gaming machine communications, such as communications between different controllers located within the gaming machine.

In the embodiment of FIG. 9, eight communication ports are shown, where each communication port is connected to their respective transceivers. Transceiver 54 is for one Ethernet port. The USB/serial transceiver 55 is configured with the capacity for one USB port, two serial ports and one port able to be programmed for either USB or Serial. Another USB/Serial transceiver 56 is configured to provide three programmable ports (USB or Serial). Serial indicates communications can include communications via RS-232 or RS-485. A different number of communication ports supporting the same or different protocols can be utilized and the example is provided for illustrative purposes. For instance, in one embodiment, one or more ports can support an optical fiber interface used in optical communications.

The components of the communication controller can be programmed by control 47. Control 47 can receive commands from microcontroller 38 via the interface 48. Transceivers 54 and 55 may be used to interface with the common gaming system interfaces of the gaming machine. Transceiver 56 may be used for special interfaces that provide special operations or processes for the casino operator. Each transceiver may provide modulation/demodulation, data packet translation, error correction and compression if required. These functions may be fully programmable in real-time.

Some serial technologies provide data streams in the form of 8 to 11 bits each. USB and Ethernet technologies provide data streams in the form of packets which use standard minimum and maximum (variable) number of bits. The transceivers can be configured to group the bits in each data stream into blocks of different sizes, such as blocks of 8/16 bits each for the multiplexers.

The transceivers can also be configured to provide time reference and priority tags based on the data streams from the gaming system. Certain gaming systems can have important events that require a timely response. For example, a player request or a winning reply may require it to be sent to the gaming system server and a response sent back to the gaming machine within a defined time. This response time is usually dependant on the type of gaming system.

At setup or from a casino operator command, the control component 47 can be configured to receive operational commands from the microcontroller 38. The operational commands can be used to provide a priority control to the transceivers and the multiplexer stages. For example, if one of the serial channels is set up for a certain gaming system that requires a fast response, data from this channel can be given a higher priority via the commands sent by the microcontroller 38.

Transceivers 55 and 56 can be configured to receive and transmit data blocks to stage 2 multiplexer 51 and stage 3 multiplexer 52 respectively. Multiplexers 51 and 52 can be configured to provide time domain multiplexing and de-multiplexing of the data blocks. The resultant data block output rate (bits per sec) of these multiplexers may be equal to highest data rates of any of the USB/Serial/Special data streams. The multiplexers may also use the priority tags giving certain data blocks higher priority.

Multiplexers, such as 51 and 52, and the transceiver 54 can be connected to the Stage 1 Multiplexer 49. Stage 1 Multiplexer 49 may be used to provide time domain or spread spectrum multiplexing. Spread spectrum multiplexing reduces the effect of interference during wireless transmission by spreading out the output blocks (bits per sec) to match the bandwidth of the wireless transmission channel and mixing the output with a pseudo-random code.

An additional input to the multiplexer 49 can come from detect 50. The modem 53 can be configured monitor messages sent from a player tracking unit (see FIG. 13). One or more different types of communication interfaces, such as different serial communication interfaces, can be provided to allow the modem to communicate with different types of player tracking units. A digital output of the modem 53 can be sent to detect 50, which looks for Player ID and button selections received from a player tracking unit. If detected by detect 50, the player tracking information can be multiplexed with the other inputs.

The output of the Stage 1 Multiplexer 49 can flow into the interface 48 and then to the microprocessor 38/wireless control module 34. The communication controller 39 can provide multiplexing, encryption and demodulation of the data streams from the gaming machine. Further, the communication controller 39 can provide de-multiplexing, decryption and modulation of the data streams to the gaming machine.

Figure 10:
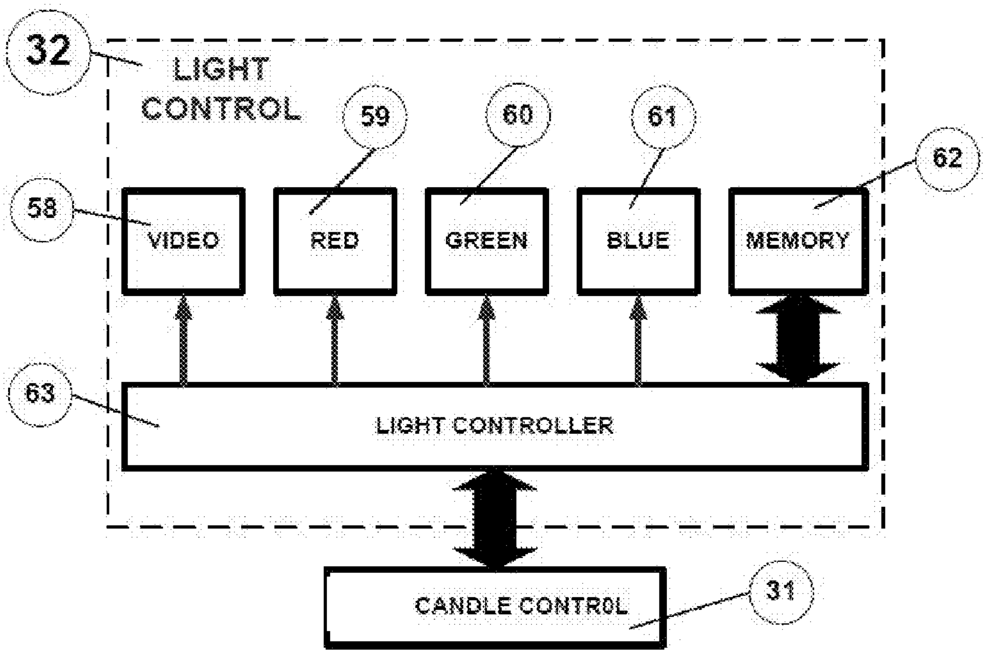
FIG. 10 is a block diagram of the light control module shown in FIG. 7 in accordance with the described embodiments.

FIG. 10 is a block diagram of the light control module 32 shown in FIG. 7. In particular embodiments, the light control module 32 can be configured to provide different visual displays targeted for reception by players, casino security or casino maintenance. Traditional candles often provide lighting with one or multiple stages of different color lighting. The different stages can be lit to provide visual indication of information related to a security problem, a player's request for attention or the play denomination (5 c/25 c/$1, etc.) of the gaming machine.

Many of these visual indications have been replaced with gaming system messages, but are still required in many gaming jurisdictions. The candles described herein can be used to emulate different models of traditional candles and their associated visual indicators. The emulation can be configured to account for a jurisdiction in which the candle and its associated gaming device are located. Messages or commands to implement a particular lighting configuration, such as a lighting configuration from a game controller, can be received via the standard candle input 42 described with respect to FIG. 8 or some other data interface depending on how the game controller is allowed to communicate with the candle controller.

The Light controller 63, which may be implemented as an FPGA, may receive data and/or commands from candle control 31 and store the data. In some embodiments, the data and commands may be associated with an animation, video data, message sequences, candle stage and color configurations, an image in memory 62 or video data 58 that are to be output on the candle. The light controller can be configured to activate the red 59, green 60 and blue 61 arrays associated with lighting elements, such as LED or OLED lighting elements, with commands and data stored in memory 62. The combinations and intensity of each of the red 59, green 60 and blue 61 arrays, can be used to produce different colors.

In some embodiments, a number and type of the candle colors that are utilized can be programmed. In general, the candle can be programmed to provide one or multiple visual stages depending on gaming jurisdictional requirements. In the modern casino environment, it is often important to provide real-time visual and/or audio information to the player, security and/or maintenance in response to different events. The candle can be configured to provide static and animated RGB displays and/or output associated audio data for these purposes.

Figure 11A:
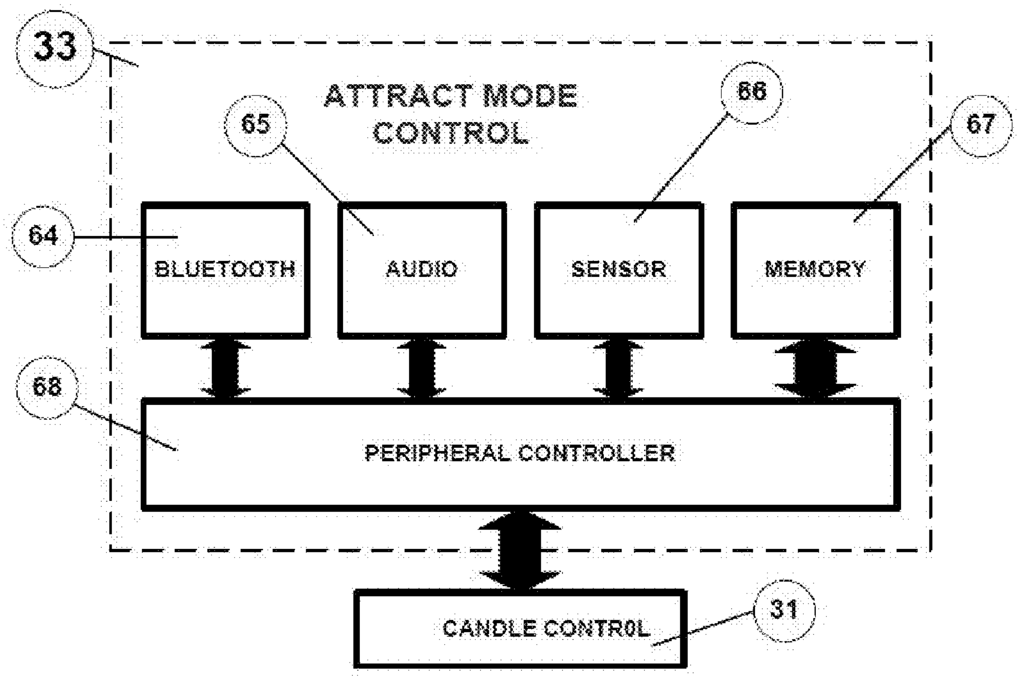
FIG. 11A is a block diagram of the attract mode control module shown in FIG. 7 in accordance with the described embodiments.

FIG. 11A is a block diagram of the attract mode 33 control module shown in FIG. 7. The attract mode module 33 may be configured to control a number of peripheral devices, such as but not limited to a wireless interface 64 (e.g., a Bluetooth™ enabled interface), an audio device 65, and/or sensors 66 (e.g., a camera or a motion detector). The peripheral devices can be connected to the peripheral controller 68. Peripheral interfaces unique to each peripheral may be used to enable communications between each peripheral device and the peripheral controller 68.

The peripheral devices can be located in a housing associated with the candle but can also be provided as units separate from the housing of the candle. For instance, the attract mode control module 33 can be configured to control twin speakers that are provided with the candle but installed separately from the candle housing. In another example, the attract mode control module 33 can be configured to control a device that is also controlled by a game controller on the gaming machine, such as bonus device including lights, wheels and/or reels and other moving elements. In yet other embodiments, the attract mode control module can be configured to control a nearby device not coupled to the gaming machine, such as a sign with a video display and a communication interface that can receive commands from the candle or a user's mobile device.

The peripheral controller 68 can be an FPGA or a PIC microcontroller. The peripheral controller can be configured to provide the module's interface to the candle control 31. Further, it can be configured to control the peripherals to which it is connected.

The wireless peripheral 64 may be used to communicate with a player's cellular phone or other personal communication devices. In one embodiment, the wireless peripheral 64 can use an industry standard, such as Bluetooth wireless technology. Other suitable wireless technologies, such as Wi-Fi or Wi-max, can also be used to connect to a user's device. In one embodiment, the candle can provide a local Internet hot spot or a connection to an internal casino Intranet that can be utilized by a player's communication device, such as a smart phone.

Bluetooth™ technology operates in the unlicensed industrial, scientific and medical (ISM) band at 2.4 to 2.485 GHz, using a spread spectrum, frequency hopping, full-duplex signal at a nominal rate of 1600 hops/sec. Connections between wireless peripheral 64 and the player's personal Bluetooth-enabled device, such as a cell phone allows the two devices to communicate wirelessly through short-range, ad hoc networks known as piconets. Piconets are established dynamically and automatically as Bluetooth-enabled devices enter and leave radio proximity meaning that the player can easily connect whenever and wherever a gaming machine is equipped with a Bluetooth-enabled candle. In various embodiments, players can request and receive special promotions or options from the casino on their personal communication device via this interface.

The audio peripheral 65 may be used to provide audible information and entertainment (e.g., music) for the player. It may also be used to provide security and maintenance information for casino personal. The audio peripheral 65 may include one or more speakers and a microphone.

The sensor peripheral 66 may be used to sense a player's presence or the player's identification. It may include a micro digital camera capable of providing IR and/or visible images of the area in front of the gaming machine (see FIG. 3A-4). For instance, if the camera is configured to detect IR, a player's thermal signature may be detectable. It can also be configured to capture information in other spectrums. In one embodiment, it may be used to create a special attract sequence or play mode for the player. In another embodiment, it may be used for security purposes, such as to capture a person's image associated with a fraud alert detected at the gaming machine.

In one embodiment, using cameras from multiple candles and in conjunction with a back-end server, images of multiple players can be gathered and displayed simultaneously on a gaming machine. For instance, the candle controller can be configured to receive images from one or more players participating in a tournament or in the same social group and display their images simultaneously on the gaming machine or on a display screen associated with a hand-held device, such as a smart phone, carried by the player. This information can be transmitted via the wireless peripheral 64 to the player's device. Further, the candle controller can be configured to forward image data including video images received from a camera it controls to a back-end server for this purpose.

The peripheral controller 68 may receive commands and data from the candle control 31. In response, it may execute the command immediately, in real-time or store the command and data in memory 67 to execute at a time determined by the command. Depending on the attract mode command, the peripheral controller 68 may request the light control module 32 to perform a visual sequence in sync with one or more peripheral sequences, such as audio sequences, to create special effects for the player's entertainment. In one embodiment, the peripheral controller 68 may communicate with the light control 32 via the candle controller 31.

Figure 11B:
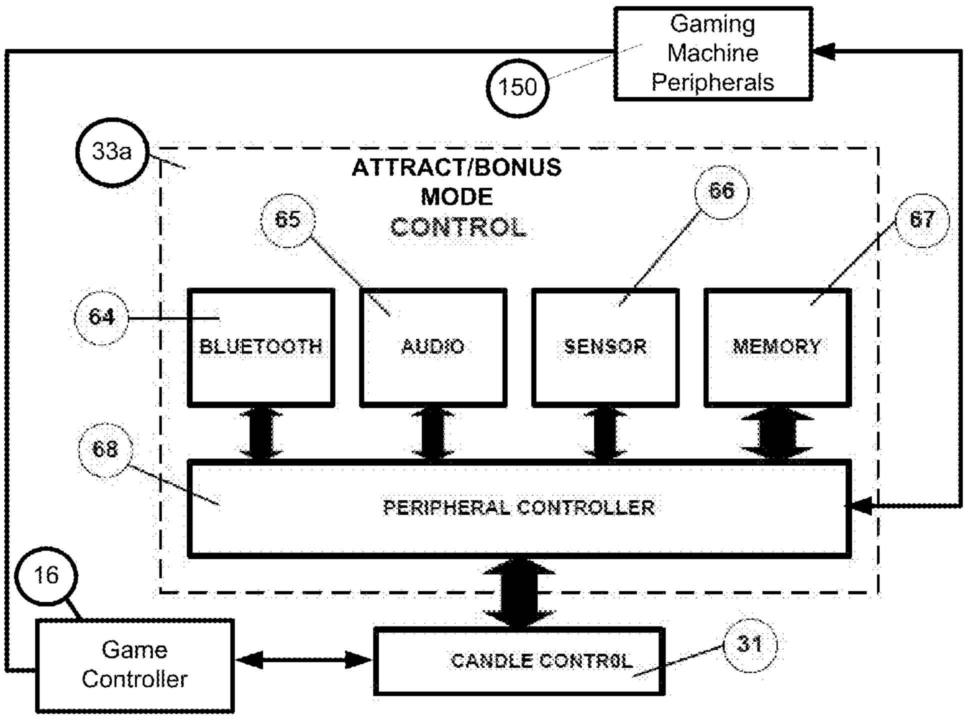
FIG. 11B is a block diagram of the bonus/attract mode control module configured to use one or more gaming machine peripherals in accordance with the described embodiments.

FIG. 11B is a block diagram of the bonus/attract mode control module 33*a* configured to use one or more gaming machine peripherals 150. The gaming machine peripherals 150 can include one or more input and output devices, such as but not limited to input buttons, bill validators, card readers, printers, displays, audio devices, bonus devices (e.g., wheels and reels), or lighting devices that are used to provide a wager-based game on the gaming machine. Thus, the gaming machine peripherals 150 can be configured to receive commands from a game controller 16 and send command responses to the game controller 16.

In one embodiment, the bonus/attract mode control module 33*a* can also be configured to communicate including sending commands and receiving command responses from one or more gaming machine peripherals 150. This capability may allow a candle to utilize the one or more gaming peripherals as apart of an attract mode presentation on the gaming machine or for other functions. For instance, the peripheral control 68 can be configured to share control with the game controller 16 of a lighting device or a bonus device, such as a reel or wheel, to provide an attract mode sequence on the gaming machine. Thus, an attract mode sequence provide by the candle 30 can include the use of both peripheral devices associated with the candle and gaming machine peripherals shared with the game controller 16. One embodiment where the candle 30 communicates with a number of gaming machine peripherals via the candle controller 31 is described with respect to FIG. 15A.

In another embodiment, the attract/bonus mode control 33*a* can be configured to provide a bonus game presentation on the gaming machine. Wager-based games typically include one or more animation sequences that are used to provide a bonus game presentation related to a bonus award triggered in the game. The bonus game presentation can include receiving selections from a player, outputting a bonus game presentation and indicating bonus award amounts.

A wager-based game can be designed with a default bonus game presentation and then the option of handing off the bonus game presentation to a candle 30. For example, the gaming controller 16 can send a message to the candle control 31 to generate a bonus game presentation of a certain amount. In response, the bonus/attract mode control 33*a* can generate a bonus game presentation using a combination of peripheral devices located on the candle and gaming machine peripherals. For example, an audio device on the candle and a touch screen and main display also controlled by the game controller 16 can be used by bonus/attract mode controller 33*a* to present a bonus game presentation.

Many different bonus game presentations with one or more stages can be provided as long as the total amount adds up to the bonus award value provided by the game controller 16. When the bonus game presentation is complete, the candle control 31 can signal the game controller that the bonus game presentation has ended and the game controller 16 can credit the amount of the bonus award to the gaming machine. If the candle for some reason is not correctly responding to the game controller, then the game controller can take control back from the candle and show its default bonus game presentation.

An advantage of allowing the candle to handle the bonus game presentation is that new and different bonus game presentations can be regularly provided on the gaming machine. In some embodiments, the bonus game presentations can even be customized or personalized for a particular player. For instance, the candle can receive player identification information from a player tracking controller that allows the bonus presentation to be personalized based upon identification of the player. As another example, bonus games can be tailored to a time of year, such as a holiday period, or an event, such as the Super Bowl. With this type of capability built into the gaming machine, regular updates to bonus game presentations can be regularly provided to the gaming machine. This capability may extend the shelf-life of a game installed on the gaming machine by generating additional player interest in the game resulting from the new bonus game presentations.

Figure 12:
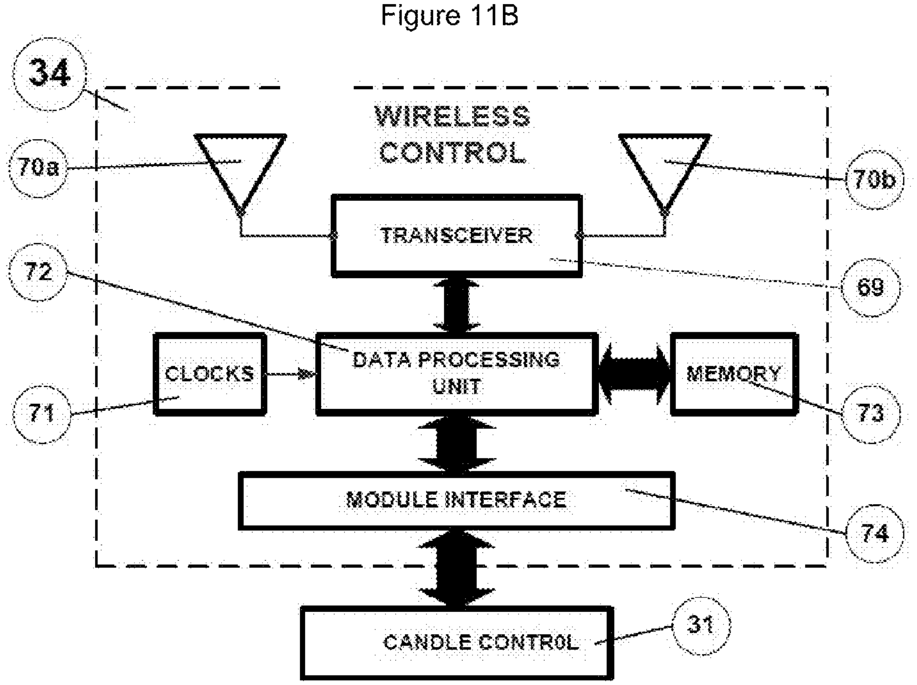
FIG. 12 is a block diagram of the wireless control module shown in FIG. 7 in accordance with the described embodiments.

FIG. 12 is a block diagram of the wireless control module 34 shown in FIG. 7. The wireless control module 34 can provide the wireless communication interface for the candle 30. The wireless control module can be configured to provide the components to cover the complete protocol stack physical layer (layer 1) through application layer (layer 7). In particular embodiments, the wireless control module can include an 802.15.4 (Zigbee) and/or an 802.11 compliant RF radio system.

The wireless control module 34 can include module interface 74, data processing unit 72, clocks 71, memory 73, transceiver 69 and antennas 70*a* and 70*b*. The module interface 74 receives commands and data to and from the candle control 31. In a particular embodiment, one or more antennas are provided as a component of the wireless control module 34. In other embodiments, the wireless control module 34 can also communicate with an external antenna (e.g., see FIG. 3A). In yet other embodiments, the wireless control module may not include an internal antenna.

In one embodiment, the wireless control mode can be providing SOC (System on Chip) technology. SOC solutions may include many of the components shown in FIG. 12 and can be purchased from many manufacturers. However, the antenna selection may be important for the casino environment due to interference and size issues. In one embodiment, the antennas are 2.4 Ghz high gain steerable phase array antenna manufactured by Pinyon Technologies Inc. Other antenna configurations can be used such as dual-band dipole, ultra-wideband omni, the (MIMO) multiple-in, multi-out antennas and others. Other embodiments for the wireless control module may include 3G, 4G, WiMax, WiFi and optical communication technologies.

Figure 13:
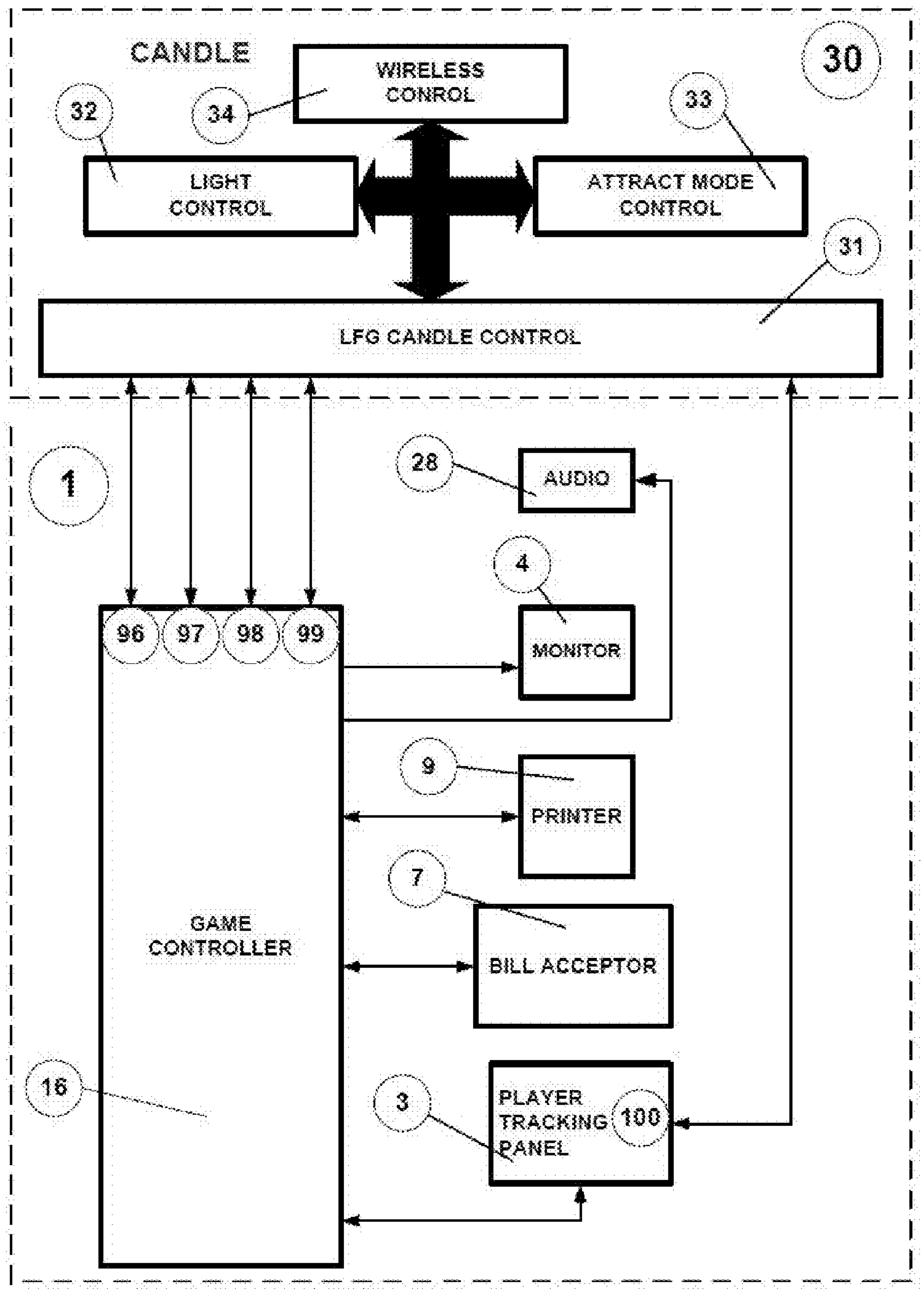
FIG. 13 is a block diagram that illustrates an interface between a candle and gaming machine in accordance with the described embodiments.

FIG. 13 is a block diagram that illustrates an embodiment of an interface between a candle 30 and gaming machine 1. In general, the interface can include power and/or data connections. The gaming machine may include a game controller 16. The game controller can be configured to control a wager-based game played on the gaming machine. The game controller 16 can generate the wager-based game by controlling a number of gaming machine peripherals, such as, monitor 4, printer 9, bill/ticket acceptor 7, audio 28 and one or more input devices, such as a touch screen or input buttons. In particular embodiments, the candle control 31 can also be configured to communicate with the gaming machine peripherals including sending commands and receiving command responses from the gaming machine peripherals.

The game controller 16 can also be configured to communicate with a player tracking system. To facilitate this communication, a player tracking unit including a player tracking controller and player tracking panel 3 may be installed on the gaming machine 1. The player tracking panel 3 can include a number of peripheral devices, such as card reader, display and input panel. The player tracking panel 3 includes a communication interface 100. These peripheral devices can be configured to communicate with a player tracking controller but not the game controller 16 i.e., the game controller may not be configured to control or operate these devices in any manner. In one embodiment, the candle controller 31 can be configured to provide player tracking functions via the player tracking panel 3, allowing a separate player tracking controller to be eliminated.

In FIG. 13, the candle 30 includes a candle controller 31, a light control module 32, an attract mode control module 33 and the wireless control module 34. The gaming machine 1 is configured to communicate with a TITO system, such as a cashless system, a link progressive system, WAP system and a player tracking system. The candle 30 is also connected to the game controller 16 via interface 96. Via interface 96, the candle 30 can receive commands related to a traditional candle and in response provide operational modes equivalent to a traditional candle, such as turning on a stage of the candle 30 to provide a visual indication of an event that has been detected on the gaming machine 1.

Communication links, which can be wired or wireless, are shown between communication interfaces TITO 97, link progressive 98, WAP 99, and player tracking 100 and associated communication interfaces on the candle 30. In this example, the communication interfaces are associated with candle controller 31. In general, a gaming machine deployed in the field can interface with one or more external systems and the candle 30 can include multiple ports to provide communication support for gaming machine that interface with multiple systems.

Figure 18:
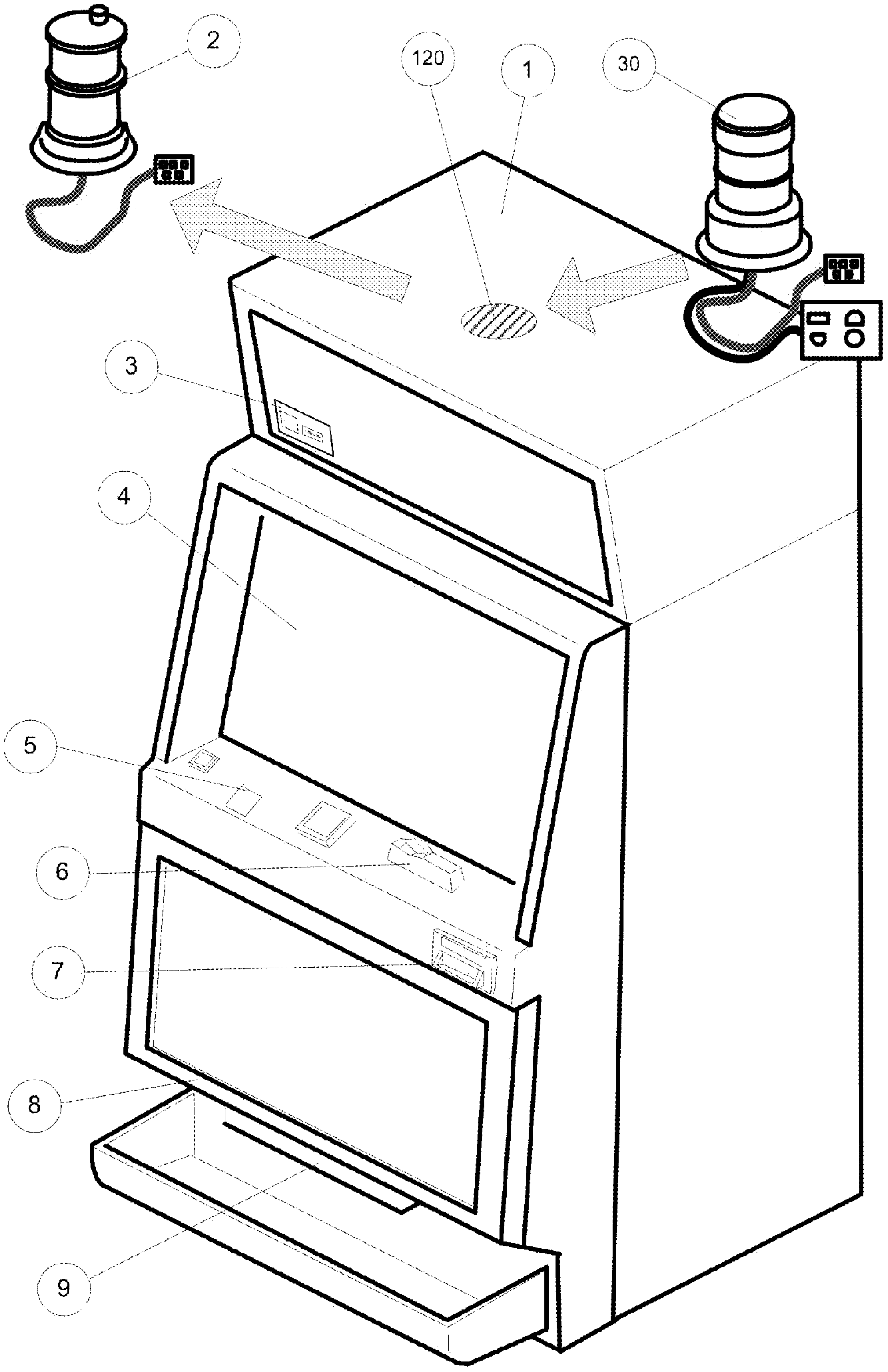
FIG. 18 is a perspective drawing that illustrates gaming machine that is to be retrofitted with a candle in accordance with the described embodiments.

Connecting the TITO 97, link progressive 98, WAP 99 and player tracking communications to the candle 30 in this manner may allow a number of communication interfaces traditionally used to provide these communication connections to be by-passed or eliminated. In a retrofit embodiment, the traditionally used communication interfaces may be by-passed and optionally removed. In a new gaming machine, the traditional communication interfaces can be eliminated. Examples of traditional communication interfaces are shown and described with respect to FIG. 18. FIG. 18 shows a gaming machine configuration prior to a retrofit with an embodiment of a candle described herein, such as candle 30. As shown in FIG. 18, a player tracking communication interface 17, a progressive communication interface 18 and a TITO communication interface 19 are a few examples of traditional communication interfaces that can be eliminated or by-passed.

The candle control module 31 can be configured to provide the multiplexing of the data streams from the gaming machine communication ports. The resultant data stream can then be encrypted and sent to the wireless control module 34. The wireless control module 34 can then transmit the data to one or more remote devices (A few examples of communication links between a candle 30 and a number of remote devices are described as follows with respect to FIGS. 14A and 14B.). The candle 30 can be configured to receive communications from one or more remote devices, de-multiplex the communications and provide decryption of the data stream. The decrypted data can be sent to the respective communication interfaces of the gaming machine 1, such as 97, 98, 99 and 100.

Figure 14A:
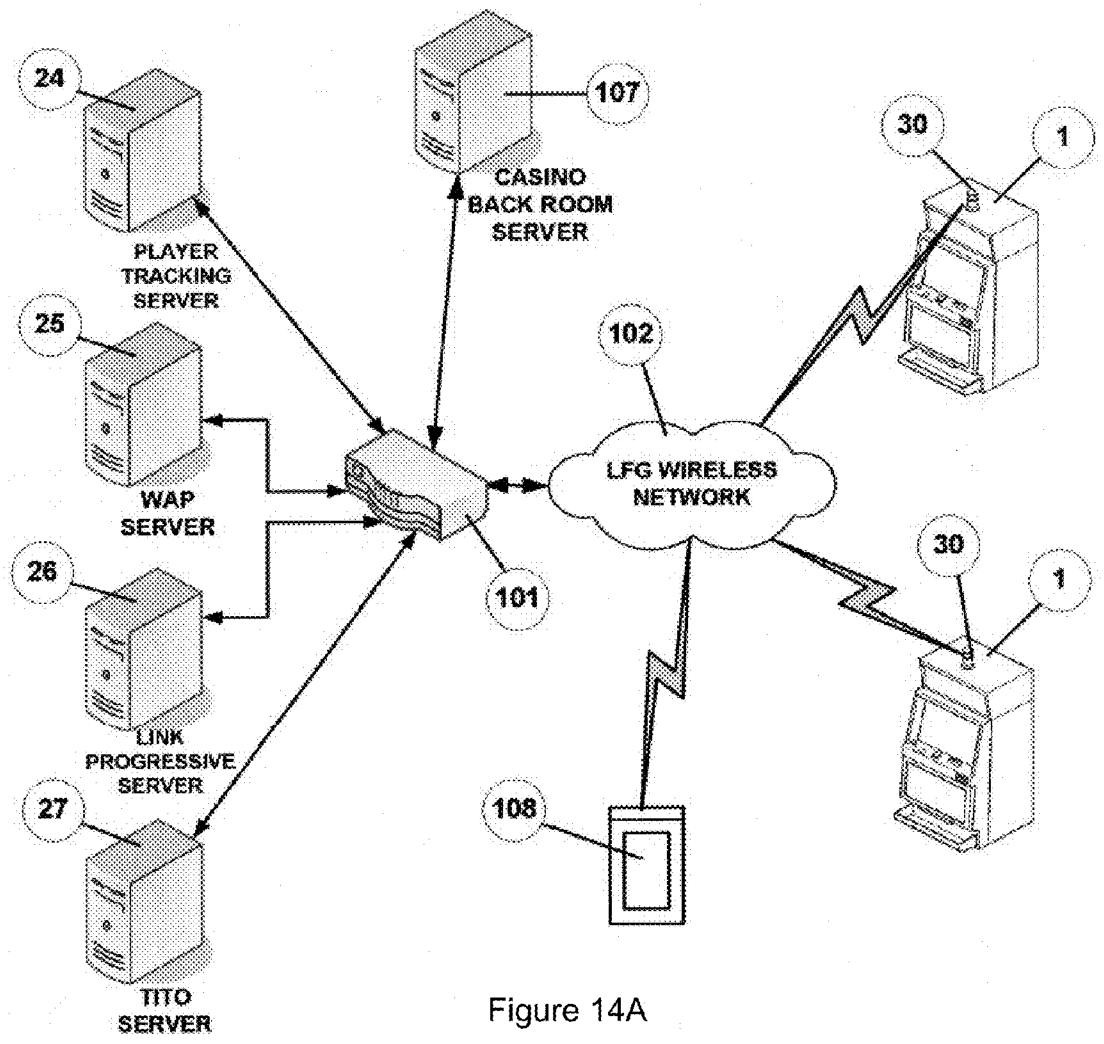
FIGS. 14A and 14B are diagrams that illustrate a gaming system including gaming machines outfitted with candles that wirelessly communicate with servers in accordance with the described embodiments.
Figure 14B:
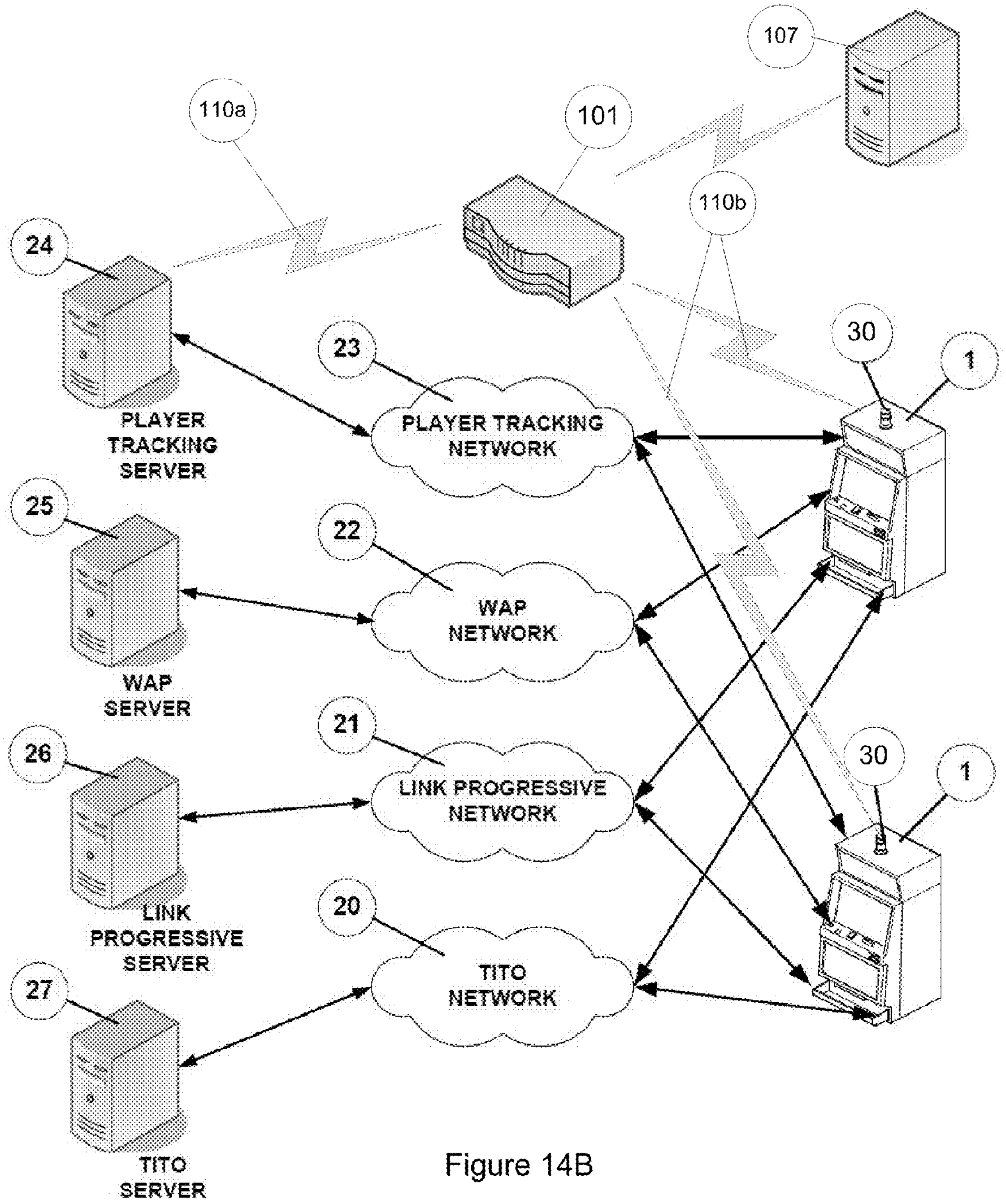

FIGS. 14A and 14B are diagrams that illustrate a gaming system including gaming machines outfitted with candles that wirelessly communicate with servers in accordance with the described embodiments. In one embodiment, the gaming system can include one or more gaming machines, such as 1. The gaming machines can be different models and types supplied by different gaming machine manufacturers. The gaming machines can each be equipped with an embodiment the candles described herein.

In one embodiment, the candles 30 can be configured for wireless communications. Using the wireless capabilities of each candle, a wireless gaming network 102 can be provided. Via the wireless gaming network 102, the wirelessly enabled candles, such as 30, can communicate to a system controller 101. The system controller 101 can be configured to provide similar functions as the wireless control module 34 and the candle control 31 (e.g., see FIGS. 8, 9 and 12).

The system controller 101 can transmit and receive data via the wireless gaming network 102. In one embodiment, the system controller 101 can be configured to de-multiplex/de-encrypt the data stream from the gaming machines equipped with wireless capabilities and send the resultant data streams to the respective gaming system servers. Examples of servers that can receive data streams from the system controller 101 include but are not limited to the player tracking server 24, the WAP server 25, link progressive server and the TITO server. These servers can also communicate with one or more of the gaming machines by routing communications through the system controller.

A few other examples of servers that can be coupled to the wireless gaming network 102 via the system controller 101 can include servers in other gaming establishments, servers associated with gaming regulators, third-party servers, servers providing game downloads and peripheral software updates, security server, servers providing hotel hospitality and lodging information and outside access to servers via the Internet. As an example of a server in another gaming establishment, the system controller 101 can be configured to contact a remote TITO server in another gaming establishment to validate a printed ticket remotely issued outside of the gaming establishment in which the system controller is located and forward the validation information to a gaming machine. As an example of a communication with a gaming regulator, the system controller 101 can be configured to communicate with a gaming regulator to notify the regulator of a regulated change to a gaming machine, such as a change in regulated gaming software on the gaming machine.

Gaming operators can allow third-parties affiliated with a gaming establishment to provide promotional opportunities to players on gaming machines. The system controller 101 can be configured to communicate with a gaming machine to provide a third party promotional opportunity. As an example, via the system controller 101 and the wireless gaming network 102, a ticket can be printed at the gaming machine that allows a discount on a merchandise item or a service provided by the third party. In some embodiments, the tickets can be customized using a format selected by the third party and approved by the gaming operator.

The system controller 101 can be configured to allow a remote server to communicate regulated or unregulated gaming software to a gaming device. Regulated gaming software typically includes logic related to generating a wager-based game on the gaming machine, such as determining an outcome and an associated award. An example of unregulated gaming software may include firmware used by a peripheral device, such as firmware used by a bill validator or printer to report information used for health monitoring, firmware used by a bill validator to detect fraudulent currency or firmware used by a printer to print customized tickets. The system controller 101 can also be configured to transmit and receive verification information that allows a remote server to verify that authentic software has been installed on a gaming device, such as gaming machine.

In one example, the system controller 101 can be configured to communicate with a security server. The security system may receive data from and control one or more surveillance devices within a gaming establishment, such as a casino. In one embodiment, a security event can be detected on a gaming device, such as a gaming machine. For instance, a bill validator can detect that an attempt has been made to insert a counterfeit bill at the gaming machine. The security event can be received at the candle device coupled to the gaming machine.

In response to the security event, the candle 30 can be configured to take one or more still images of a person at the gaming machine. If the candle 30 is configured to generate continuous images that are stored in a buffered memory that is regularly written over, then the candle 30 can be configured to grab video data from the buffered memory at a certain time period prior to when the security event was received and to continue grabbing video data for a certain time. The saved video data can be stored to a memory location that is not overwritten. Via a communication interface on the candle, the saved video can be sent to the system controller 101 and forwarded to a security server. If the candle does not include an image system, the candle can send a security event notification to the security server via the system controller 101.

In response to receiving the video data from camera, which can include still and/or video data, the security server can store the data and make it available. Further, the security server can train surveillance devices it controls on the person. For instance, a security camera with directional controls can be trained on the gaming machine from which the security event originated. Further, the security server can be configured to track the person as they move throughout the gaming establishment, such as from gaming machine to gaming machine.

The security server via the system controller 101 can be configured to activate the cameras on different candles, when such devices are camera-equipped, for security tracking purposes. The security server may be configured to recognize a person as they move to different gaming machine using a pattern recognition process, such as recognizing a clothing pattern or using a biometric-based faced recognition process. Also, a player can be tracked based upon the use of a player tracking card or a printed ticket the player has been issued. In another example, the player can be tracked based upon signals emitted from a mobile device on their person.

In yet another embodiment, the security server can be configured to stitch together camera data from a number of cameras, such as the cameras located on the candles of the gaming machines and/or overhead security cameras. A user perspective can be provided, such as if the person is looking in a particular direction, then the camera data determined to be associated with the selected user perspective can be stitched together from one or more cameras to provide a view associated with the selected user perspective. In one embodiment, the security system may allow a person to perform a real-time virtual walk through of some monitored environment, such as a casino floor, where camera data from different cameras are gathered and stitched together as the person navigates. An advantage of using image data received from a candle is that the image data can provide more of an eye-level perspective than an overhead security camera.

If camera data is archived, then the system can be configured to allow a user to navigate the casino floor at different times. In one embodiment, the time can be fixed, i.e., only use camera data associated with a fixed time. In another embodiment, the system can be configured to calculate a navigation rate through the monitored environment, as if a person were actually walking through the environment. For example, a person can start their navigation at a particular time and then the camera data can be updated in time in sync with their navigation rate. For instance, if it would take a person five minutes to walk from point A to point B, this walking time can be simulated in a virtual walkthrough, such that the historical camera data advances in time with their navigation rate.

Via the wireless gaming network 102, security data received from and possibly generated by the candle on a gaming machine as well as security data generated by surveillance devices to gaming establishment personnel can be viewed remotely. For instance, gaming establishment personnel, such as security personnel, may be able to receive video data or still images on hand-held devices that they carry. The system controller 101 can be configured to track the location of security personnel via their hand-held devices. In one embodiment, the system controller 101 can be configured to locate and notify the personnel that are closest to the location where a security event has occurred of the security event and send the notified personnel relevant data, such as video data.

In other embodiments, the system controller 101 can be configured to allow communications with a hospitality server. The hospitality server may allow information related to entertainment, lodgings and restaurants to be received at a gaming machine and certain actions, such as reservations, services purchases and notifications of upcoming events to be carried out on the gaming machine. The system controller 101 can be configured to allow a connection with a remote server, such as a server on the Internet. For instance, a player may be able to determine an airline status or check their e-mail via a connection established at the gaming machine through the system controller.

Each gaming machine can be connected to a different combination of gaming system servers, such as but not limited to a player tracking server 24, WAP server 25, link progressive server 26, and the TITO Server 27. For instance, a first gaming machine can be connected to only the casino back-room server 107 while a second gaming machine can be connected to the player tracking sever 24 and the TITO server 27. The system controller 101 can be configured to allow different gaming machines to receive different data streams depending on a current server connection configuration. A current connection configuration for a particular gaming machine, such as adding a new connection to a server or removing a current connection to a server can be implemented via operator communications with the system controller 101.

The system controller 101 can be configured to provide the multiplexing of the data streams from the gaming system servers and then encrypt the resultant data stream before transmitting. The data streams can be encrypted to prevent tampering and misuse of any data sent in the data streams. The wireless gaming network 102 may use one or more common wireless technologies such as Zigbee, 802.11 a/b/g/n, and 3G/4G. Also, optical transmission technologies, such as IR and laser, can be utilized alone or in combination with other transmission technologies. In other embodiments, power-line transmission technologies or other wired communication technologies can also be utilized alone or in combination with one or more different wireless technologies as part of a gaming network.

Existing gaming systems typically use some form of a protocol stack. There are standard gaming protocols, such as S2S, G2S developed by the Gaming Standards Association (GSA) and SAS developed by IGT as well as many other proprietary protocols used in the gaming industry. The protocols are used by gaming systems, such as a player tracking system or a TITO system, to communicate data between the gaming machine and servers across a network. The gaming systems may also use encryption to protect data in transit. All of the gaming system's protocols and encryption techniques must be tested and approved by a gaming test lab and/or gaming control board to operate in their jurisdictions. In order to maintain integrity and security it is important not to tamper with or change the data streams of these gaming systems. The gaming system including the system controller 101, the wireless network 102 and candles 30, can be configured to provide a non-intrusive technique to transmit and receive the data provided by these various systems, i.e., without a modification to an existing protocol that would require additional testing and approval.

Casino and lottery operators wish to enhance entertainment and promotional value to the gaming machines and other gaming devices on the casino floor for their players. Due to the jurisdictional restrictions placed on game programs and machines due to gambling laws and the cost of program changes, if even possible, it is very difficult to provide active and real time changes to entertainment and promotional features. The gaming system described herein including communications devices, such as the candles 30, the wireless network 102 and the system controller 101, can be used to solve this problem. Using the gaming system, a casino operator can have the ability to deliver entertainment and promotional value to the player without the need to change game program code, such as regulated gaming software, on the gaming machines or the system servers, such as the player tracking 24, the WAP 25, the link progressive 26 or the TITO 27.

In yet another embodiment, a back room server 107 and a gaming table 108 can be added to the system. The back room server 107 can be used to provide some of the real time changes to the entertainment, informational and promotional opportunities available on a gaming machine, such as 1, or on a gaming table, such as 108. For instance, promotional tickets can be printed at gaming tables and gaming machines in a dynamic manner using the back room server 107. As another example, tournaments or other group games can be provided using the back room server 107.

In one embodiment, a back room server 107 can be configured for candle control and providing real time changes opportunities at a gaming machine or table. This functionality can be provided without changing some existing components of a gaming establishment's network infrastructure. For example, a system controller 101, wireless network 102 and wireless communication devices, such as candles 30, can be provided without altering the communication connections used by one or more gaming systems, such as a player tracking system 24, a WAP system 25, a link 26 progressive system and/or a cashless system including a TITO server 27. An example of such a system configuration is shown in FIG. 14B.

In FIG. 14B, a wireless gaming system including the system controller 101, a back end server 107 and candles 30 on each gaming machine 1 is shown. The wireless communications can be configured in a wireless network, as discussed with respect to FIG. 14A and various wireless communications can be generated. For instance, the system controller, using the wireless network, is shown wirelessly communicating 110*a* with the player tracking server 24, wirelessly communicating 110*b* with each gaming machine and wirelessly communicating with back room server 107.

In this example, existing gaming system networks, i.e., the TITO network 20, the link progressive network 21, the WAP network 22, the player tracking network 23 remain unmodified and do not use the wireless gaming network. In various embodiments, each of the existing system networks can be added to the wireless gaming network in a serial manner. For instance, first the player tracking network 23 can be converted to wireless communications while the other networks remain unchanged. Then, the TITO network 20 can be converted to wireless communications while the WAP network 22 and the link progressive network 21 are not changed. The order and number of existing networks that are converted to wireless communications can be decided by a casino operator.

With respect to FIGS. 13, 14A and 14B, the use of a wireless device, such as a candle, installed on a number of gaming machines was described. The candles can be used to create a wireless gaming network. In particular embodiments, the wireless gaming network can be used to simplify the network infrastructure associated with one or more existing wired networks connected to the gaming machines. The one or more existing wired networks, such as a player tracking network, a WAP network, a link progressive network and a TITO network primarily involve communications with the game controller on the gaming machine. In other embodiments, the wireless gaming network can be used to transmit communications involving other peripheral devices on the gaming machine. In some instances, these communications with the peripheral devices can be carried out independently of the game controllers, i.e., the gaming controllers are not involved in the communications. A few examples of these communications involving peripheral devices are described with respect to FIG. 15A as follows.

Figure 15A:
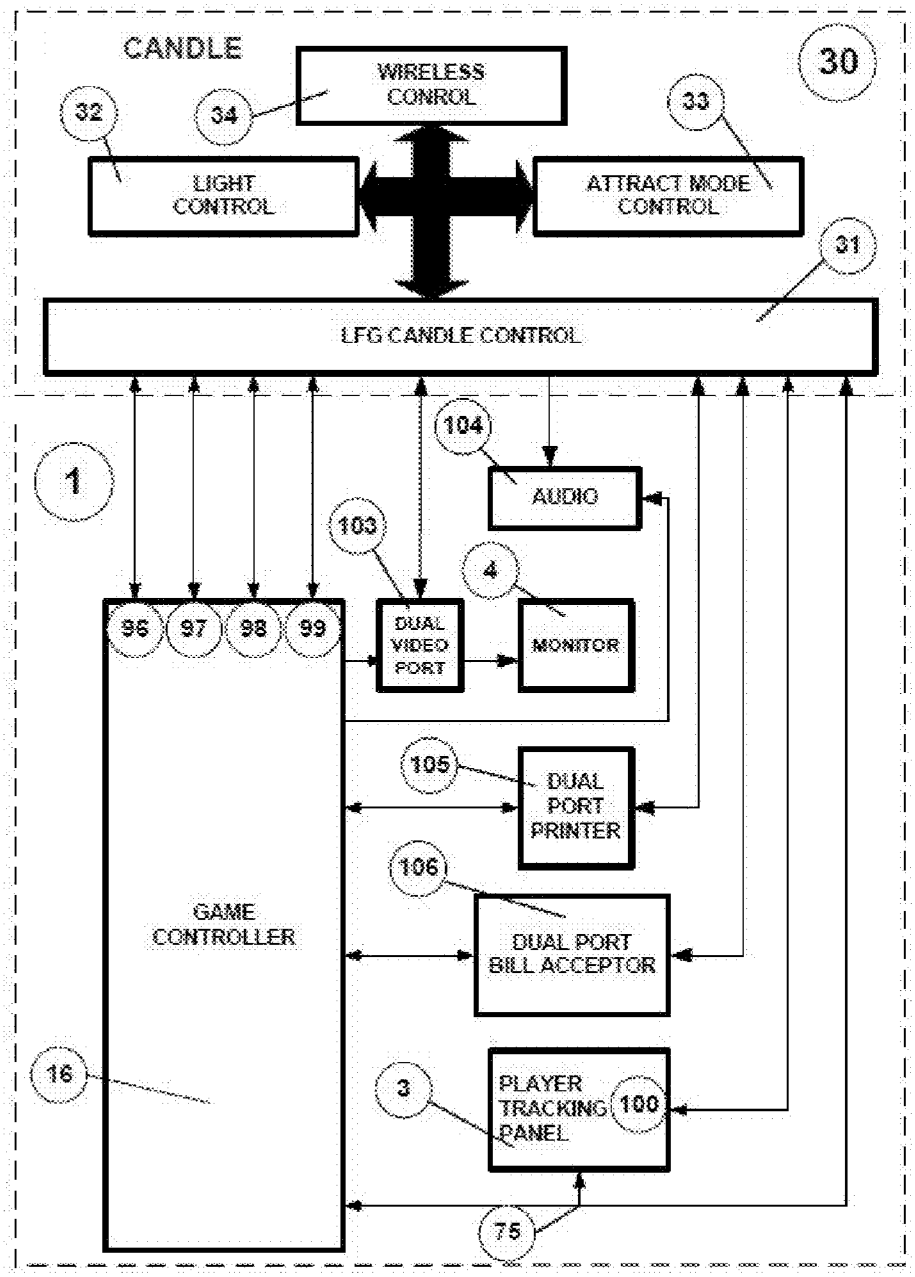
FIG. 15A is a block diagram that illustrates the interface of a candle and gaming machine in accordance with the described embodiments.

FIG. 15A is a block diagram that illustrates the interface of an embodiment of candle 30 with a gaming machine. The embodiment in the block diagram of FIG. 15 shows the optional elements of a dual-port bill acceptor 106, a dual-port printer 105, dual video port 103, a dual port audio system 104, and a monitoring connection 75 of the player tracking panel 3. Dual port capability can be used to provide a non-intrusive method of maintaining system integrity and provide additional gaming features including promotional opportunities using embodiments of the gaming devices, such as the candle devices described herein.

In a dual port device, a first port can be used to provide the existing communication peripheral interface from the gaming machine. The game controller and the peripheral device can communicate via the first port in a manner fixed by the use of regulated gaming software by the game controller and regulated software and/or firmware used by the peripheral device. The second port can be used to provide an enhanced interface with the candle 30. The second ports on the dual port devices may be connected to the candle 30 via an appropriate interface, such as via the Special 1, 2, 3 I2C, and Serial2 ports shown on FIG. 9. The candle 30 can be configured to receive commands and/or data from remote devices that are sent to the dual port devices via the second port. Further, the candle 30 can be configured to receive data from the dual port devices that are sent to one or more different remote devices via the candle 30.

The dual-port bill acceptor 106 can be configured to read tickets (TITO) and paper currency and communicate this information on the first port, which is controlled by the regulated game program. The dual-port bill acceptor can also be configured to read special promotional tickets and communicate this information on the second port to the candle 30. In addition, the dual-port bill acceptor can provide cash and operational information to the casino operator on the second port to the candle. The candle 30 can be configured to send this information received from the bill acceptor to a remote device. JCM (Las Vegas, Nev.) is one example of a manufacturer that provides dual-port bill acceptors.

In one embodiment, a bill acceptor, such as a dual-port bill acceptor 106, can be configured to take an image of a front, back or both sides of tickets or bills accepted in the bill acceptor. The bill acceptor can be configured to store one or more of these images. In one embodiment, the bill acceptor can include enough memory to store all of the bills and/or tickets that can fit in a cash box associated with the bill-acceptor.

In a particular embodiment, the image data can be stored with a time stamp. The clock used for the time stamp can be synchronized or shared with other timing devices on the gaming machine. For instance, a camera on the candle 30 and the camera on the bill acceptor can both time stamp image data using synchronized clocks or shared clocks.

In particular embodiments, the bill acceptor, such as 106, can be configured to regularly send image data, via the candle 30, to a remote device, such as a remote server. The image data may be sent on a transaction-by-transaction basis, such as each time an attempt is made to enter a bill or ticket into the device whether it is accepted or not accepted. In another example, the image data for a number of transactions can be stored and then a number of transactions can be uploaded as a batch to a remote device. Batch uploading can be the default mode unless a security event is detected in which case the transaction for which the security event has been detected can be immediately uploaded.

In yet another example, the bill acceptor can be configured to store image data for a certain number of bills or tickets in a memory that is regularly over-written but not uploaded. Only tickets or bills for which a security event is detected may be uploaded to a remote device. The images associated with security events can be stored to a memory that is not over-written.

In yet other embodiments, the images stored on the bill acceptor and/or uploaded to a remote device can be used for dispute resolution purposes. A regular dispute that can occur is that a player says that he received fewer credits than warranted by a bill that was inserted into the bill acceptor. For instance, a player can say a $20 bill was into the bill acceptor but only received credits for a $5 bill.

To resolve this dispute on a gaming machine, a gaming machine door is opened and then a cash-box can be removed. The cashbox can include a window that allows the last bill that was accepted to be viewed. Thus, the dispute can be settled. In embodiments described herein, the image data stored on the bill validator and/or a remote server can be retrieved and then displayed to the player. In one example, the image data can be displayed to a hand held-device carried by a casino employee. In another example, the casino data can be displayed to a display on a gaming device, such as a main or secondary display on a gaming machine. For instance, using the dual video port 103, image data can be retrieved from the bill acceptor and/or a remote server by the candle 30 and then output via the dual-port video 103, which is described in more detail below.

One or more bills that have been accepted can be displayed, such as the last bill accepted, the second to the last bill accepted, etc. The candle 30 or a remote device can include logic that allows a user to browse through a sequence of bills. If camera data is available, such as camera data generated from a camera on a candle (e.g., see FIGS. 3 and 4), then this image data can also be displayed. For example, an image of the player prior, during and/or after inserting the bill or ticket can be displayed with appropriate time stamps that are synced with the time stamps associated with the image data obtained from the bill validator. The combined image data can be used to settle the dispute.

One advantage of this approach is that disputes can be settled without accessing the cash box within the gaming machine. Thus, the gaming machine door does not have to be opened. Further, the cash box can be manufactured without a window that allows the top bill in the stack to be view. Another advantage is that a user can look deeper into the stack without removing bills or tickets from the cash box because a sequence of bills and/or tickets that have been received can be potentially accessed.

In another embodiment, a bill acceptor, such as 106, can be configured to perform a real-time currency conversion. For instance, a gaming machine can be configured to operate on U.S. dollars but accept other foreign currencies. When a foreign bill is detected and authenticated, the bill validator can be configured to request an amount to be credited to the gaming machine. The candle 30, in conjunction with a remote server, can be configured to get a current currency conversion rate, and then determine a credit amount, which can be sent to the game controller 16 and then credited on the gaming machine.

The dual-port printer 105 can be configured to print tickets (TITO) provided by data on a first port, which is controlled by the regulated game program, or special promotional tickets provided by data on a second port. The promotional tickets can be customized and regularly updated. In one embodiment, the tickets can be personalized based upon an identification of a player at the gaming machine. In addition, the dual-port printer can be configured to provide operational information to the casino operator on a second port. Future Logic (Glendale, Calif.) is one example of a manufacturer of dual port printers.

Dual-port video provides picture-in-picture (PIP) capability. Video data can be transmitted from the candle 30 and superimposed as a PIP on the game machine monitor. In one embodiment, the video can be transmitted via a USB interface. The PIP can be used by the casino operator to provide real-time or stored video information for the player. The PIP can be placed anywhere on the monitor screen, so no important game display is covered, which is controlled by the game program. This feature can be important for a video slot machine.

Further, the candle 30 can be configured to monitor a state of the gaming machine and based upon the state determine if it is "safe" to use certain portions of the monitor screen, such as the monitor screen of a video slot or video poker machine. For instance, if the gaming machine is in an attract state or an idle state and one of these states is detected by the candle, then, the candle may be configured to utilize a different portion of the monitor screen, such as the entire monitor screen, than when the gaming machine is in a game state and a game is being generated on the monitor screen.

In another embodiment, as described with respect to FIG. 11B, control of the monitor screen can be handed to the monitor screen by the game program. For instance, the game program may allow the candle 30 to display a bonus game presentation on the monitor screen. The video data for the bonus game presentation can be output via the second port on the monitor screen. As described above, using the candle 30 in this manner can allow a portion of the content associated with a game, i.e., bonus game presentations, to be regularly updated on a gaming machine without changing the regulated portion of the gaming software.

The audio channel on the dual port audio system 104 can be used to provide the ability to use the existing game machine audio speakers to provide voice and audio for the player that is not part of the game program. Further, the second port can be used to provide audio that is part of a bonus game presentation as described in the previous paragraph. The player tracking monitoring port can be used to provide non-intrusive monitoring of the player tracking data to provide player ID information for the casino operator. In one embodiment, this data can be utilized by the candle 30 to provide custom content to a player. For instance, the player ID data can be used to target a personalized promotional opportunity selected based upon known information abut the player. The personalized promotional opportunity can include a custom ticket that is printed by the printer. The customized ticket can include custom graphics and player identification information, such as the player's name.

In particular embodiments, when a dual port device, such as the bill acceptor 106 includes regulated software, such as regulated firmware, the regulated software can be decoupled from other software on the peripheral device. The regulated portion of the software may govern interactions between the peripheral device and the game controller 16. Changing the regulated portion of the peripheral software typically requires a lengthy approval process.

The non-regulated portion may involve interactions that do not involve the game controller 16 and thus, a gaming control board may allow this portion of the software to be updated without regulatory approval or under a much less stringent approval process. In various embodiments, the unregulated or less regulated portion of the peripheral software can be updated via the candle 30. For instance, if a new fraud detection algorithm is needed, such as to detect a new type of counterfeit currency, then the new detection algorithm can be downloaded to the bill acceptor via the second port of the dual port bill acceptor.

Hopefully, the new fraud detection algorithm can be implemented without a lengthy approval process, allowing the new algorithm to be quickly deployed to the bill acceptor. The deployment of new bill acceptor software can be carried out via the wireless game network previously described, such as with respect to FIGS. 14A and 14B. The second port can also be used to update the regulated software on the peripheral device. However, it is likely that these updates will be less frequent because of the lengthy approval process.

In one embodiment, the candle controller can be configured to communicate with a chair (not shown) coupled to the gaming machine. The chair can include its own controller and peripheral devices, such as speakers, components that generate vibrations and/or lights. The chair can include an antenna and a wireless interface for communicating with the candle device 30.

The additional capabilities afforded by the candle 30, such as the candle 30 in conjunction with the dual port devices, can allow a number of different enhanced gaming features. The enhanced gaming features can involve the use of a back-room server in communication with the candle 30. Some of the functions that can be performed by a back end server are described with respect to the next figure.

Figure 15B:
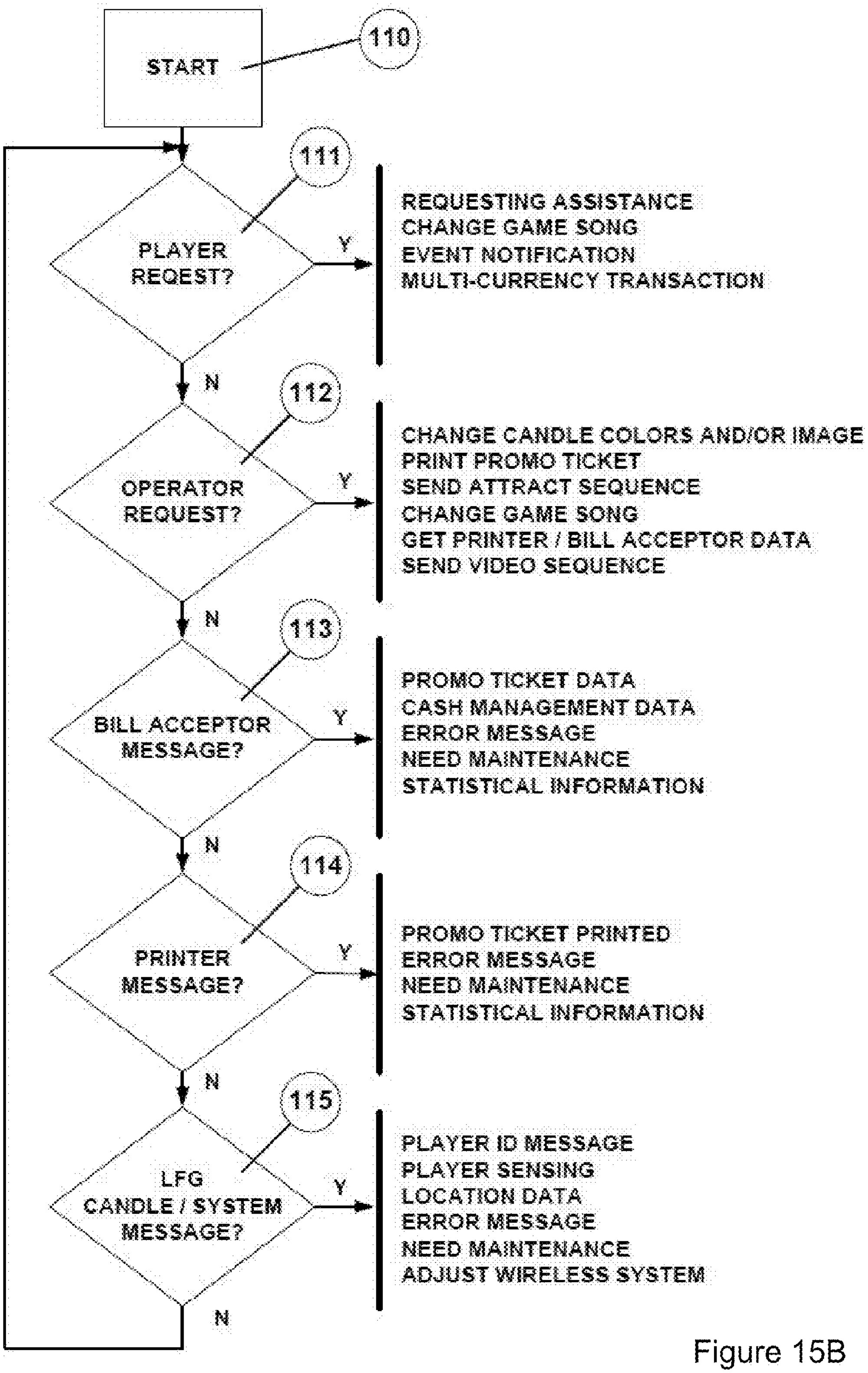
FIG. 15B is a flow diagram of a method implemented on a server in wireless communication with a number of gaming machine via candles installed on the gaming machines in accordance with the described embodiments.

FIG. 15B is a flow diagram of a method 110 implemented on a server in wireless communication with a number of gaming machine via candles installed on the gaming machines. For instance, the method can be implemented on server 107 shown in FIGS. 14A and 14B. In 111, a player request can be initialized at a gaming device by a player. This request can be received by the server. For instance, to initialize a request, a player may depress the "help" button on a player input panel on the gaming device (e.g., see player input panel 5 in FIG. 19). As another example, the player can depress a button on the player tracking unit. In yet another embodiment, the player may be able to press an input button on a personal device, such as a cell phone. As described above, a wireless peripheral 64 can be located on a device, such as a candle, and then can communicate with a cell phone, which is described with respect to FIGS. 6B and 11A. In yet other embodiment, the candle may be enabled to receive input signals from a controller or a joy stick. In yet other embodiment, using a camera on the candle injunction with object recognition software, the candle may be able to receive input via hand gesture by a player or via the movements of a particular object held by the player, such as a placard in a particular shape.

The candle controller can be configured to detect a request for an action and in response send a message to a remote server. In one embodiment, the candle controller can output to a display device on the gaming machine a menu of options from which a player can select. In another embodiment, the candle controller can output a menu of options to a player's personal device, such as their cell phone. In particular embodiments, the menu of options may allow a player to 1) request an attendant (e.g., hand-pay, dispute resolution, refreshments, gaming machine malfunction, security issues, etc.), 2) request a new game song (In one embodiment, the game song can be output via the dual-port audio 104. See FIG. 13), 3) ask for event notification such as a promotional event or a casino entertainment event and 4) request a foreign currency exchange. Other requests are possible and these examples are provided for the purposes of illustration. In response to receiving the request, the server can generate an appropriate response. The response can include such actions as locating and sending a request to a nearby attendant to go to a particular gaming machine, changing a candle status, retrieving and sending the requested song, determining an exchange rate, notifying security and retrieving requested event information.

A casino operator, i.e., an employee of a casino, can initiate operator requests 112 that are generated on a server. For instance, via a server interface, an operator may input commands to initiate actions on the server, such as 107 (See FIGS. 14A and 14B). As another example, an employee can input commands from a device on the casino floor, such as a hand-held device to initiate one or more actions on server. In particular, the server can be configured to receive an initiation of an action from a hand-held device carried by an operator. A few examples of actions that can be initiated by an operator request to the server are described as follows.

In one embodiment, the server can send commands to one or more candles at a time. The commands can be related to candle functions. For instance, the commands can be related to 1) setup of the candle stages including colors for each stage, 2) to begin a graphical animation on the candle, and 3) to start an attract sequence combining audio and images on the candle. The commands can include data, such as sound and video data that are used to implement the command, such as audio and/or video data used in an attract sequence.

In another embodiment, a command can be sent to the candle related to another gaming peripheral on a gaming machine. In response to receiving the command, the candle can operate one or more gaming peripheral located on the gaming machine. The gaming peripherals can include devices, such as printers, bill acceptors and card readers that are separate from the candle.

As examples, the server can send a command to the candle to print a promotional ticket. The command can include data such a unique identification number that can later be used to validate the promotional ticket. In response to receiving the command, the candle can convert the command into a series of instructions that are understood by a printer, such as a dual-port printer (e.g., see 105 in FIG. 15A), that allow the printer to print a promotional ticket for the player. When the printer is finished, it can update the candle, which can then update the server.

In another example, the server can send a command to the candle asking for certain for certain data from the gaming peripheral. In response, the candle can interpret the command and send a command to the targeted gaming peripheral. For instance, the candle can send a request to the bill acceptor 106 and/or dual-port printer 150 in a specific gaming machine to send informational data. In one embodiment, the informational data can be used for the purposes of device health monitoring. Via the device health monitoring, an intelligent maintenance schedule can be established for these devices. An intelligent maintenance schedule can be based upon status information received from a device over time as opposed to a maintenance schedule developed independently of the device status. An intelligent maintenance schedule may help to avoid unneeded maintenance of a device.

In yet another embodiment, the server can send commands including video data to the candle. The candle can send instructions that allow the video data to be played a display on the gaming machine, such as the gaming machine's main monitor 4 on a video gaming machine or a secondary display on a mechanical reel based gaming machine. In one embodiment, the video data can be output via a display with a dual-port video port 103 (see FIG. 15A).

In other examples, in response to receiving a command from the server, the candle can be configured to control multiple peripheral devices. The peripherals devices can be located on the candle or on the gaming machine, separate from the candle. For instance, in response to a command from the server, such as a command to provide a bonus game, the candle can output video on the gaming machine's main display, instruct the printer to print a ticket, and instruct lights on the candle to flash and emit sounds via a speaker coupled to the candle.

In yet other embodiments, the candle may forward commands and data to particulars devices without interpreting the commands. For instance, a server can send commands and/or data to a printer that are understood by the printer and do not require interpretation by the candle. Further, the candle can receive responses from various devices related to commands sent by the server. For instance, a printer can acknowledge when a ticket has completed printing. Then, the candle can forward the response received from the printer to the server, such as by encapsulating it in an electronic envelope associated with a particular protocol and addressed to the server, without interpreting the response.

In 113, bill acceptor messages automatically generated by a bill acceptor, such as a dual-port bill acceptor 106 (e.g., see FIG. 15), can be received at the server. The messages can be sent to the candle from the bill acceptor on a gaming device and then transmitted to the server. The messages can provide important data for the casino or bill-acceptor manufacturer, which may not be provided by the common gaming system. A few examples of information that can be received at the server include information related to 1) promotional tickets accepted, 2) cash management, 3) error messages, 4) maintenance needs (e.g., a cash box that needs to be emptied) and statistical information (e.g., percentage of tickets and/or bills rejected).

In 114, printer messages, automatically generated by a printer, such as a dual-port printer (see FIG. 15A), can be received at the server. The messages can be sent to the candle from the dual-port printer and then transmitted to a server, such as back-room server 107 in FIGS. 14A and 14B. These messages can provide important data for the casino or printer manufacturer, which may not be provided by the common gaming systems. For instance, the server can receive information related to 1) promotional tickets printed, 2) error messages (e.g., printer jam), 3) maintenance needs (e.g., paper refill) and 4) statistical information.

In 115, the server can receive messages receive messages generated from one or more candles and/or system controllers, such as 101 (see FIGS. 14A and 14B). The messages may contain information related to 1) a player ID data from the detect 50 component, 2) player sensing or identification from a sensing peripheral, such as 66, 3) request for a new location search to locate a gaming machine that might have been moved, which can be done when a system controller, such as 101, detects a change in transmit/receive sensitivity or a coordinate change), 4) error or maintenance associated with a candle and/or system controller, or 5) a request from candle and/or system controller to re-adjust transmitter power and/or receiver sensitivity of the wireless network and/or a candle.

Device Monitoring, Data Collection, Reporting, Error Detection and Response

As described above, a gaming device, such as a gaming device implemented with a candle form factor (e.g., see FIG. 1), can be configured to interface with one or more peripheral devices on a gaming platform. The gaming device can be referred to as a gaming platform enhancement module (GPEM). The GPEM can be configured to directly interface with peripheral devices that are also configured to directly interface with a game controller used on the gaming platform. Further, the GPEM can also be configured to interface directly with the game controller. As an example (see FIG. 15A), a GPEM and a game controller can be configured to each interface with a common peripheral device with multiple ports, such as a bill acceptor, display, a player tracking panel or a printer.

Using a direct connection with one or more peripheral devices on the gaming platform, the GPEM, can be used to monitor and to collect data from each of the peripheral devices. The peripheral devices can be monitored via polling and/or interrupt methods. The GPEM can be configured to send the data collected from the monitored peripheral devices to a remote device. In particular embodiments, the GPEM can be configured to send or processed data to the remote device.

In other embodiments, the GPEM can be configured, alone or in combination with the remote device (or devices) to provide functions, such as but not limited to, 1) real-time accounting, 2) error detection and 3) error response. The error response can involve the GPEM sending commands to a peripheral device, such as a command to reset the device or a command to power-cycle the device. Details of using a GPEM in this manner are described as follows with respect to FIGS. 16A and 16B.

Figure 16A:
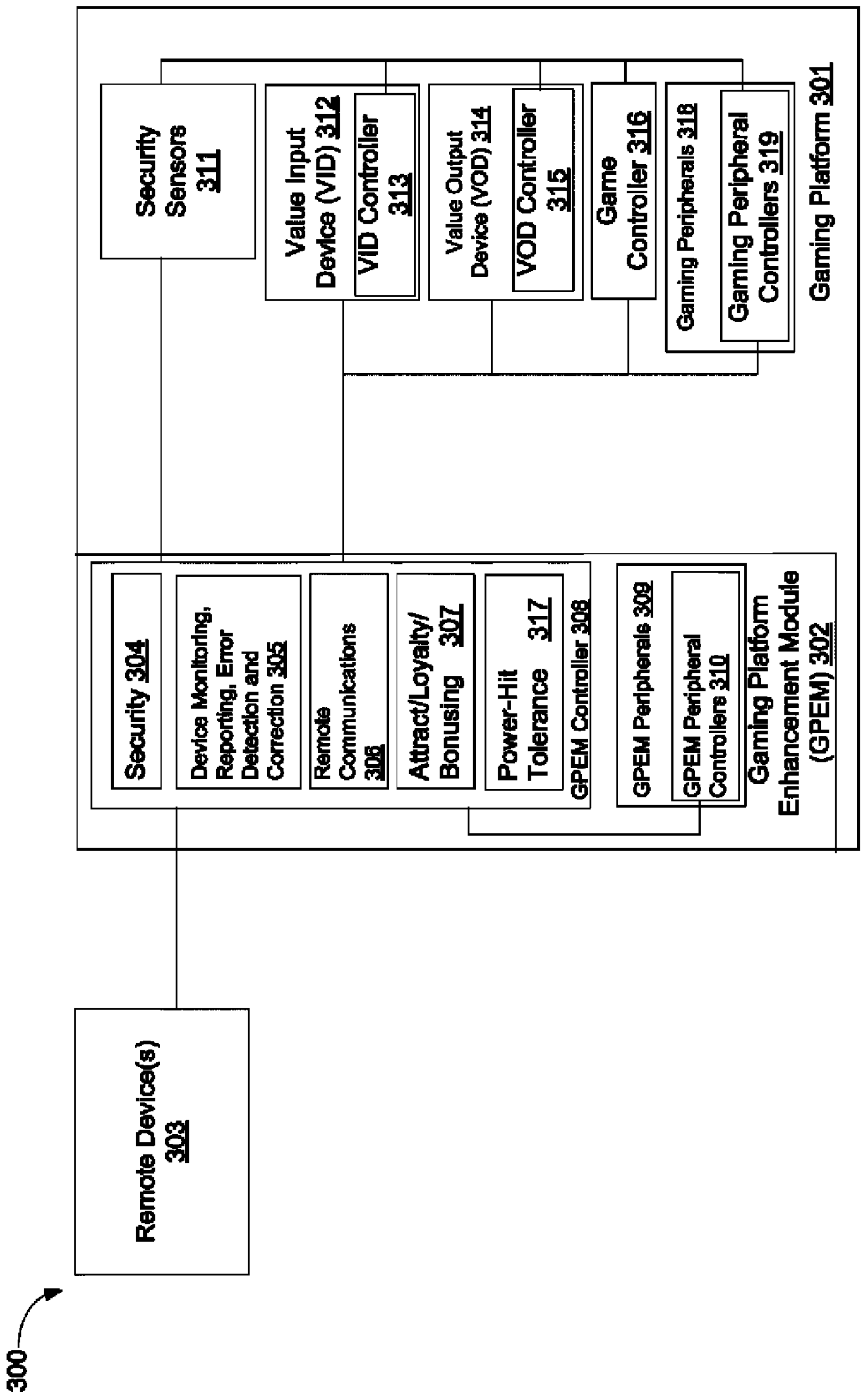
FIG. 16A is a block diagram of a gaming system in accordance with the described embodiments.

FIG. 16A is a block diagram of a gaming system 300 including a gaming platform 301 with a GPEM 302. The GPEM 302 can be configured to communicate with one or more remote devices, such as 303. In one embodiment, the remote devices can be a back-end server or system controller as described with respect to FIGS. 14A and 14B. In particular embodiments, as described above and as follows, the GPEM 302 can be configured as a candle device. Thus, the GPEM 302 can include all or a combination of the functions and features of the candle devices described herein.

The GPEM 302 can include a GPEM controller 308. A number of peripheral devices 309, such as but not limited displays, audio devices, cameras and lighting arrays can be included with the GPEM 302. The GPEM controller 308 can be configured to control the GPEM peripherals 309 via communications with peripheral controllers 310 associated with each GPEM peripheral. In particular embodiments, the GPEM controller 308 can be configured to the control GPEM peripherals in conjunction with commands and/or data received from one or more remote devices, such as 303.

In one embodiment, all or a portion of the GPEM peripherals 309 can be invisible to the game controller 316. When any of the GPEM peripheral devices are invisible to the game controller 316, the controller may not be configured to send commands or instructions to the device. For instance, if the GPEM included an audio device and it is invisible to the game controller, the game controller 316 would not be configured to send commands or data for operating the audio device to the GPEM 302. The game controller would not send commands or data indirectly via communications with the GPEM controller 308 or directly via communications with a peripheral controller associated with the audio device.

The GPEM controller 308 can include a processor and memory that is programmable to perform various functions. The functions can be related but are not limited to 1) security 304, 2) device monitoring, reporting, error detection and correction 305, 3) remote communications 306, 4) attract, customer loyalty programs and bonusing 307 and 5) power-hit tolerance 317. In various embodiments, the functions provided by the GPEM 302 can be modified or changed in response to receiving a download of software and/or firmware from a remote device.

The security 304 functions can be related to monitoring security devices associated with just the GPEM 302, such as security sensors and/or cameras located on the GPEM 302. Further, the GPEM can be configured to monitor security sensors associated with the gaming platform, such as sensors 311 associated with locks on the gaming platform 301.

As described above, the remote communications 306 can involve sending communications from the GPEM 302 to remote devices. In a particular embodiment, the communication can be sent via a wireless communication interface. A communication to a remote device can be initiated or generated by the GPEM controller 308, the game controller 316, a GPEM peripheral controller, such as 310, or a gaming peripheral controller, such as 319. In the instances where the GPEM controller 308 does not initiate a communication, such as communications initiated by the gaming peripherals controllers 310, the GPEM controller 308 can be configured to route the communication to a remote device, such as 303. The GPEM controller 308 can also be configured to receive communications from the remote device 303. The intended recipient of the communication can be the GPEM controller 308, a GPEM peripheral 309, the game controller 316, a gaming peripheral controller 319 or a player tracking controller (not shown).

The attract and bonusing features 307 were previously described above (e.g., see FIGS. 11A and 11B). Loyalty features can involve performing functions associated with a loyalty program, such as player tracking program. In particular embodiments, the GPEM 302 can be configured to perform functions associated with a player tracking unit, such as associating game play on the gaming platform 302 with a particular player, receiving and displaying player identification information and transferring free play credits to the gaming platform 302.

The power-hit tolerance 317 can be used to preserve data in the event of a loss of power or a power fluctuation on the gaming platform 301. As described above, the GPEM 302 can include a back-up power source. In the event of a power failure, the GPEM 302 can be configured to operate with some data storage and communication capabilities using the back-up power source until power is restored to the gaming platform.

As an example, the power-hit tolerance function can be used to preserve data generated from one or more the gaming peripherals 318. For instance, the gaming peripherals 318 can include a bill acceptor that is configured to generate image data of instruments, such as cash or tickets, received at the bill acceptor. The image data can be for cash or tickets accepted by the bill acceptor and moved to a stacker or for cash or tickets processed by rejected by the bill acceptor. The bill acceptor may not be configured to save the image data in the event of a power-failure. However, the image data can be sent from the bill acceptor to the GPEM controller 308 for preservation in the event of a power-hit.

The GPEM 302 can be configured to store some amount of data associated with peripheral device, such as a bill acceptor. The data can be stored in non-volatile memory that is periodically over-written. For instance, a certain amount of data can be stored in a memory area allocated to the peripheral and then after the memory area is full, the GPEM 308 can be configured to start over-writing the oldest data. Prior to the data being over-written, the GPEM 302 can be configured to send the data to a remote device, such as 303, for long-term storage.

In yet other embodiments, the GPEM controller 308 can be configured to monitor 305 various devices associated with the gaming platform 301, such as the gaming peripherals 318, the GPEM peripherals 309 and the security sensors 311. In one embodiment, the GPEM controller 308 can configured to monitor a gaming device proximate to the gaming platform 301, such as nearby signage. The monitoring can involve polling devices for data at regular intervals where the polling is a request for any new data generated by the device. The monitoring can also involve receiving data from a device when an event, such as an error condition, has occurred on the device where the communication of the data is initiated by the device in response to the event rather than in response to a data request from the GPEM controller 308.

In one embodiment, the GPEM controller 308 can be configured to communicate with a value input device (VID) 312 via its VID controller 313 and a value output device (VOD) 314 via its VOD controller 315. The value input devices 312 and the value output devices 314 are gaming peripherals that are used to add or remove value from the gaming platform. Via a VID, value can be added to the gaming platform 301 to allow wagers to be made. Via a VOD, any value remaining on the gaming platform can be removed, such as value accrued via successful wagers, can be removed.

Examples of value input devices can include but are not limited to bill and ticket acceptors, coin acceptors and card readers. Via one or more of the VIDs, a value amount associated with a bill, ticket, coin or card can be added to the gaming platform. Examples of value output devices can include but are not limited to ticket printers, card writers and coin dispensers. Via one or more of the VODs, a value amount can be removed from the gaming platform 301. For instance, a value amount removed from the gaming platform can be associated with 1) a ticket dispensed from a ticket, 2) coins dispensed from a coin dispenser, 3) a value written to a portable instrument, such as a credit card or a hand-held device like a cell phone, or 4) a value transferred off the gaming platform to a remote account via an electronic fund transfer from the gaming platform.

In a particular embodiment, the GPEM controller 308 can be configured to receive data associated with each value input transaction and value output transaction generated on the gaming platform 301. For example, a gaming platform 301 can use a bill/ticket accept as a VID and a printer as a VOD (gaming platforms and other devices can also include multiple VIDs and/or VODs). The GPEM controller 308 can be configured to receive transactional information from the bill/ticket acceptor each time a bill or ticket is accepted and receive transactional information each time the printer prints a ticket that removes value from the platform. The transactional information that is received can include but is not limited to 1) a value associated with the transaction, 2) unique identifiers associated with the transaction, such as a time stamp and identification number assigned to the transaction, 3) device information associated with the VID or VOD, 4) gaming platform information and 5) player information when it is available.

The GPEM 302 can be configured to combine data received from multiple sources. For instance, camera data associated with images generated by a camera on the GPEM 302 when a transaction is taking place can be combined with transaction data from received from a VID or VOD. As another example, the GPEM 302 can receive data from a player tracking unit that identifies a player and transaction data from a VID or VOD, which can be combined into a single transaction record.

The GPEM controller 308 can receive value transaction information 1) via direct communication with the VID or the VOD, such as via a communication with an associated VID controller 313 or VOD controller 315, 2) via an interception of a communication sent from the VID or VOD to another device, such as a communication sent from the VOD or VID to the game controller 316, 3) indirectly via a communication with another device, such as game controller 316 (the game controller can be configured to communicate each value transaction to remote device) or 4) via a combination of 1), 2) and 3) where some of the data received by the GPEM controller 308 can be duplicate value transaction information from different sources applying to the same transaction.

After receiving the transaction information, the GPEM controller 308, can be configured to store and/or process the transactional data. For instance, the GPEM controller 308 can be configured to keep track of the value received and dispensed from the gaming platform based upon information it has received from the VIDs 312 and VODs 314. Further, GPEM controller 308 can be configured to send the raw and/or processed value transaction data to a remote device. The data gathered by the GPEM controller 308 can be used to provide a real-time accounting history including individual value transactions and net values resulting from a summation of the individual transactions.

The real-time accounting history can be sent to other devices. In one embodiment, the GPEM controller 308 can be configured to store some amount of transactional data. For instance, the GPEM controller 308 can be configured to store a day or two worth of transactional data. The stored transactional data can be used to provide in a real-time a snap shot of the accounting that is currently occurring on the gaming platform 301. The GPEM controller 308 can be configured to send this data to another device, such as a hand-held device carried by an operator proximate to the GPEM 302. The hand-held device, such as a smart phone, can include an application that allows the transactional data to displayed and manipulated by an operator of the hand-held device.

In other embodiments, the GPEM controller 308 can be configured to send the transactional data to a remote device where the transactional data can be manipulated and displayed, such as to an operator in a back-room, based upon processing performed by the remote device. The remote device can be configured to display simultaneously real-time accounting data associated with a number of gaming platforms, such as 301. In one embodiment, the GPEM controller 308 can be configured to request and receive an amount of transactional data associated with a gaming platform, such as 301, that has been previously uploaded to a remote device. The retrieved transactional data can be output in some manner, such as output to a hand-held device proximate to the GPEM 302 or output to a display device associated with the GPEM 302 or the gaming platform 301.

The value input and output devices can be considered critical devices in the sense that profitable operation of the gaming platform depends on these devices properly function. For example, if a bill acceptor is broken on a gaming platform and this is the only mechanism for adding value to the gaming platform, then the gaming platform can not generate revenue for an operator. Further, maintaining VIDs and VODs can be a labor intensive process because access to the VIDs and VODs can require a technician to open an interior portion of the gaming platform. Typically, when the interior is opened, the technician is accompanied by security personal. Thus, maintenance of these devices can be very labor intensive.

Currently, unless an error condition that requires a technician to intervene occurs, maintenance schedules on VIDs and VODs on a gaming platform are usually based on average reliability predictions, i.e., every device is treated the same. Therefore, some devices can be scheduled for maintenance when they do not need it while other devices may not receive maintenance when it is needed. As described in preceding paragraph, maintenance of VIDs and VODs can be labor intensive, which is costly to operators. Further, while a device is being maintained, revenues are not generated on the gaming platform, which is also costly. Therefore, scheduling a device for maintenance that does not need it is costly to operators. However, not providing maintenance to device that needs it can also be costly. For instance, a gaming platform with a faulty bill acceptor with a high-rejection rate can lead to lost revenues.

In view of the above, providing methods and apparatus for more precisely scheduling VID and VOD maintenance is desirable. One approach to reducing operating cost can be to more closely monitor VID and VOD performance using the GPEM 302. The GPEM 302 can be configured to gather performance data from one or more VIDs and VODs. The performance data can be to assess in real-time the operating performance of the VODs and VIDs. Based upon the real-time assessment, a maintenance schedule can be determined on a device by device basis rather than using average reliability data. Examples of data that can be gathered from different VIDs or VODs that can be used in a real-time performance assessment are described with respect to the following paragraphs.

As one example, a printer can be monitored. The printer can include sensors that can generate data. For example, the printer can include a 1) printer open sensor that detects when the printer is open, 2) a paper out sensor located within the thermal printer engine that terminates the print operation when paper has run out, 3) a paper low sensor is located in the paper well that determines when the paper stack has some number of tickets remaining (It resets when more paper is added), 4) a platen engaged sensor located on the print head that detects when the printer platen is in use, 5) a paper taken sensor located in the presentation chute that determines when the customer has actually taken the previously printed ticket (it can be used to detect an uncollected ticket), 6) a draw open sensor that detects when printer is open and 7) voltage and temperature sensors associated with the print head and printer motors. The GPEM 302 can be configured to receive data associated with the printer data. Further, the GPEM 302, can be configured to receive error conditions generated by the printer, such as but not limited to a paper jam, bad data, wrong kind of paper or paper installed incorrectly, buffer overflow (bad communication between host and controller), voltage out of range, temperature out of range, print head problem and paper out.

The GPEM 302 can send the collected data to a remote device. In particular embodiments, the GPEM 302 and/or the remote device can be configured to analyze the collected data and determine an operating performance of the printer. Based upon, the assessed operating performance a maintenance schedule can be determined for the printer.

In one embodiment, the operating performance of the printer can be assessed based upon data collected from other devices. For instance, a ticket acceptor can include a camera that images collected tickets. The GPEM 302 can collect the image data when the ticket generated by printer associated with another gaming platform is received in the bill acceptor on the gaming platform 301. Based upon the image data, it may be possible to identify the gaming platform at which the ticket originated. Then, the remote device can be configured to analyze the print quality associated with the printer that generated the ticket. Based upon the determined print quality, a maintenance schedule can be determined for the printer.

In another example, the GPEM 302 can be configured collect data from a bill acceptor. Common problems with bill acceptors include a high rejection rate and a failure to detect fraudulent bills. The bill acceptor can be configured to scan image data of bills or tickets it receives. The received bills or tickets can be accepted an moved to a stacker or rejected and expelled from the bill acceptor. The image data can be sent to the GPEM 302 and stored in a non-volatile memory. It can also be forwarded to a remote device. The image data can be analyzed for fraud detection purposes. For instance, if an attempt is made to pass a counterfeit bill, it may be possible to identify it based on the image data and then possibly identify the person that attempted to pass the bill.

The GPEM 302 can be configured to receive information from the bill acceptor that can be used to assess an acceptance rate of the device. A bad acceptance rate can result from such factors as a dirty transport path, wrong software or an old version of software or a sensor lens problem. Based on the acceptance rate and possibly an analysis of image data of instruments accepted by the bill acceptor, it may be determine a cause of the bad acceptance rate and determine a possible remedy, such as a new download of software or sending a technician to clean the device.

Besides receiving acceptance/rejection data, the GPEM 302 can be configured to other information associated with the bill acceptor such as but not limited to 1) whether a motor continues to run beyond when it is supposed to run, 2) a motor drive failure, 3) an indication of jam, 4) an indication of a CPU failure, 5) an indication of a dip switch failure, 6) an indication of an insertion error (Crooked insertion), 7) an indication of a magnetic pattern error (Center), 8) an indication that while idle, a sensor other than the entrance sensors detected something, 9) an indication of a data amplitude error, 10) an indication of a feed error, 11) an indication of a denomination assessing error, 12) an indication of a photo pattern error (Marks, tears etc), 13) an indication of a photo level error (Sometimes caused by double notes or dirty bills), 14) an indication a bill was detected in the transport assembly at the wrong time, 15) an indication of a length error, 16) an indication of a color pattern error, 17) an indication of that a stacker is full, 17) an indication a stacker is open, 18) an indication of jam in the stacker or jam in the acceptor, 19) an indication of a stack motor failure, 20) an indication of a transport (feed) motor speed failure, 21) an indication of a transport (feed) motor failure, 22) an indication of a cashbox not ready, 23) an indication that a validator head is removed or wrong type is installed, 24) an indication of a Boot ROM failure and 25) an indication of an external ROM failure, 26) an indication of a ROM Failure.

In particular embodiments, the GPEM 302 can be configured to monitor a card reader. The card reader error rates can be an indication of whether a card reader needs maintenance. Some examples of information that a GPEM 302 can receive from a card reader can include but is not limited to 1) an indication of an un-defined command, 2) an indication that it cannot execute command, 3) an indication that hardware is not present, 4) an indication of a command data error, 5) an indication a card has not been read yet, or other errors and 6) an indication of an abnormal power condition.

Figure 16B:
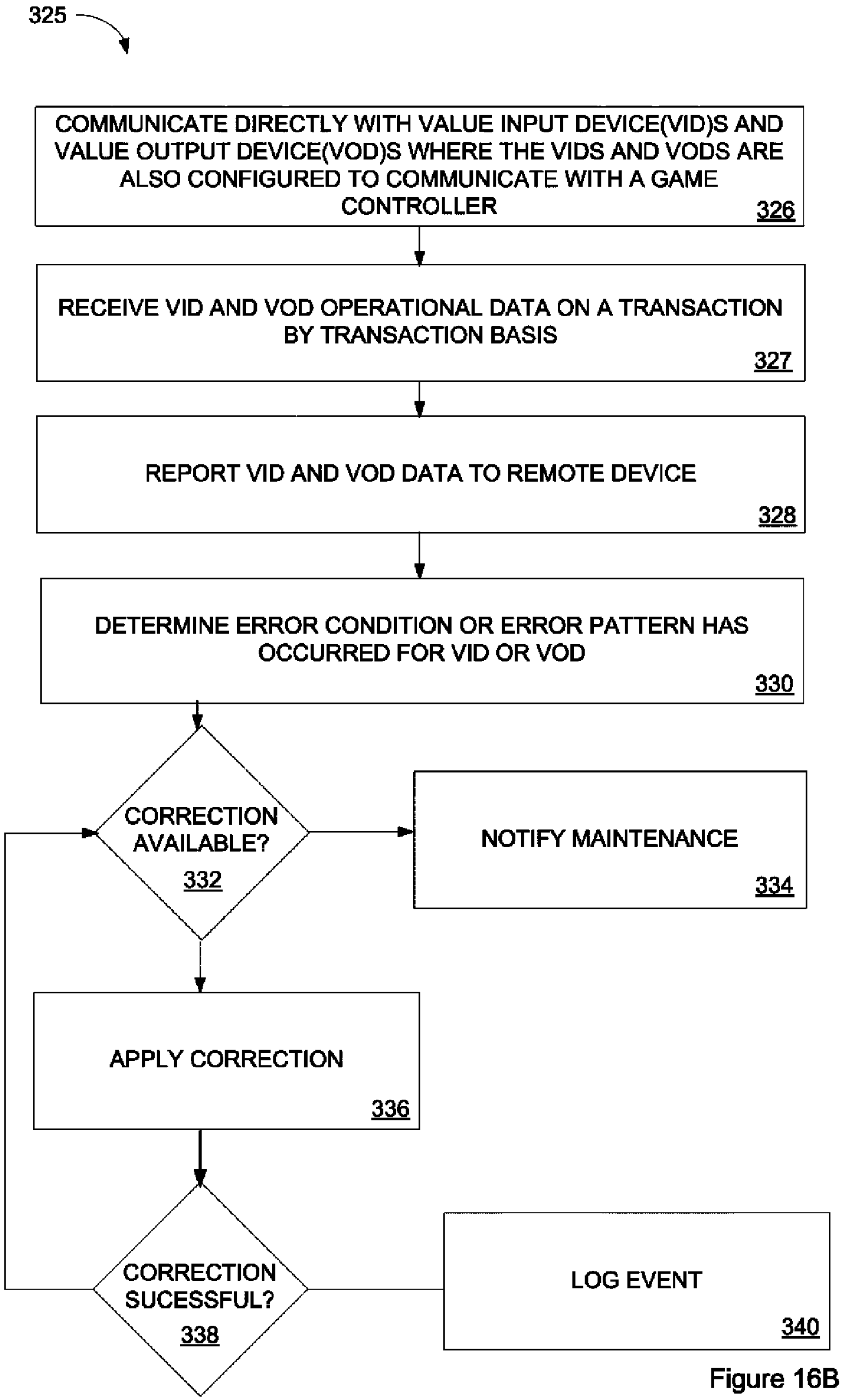
FIG. 16B is a flow chart of a method of operating a gaming platform in accordance with the described embodiments.

Next a method of operating a gaming platform is described. The method can utilize some of the information described above to operate a VID or VOD on the gaming platform. FIG. 16B is a flow chart of one embodiment of the method 325. In 326, the GPEM can be configured to communicate directly with VIDs and VODs on a gaming platform. The VIDs and VODs can also be configured to communicate with a game controller on the gaming platform.

In 327, the GPEM can receive VID and/or VOD operational data on a transaction by transaction basis. For instance, each time a bill or ticket is inserted into a bill acceptor, a card is inserted into a card reader or a ticket is printed from a ticket operational data can be generated. Further, operation data can also be generated between transactions. For instance, a motor problem or a temperature problem can occur while a device is idle between transactions. In 328, the GPEM can optionally report VID and VOD data that is have received.

In 330, based on the received data, the GPEM and/or a remote device can be configured to determine whether an error condition or error pattern has occurred. In some embodiments, some error conditions and pattern recognition can be handled by the GPEM while other error conditions and pattern recognition can be handled by the remote device. In other embodiments, the error conditions and pattern recognition can be handled solely by the remote device. An example of pattern recognition could be the determination of an unacceptable rejection rate or change in the rejection rate over time by a card reader or a bill acceptor or unacceptable amount of paper jams in a printer over some time period.

Based on the detection of the error conditions or error pattern, the GPEM and/or the remote device can be configured to take a corrective action. In 332, the GPEM and/or remote device can check whether a corrective action is available for the detected error condition. Examples of a corrective action could be a power-reset of the device, a reboot of the device, a download of new software or an actuation of component, such as motor to clear a jam or other obstruction. In 336, when a corrective action is determined to be available, the corrective action can be carried out. For instance, the remote device or GPEM can send a command to the VID or VOD to reboot or power-cycle itself.

In one embodiment, multiple corrective actions can be available to fix an error condition or an error pattern. For instance, solutions to a high rejection rate to a bill acceptor can involve such factors as 1)downloading new software, 2) adjusting an operational parameter device such as a speed at which the device pulls a bill or ticket past the sensors, 3) cleaning one or more parts of the bill acceptor or 4) recalibrating one or more sensors on the bill acceptor. The GPEM and/or the remote device can be configured to implement the corrective actions in a particular order.

In one embodiment, the GPEM and/or remote device may attempt to first implement correction actions that can be accomplished without involving a maintenance technician and then implement corrective actions that require a maintenance technician. In another embodiment, the GPEM and/or remote device can be configured to implement first corrective actions that take less time versus a corrective action that takes a longer time. For instance, a power cycle and a software download may be corrective actions to an error condition or an error pattern. The power cycle may take less time than a software download. Thus, the GPEM and/or remote device can be configured to implement the power cycle first and then the software download.

In another example, if a particular sensor needs cleaning, recalibration or is slightly off in its readings, the GPEM and/or remote device can attempt to first compensate for the dirty sensor by adjusting the software/firmware on the VID or VOD to account for the state of the sensor. For instance, an acceptable range of values associated with a sensor can be adjusted. The software/firmware may be downloadable without involvement of a technician. Then, the GPEM and/or remote device can be configured to evaluate whether the corrective action has improved the performance of the device. For instance, if a sensor on a bill acceptor is generating slightly off readings that are leading to a high rejection rate and new software/firmware is downloaded to fix the problem, then the GPEM and/or remote device can determine whether rejection rate improves after the new software/firmware has been downloaded. In general, after each corrective action is implemented, the GPEM and/or remote device can be configured to determine whether the corrective action has improved the situation. For instance, after the corrective action is implemented, the GPEM and/or remote device can check whether an error condition has been cleared or performance of the device has improved.

Multiple software/firmware adjustments can be possible and the GPEM and/or remote device can be configured to try to implement different adjustments if a first one does not improve the performance of the device. If the rejection rate does not improve or gets worse, then a maintenance operation involving a technician can be scheduled. In one embodiment, if the rejection rate gets worse after a software/firmware download, then the GPEM and/or remote device can be configured to restore the device with its software configuration prior to the download of new software/firmware if the new software/firmware does not improve the performance of the device.

In 338, the GPEM or remote device can attempt to communicate with the VID or VOD to determine whether the correction was successful. For instance, the GPEM or remote could receive an indication that an error condition was cleared. In some cases, an indication of whether the correction is successful may not be immediately apparent. For instance, to determine whether a download of software to a bill validator to improve an acceptance rate was successful, the GPEM or remote device may have to monitor a number of transactions with the new software.

If the correction is determined to be successful, in 340, the event can be logged. If the correction is not successful, then in 332, the GPEM or remote device can attempt to determine whether another correction is available that might fix the problem. In some instances, multiple corrections might be available as a fix to an identified error condition, such as first trying a power cycle and if that does not work trying a software download. The GPEM or remote device can include for each error condition or pattern one or more corrective actions including an order in which to apply the corrective actions. In 334, if the GPEM and/or remote device determines that none of the corrective actions have been successful and there are no other corrective actions to try, then maintenance can be notified and a technician visit can be scheduled.

Gaming Machine Reconfiguration including Retrofitting

Figure 17:
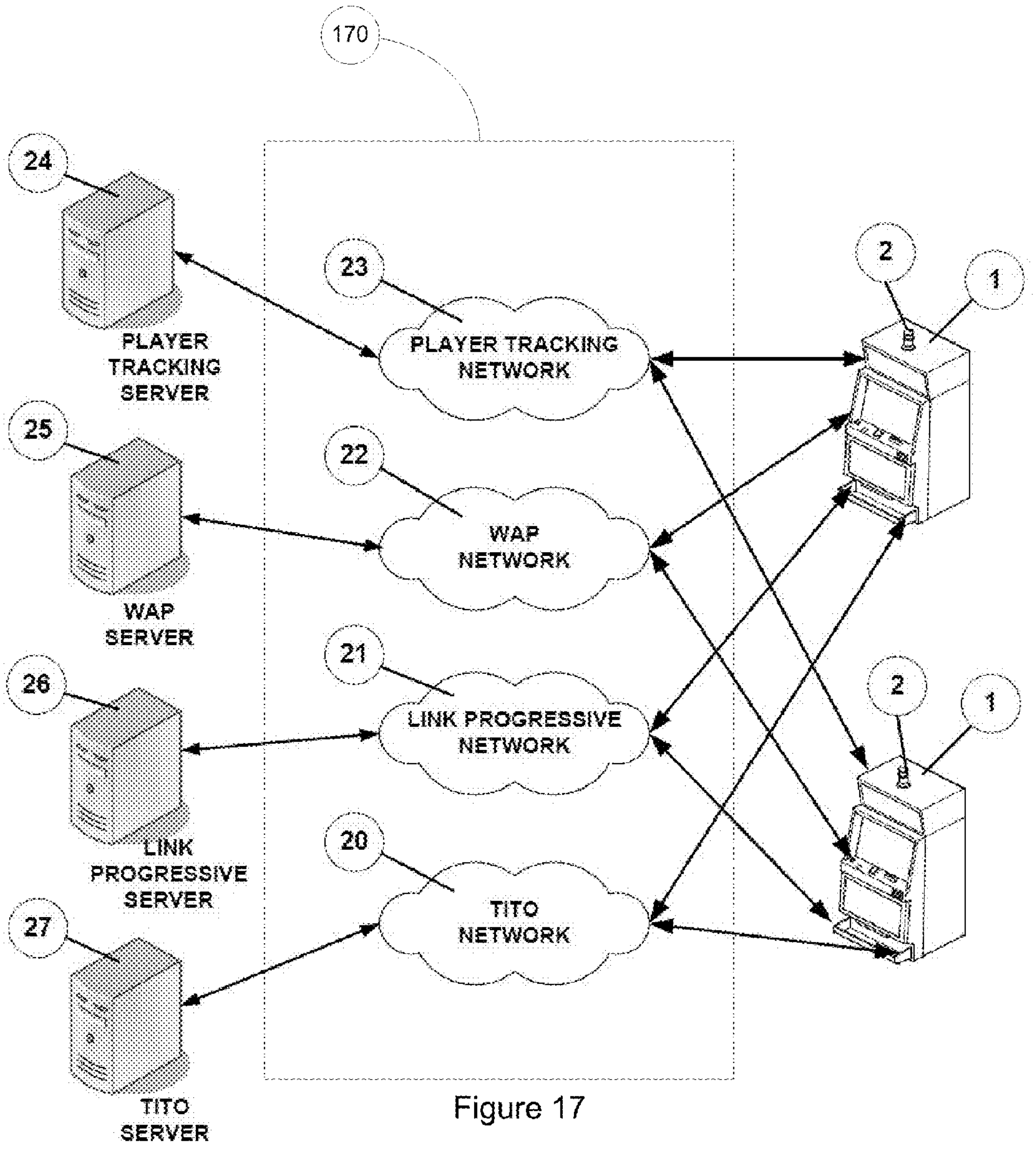
FIG. 17 is a diagram that illustrates a gaming system including gaming machines that are to be retrofitted with candles in accordance with the described embodiments.

FIG. 17 is a diagram that illustrates a gaming system including gaming machines that are to be retrofitted with candles. The gaming machines 1 include legacy candles 2 that are to be replaced with an embodiment of candle 30 (see FIG. 19). A gaming system can include one or more gaming machines, such as 1, connected to a gaming system network 170. Via the gaming machine network 170, information can be communicated between the machines 1 and the gaming system servers, such as player tracking server 24, WAP server 25, link progressive server 26 and TITO 27.

As shown in FIG. 17, each gaming machine 1 is connected to player tracking system network 23, which is connected to the player tracking server 24, the WAP system network 22, which is connected to the WAP server 25, the link progressive system network 21, which is connected to the link progressive server 26, and the TITO system network 20, which is connected to the TITO server 27. In general, different gaming machines in a gaming system can communicate with a different number of gaming system servers. For instance, often only a portion of the gaming machines on a casino floor will participate in a WAP or Link progressive game and thus, communicate with servers 25 and 26.

Gaming system manufacturers such as IGT, Bally, WMS and Aristocrat may use different communications interface technologies such as RS-232, RS-485, Ethernet, and USB to connect to their gaming system interfaces located in the gaming machines, such as 1. Further, each gaming system, i.e., WAP, TITO or player tracking, may use different protocols and require the casino to run a separate set of wiring, from and to, each gaming machine. Thus, a disadvantage of the prior-art gaming systems is that many of the gaming machines are equipped with several communication interfaces, which can vary from gaming machine manufacturer to gaming machine manufacturer, where each of the communication interfaces can require a separate wiring infrastructure to be installed and maintained, which is costly and difficult to reconfigure. As described herein, a wireless enabled device, such as candle 30, can be used to eliminate the costs associated with maintaining a complicated wired network in a casino environment and simplify the reconfiguration process.

FIG. 18 is a perspective drawing that illustrates gaming machine 1 that is to be retrofitted with a candle 30. The existing candle 2 is replaced with a candle 30. As previously described, the candle 30 can be configured to utilize an existing mounting interface on the gaming machine, such as mounting interface 120.

The gaming machine 1 can be used to play a wager-based game. The gaming machine can include a player tracking panel 3 (e.g., a display, a card reader and/or a key pad) for performing player tracking transactions, a monitor or reel area 4 for displaying the wager-based game, a player input panel 5 (generally having buttons) for making selections associated with the play of the wager-based game, such as for inputting game related decisions and wager amounts, a coin-in acceptor 6 for accepting coins, a bill acceptor 7 for accepting bills and/or printed tickets, a coin-out device (hopper) 8 for outputting coins and/or tokens, and a ticket printer 9 for generating cashless or promotional tickets.

Many different types of gaming devices can be equipped or retrofit with the candle devices described herein and the gaming devices are not limited to the example shown in FIG. 18. The gaming devices can have different combinations of devices than those shown in FIG. 18. For instance, some gaming machines may not include a coin acceptor or a coin hopper. Further, different types of gaming machines, such as class II bingo type gaming machines or lottery terminals can also be equipped with the candle devices. These devices can be connected to a central server that can be networked to the gaming device via a candle, such as 30. Further, devices, such as kiosks and change machines that can include printers, ticket/bill acceptors, change dispensers and/or bill dispensers can also be equipped with the candle devices or components of the candle devices described herein, such as a cap portion 76, shown in FIGS. 1 through 4.

Figure 19:
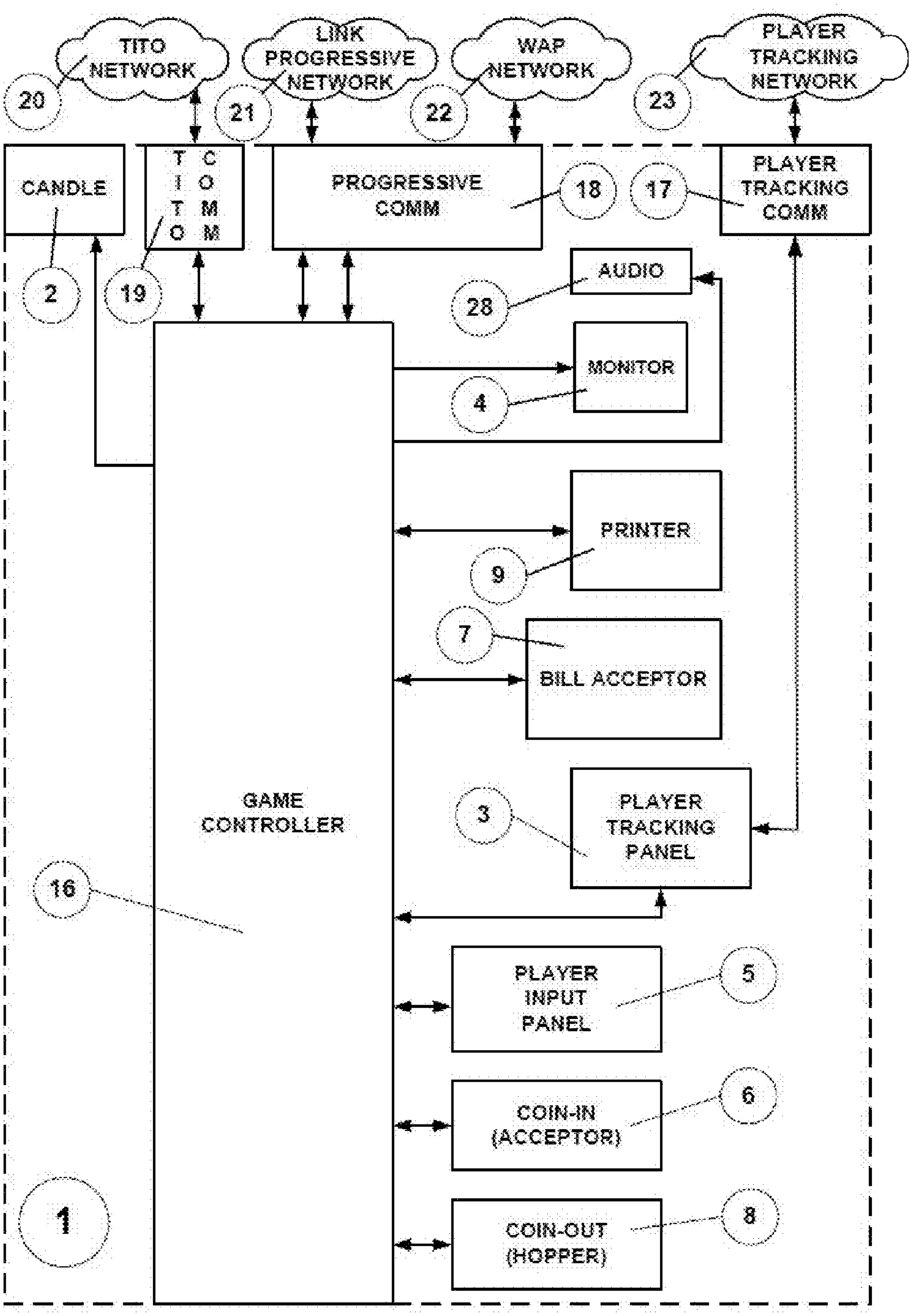
FIG. 19 is a block diagram that illustrates a gaming machine that is to be retrofitted with a candle in accordance with the described embodiments.

FIG. 19 is a block diagram that illustrates a gaming machine 1 that is to be retrofitted with a candle 30. The block diagram is representative of the gaming machine 1 shown in FIG. 18 prior to the retrofit. The gaming machine 1 has a game controller 16. The game controller 16 can be configured to control a wager-based game played on the gaming machine including receiving wagers on the outcome of a game.

The game controller 16 can include a random number generator that is used to determine outcomes. In addition, the game controller 16 can be connected to a number of devices that are used during operation of the gaming machine. For instance, the game controller can be communicatively coupled to the candle 2, the monitor 4, the printer 9, the bill acceptor 7, the player input panel 5, the coin-in (acceptor) 6, the coin-out (hopper) 8 and the audio system 28. The game controller can be configured to send commands to the peripheral devices that control their operation and receive data, such as acknowledgement of the commands from the peripheral devices in response. The game controller 16 can execute regulated gaming software to perform these functions.

The game controller 16 can also control the gaming system's network interfaces. For example, the player tracking panel 3 interfaces with the player tracking communication interface 17 which communicates to the player tracking system 23, and the progressive communication interface 18, which communicates to the link progressive system 21 and the WAP system 22 and TITO communication interface 19, which communicates to the TITO system 20. After a retrofit, existing connections can be altered and new connections can be added. Examples of connections after a retrofit with a candle device are shown and described with respect to FIGS. 13 and 15. In addition, examples of how the wiring pathways can be changed and types of connections that can be established in a gaming machine cabinet as part of a retrofit are described in more detail with respect to following FIGS. 21A-21K.

Figure 20B:
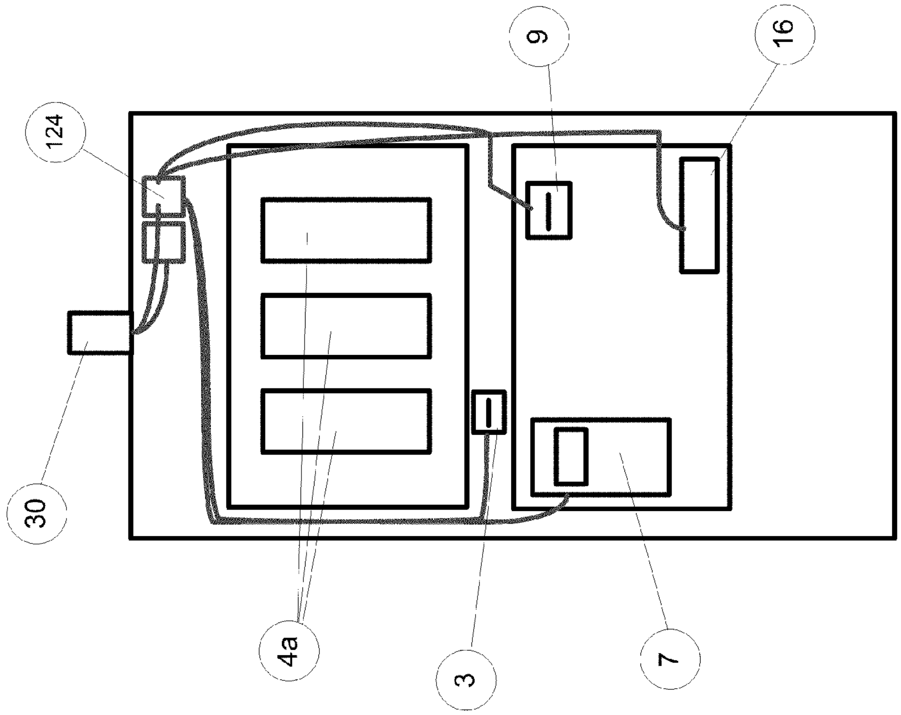
FIGS. 20A and 20B are front views of the inside of gaming machines retrofitted with candles that can wirelessly communicate with a remote server in accordance with the described embodiments.
Figure 20A:
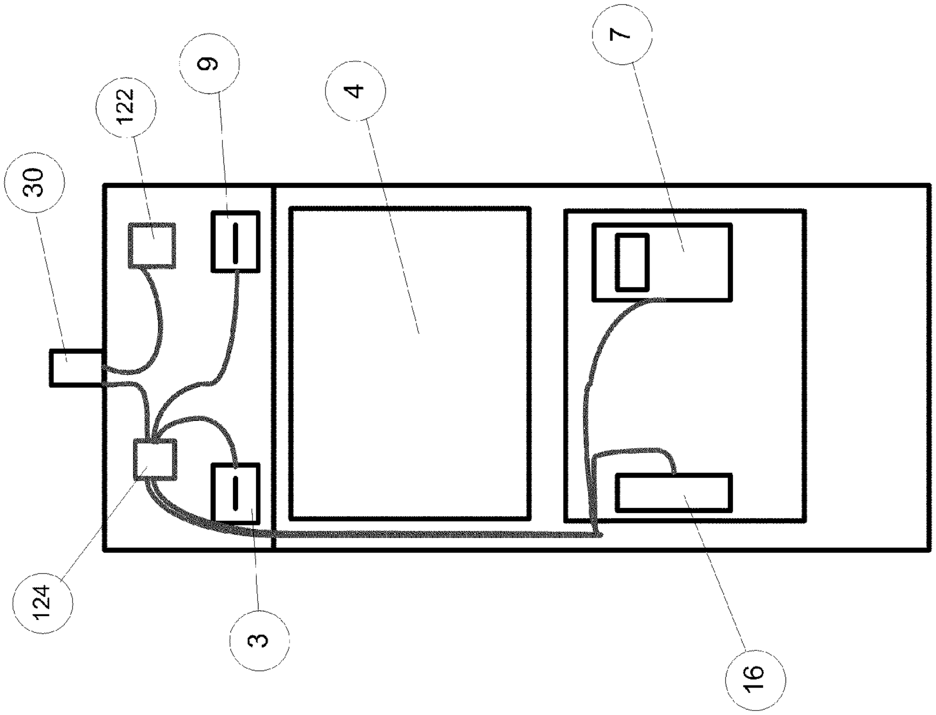

FIGS. 20A and 20B are front views of the inside of gaming machines retrofitted with candles that can wirelessly communicate with a remote server. In FIG. 20A, a candle 30 is installed on a video-type gaming machine. The video-type gaming machine includes a main display monitor 4 on which a wager-based game is displayed under controller of a game controller. Video slot, poker, bingo, keno, lottery and blackjack are a few examples of games that can be displayed on monitor 4.

A first portion of wiring harness 122 is connected in a top box portion of the gaming machine to one or more power and data interfaces associated with the candle 2 that has been replaced (e.g., see FIG. 18). The first portion of the wireless 122 can be designed to be compatible with the one or more power and data interfaces with which the gaming machine was manufactured so that these interfaces do not have to be modified. For instance, the first portion 122 can be directly plugged into one or more power and data interfaces already present on the gaming machine.

The existing data interface can provide communications in a particular protocol, such as a particular serial communication protocol. Candle commands from the game controller 16 and responses from the candle 30 can be transmitted via this communication channel. The power can be delivered in a particular format, such as 24 DC V. As described above, the candle can include power conditioning circuitry that changes the incoming voltage from the gaming machine to one or more other voltages used by peripheral devices on the candle or one or more peripheral devices that are supplied power via the second portion of the wiring harness 124.

In the example of FIG. 20A, the second portion 124 of the wiring harness is secured on the other side of the top box cabinet. In some embodiments, the first and second portions, 122 and 124, of the wiring harness can be secured proximately at the same location as is shown in FIG. 20B. However, if needed, the first and second locations can be secured at locations separate from one another.

As part of the installation of the candle 30, a number of new connections are established using the second portion 124 of the wiring harness of the candle between the candle and other devices in the gaming machine. In various embodiments, the new connections can carry data and power to a particular device. In the example shown in FIG. 20A, which is provided for the purposes of illustration, a number of new data connections are established. Many different types of data connections can be established between a candle 30 and one or more devices on a gaming machine. The different types of data connections that can be established are further enumerated with respect to FIGS. 21A and 21K.

A first and second data connection is established from the second portion 124 to the game controller 16 and the bill acceptor 7. These connections are routed from the top box, into a main cabinet of the gaming machine, down the side of the gaming machine next to the monitor 4 and to a lower cabinet section where game controller 16 and then across the lower cabinet to where the bill acceptor 7 is located. A third and fourth data connection is established between a card reader in a player tracking panel 3 and a printer 9. These connections are routed within the top box portion of the cabinet.

The lengths of wire and the wiring paths that are used can depend on the location where the second portion is secured, the location of each device in the gaming machine cabinet and the layout of the gaming machine cabinet, such as where an opening is located in a top box that allows power and data to be received or where different devices are placed. The variables can differ from gaming device to gaming device and the examples shown in FIGS. 20A and 20B are provided for the purposes of illustration only. For instance, as is shown in FIG. 20B, not all gaming machines include top boxes or video displays on which the game of chance is displayed.

In one embodiment, wireless data and/or power connections can be used within the interior of the gaming machine. For instance, rather than running a wire from the second portion 124 to the bill acceptor 7, a wireless communication interface can be established from the second portion 124 to the bill acceptor 7. As an example, if the bill acceptor is a dual port device, then a wireless interface can be plugged into one of the ports and configured to communicate wirelessly with a wireless interface in the second portion 124. As another example, the printer 9 can be configured to receive power wirelessly from the second portion via a wireless power interface.

As another example, a candle device 30 is installed in a reel type gaming machine. This gaming machine does not include a top box and the candle is attached to a main cabinet. Further, three slot reels are used to display the wager-based game rather than the monitor 4 shown in FIG. 20A. In this example, the first and second portions of the candle wiring harness are secured next to one another. Then, new communication connections are established between the card reader on the player tracking panel 3, a printer 9, a bill acceptor 7 and a game controller 16.

The bill validator, card reader, game controller and printer are placed in different locations in the cabinet relative to FIG. 20B. Further, the first and second portions of the wiring harness are secured at a different location as compared to FIG. 20A. Thus, different wiring lengths and different wiring paths are used to connect each of these devices as compared to FIG. 20A.

As described above, using the gaming devices described herein, such as a candle device, it is possible to reconfigure data and power connections on an existing gaming machine or add additional data and power connections to a gaming machine at the time of manufacture. For a new gaming machine, the additional power and data connections can provide a built-in upgrade pathway for the gaming machine. Some of the possibilities related to reconfiguring a gaming machine or adding additional data and/or power connections have been described above. Further details related are described as follows with respect to FIGS. 21A through 21K.

FIGS. 21A through 21K are block diagrams illustrating various communication schemes between a candle, a game controller, external devices and peripheral devices in accordance with the described embodiments. The communication schemes can be applied as part of 1) a reconfiguration of gaming machine during a retrofit process where an existing candle device on a gaming machine is replaced with an embodiment of a candle device described herein, 2) during the manufacture of a gaming machine where an embodiment of a candle device described herein is installed and 3) as a reconfiguration of a gaming machine manufactured with an embodiment of a candle device described herein. For example, a gaming machine manufactured with an embodiment of a candle device described herein can be reconfigured after deployment as part of a scheduled upgrade on the gaming machine.

Figure 21A:
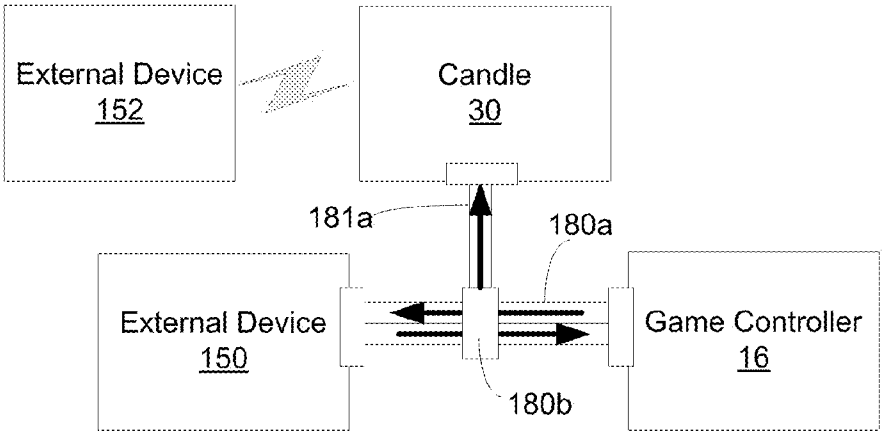
FIGS. 21A through 21K are block diagrams illustrating various communication schemes between a candle, a game controller, external devices and peripheral devices in accordance with the described embodiments.
Figure 21B:
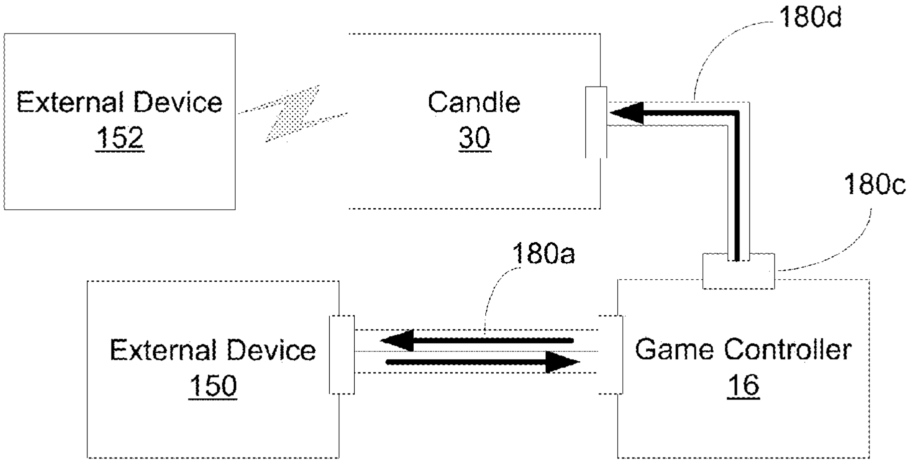

FIGS. 21A and 21B are block diagrams of communications connections between a candle 30 and a game controller 16. In FIG. 21A, the game controller 16 is configured to communicate with an external device, such as a remote server, via a communication channel 180*a*. In this embodiment, the candle 30 can be configured to monitor communications on the communication channel 180*a* but not add communications to the channel. The communications can be received at the candle 30 via communication channel 181*a*. Via the communication methods previously described, such as via wireless communications, the candle 30 can be configured to send the monitored communications to another external device, such as 152, which can be a remote server.

The communications channel 180*a* can be bi-directional or uni-directional depending on the external device 150. In various embodiments, the candle 30 can be configured to monitor only communications that are transmitted from the game controller 16 to the external device, to monitor only communications from the external device to the game controller 16 or to monitor communications to and from the game controller 16 and the external device. If the game controller 16 talks to multiple external devices on this communication channel, then the candle 30 can be configured to monitor the communications for multiple devices.

In one embodiment, the interface 180*b* can be placed proximate to the communication endpoint where the communication channel 180*a* interfaces with the external device 150 or where the communication channel 180*a* interfaces with the game controller. For example, an adapter can be provided that plugs into an existing interface associated with the game controller 16 and then receives an end point from the communication channel that was previously plugged into the existing interface of the game controller 16. The adapter can include circuitry that monitors the communications on the channel and allows communication channel 181*a* to be established. In another example, the communication channel 180*a* can be cut and an adapter with monitoring circuitry can be inserted at the site of the cut to re-connect and monitor the channel 180*a*. If desired, adapters that can be placed at a communication channel endpoint or interposed between the endpoints and perform various communication functions can be provided in each of the communication examples that are described as follows.

In another embodiment, the game controller 16 can include an interface, such as 180*c* shown in FIG. 21B, that allows some of the communications that are transmitted or received from the gaming machine to be monitored. For example, the game controller can include an extra communication port that allows this function. The game controller 16 can be configured to send out some portion of the communications (outgoing, incoming or both) via interface 180*c*. A communication channel 180*d* can be established at interface 180*c* that allows the candle 30 to receive communications from the game controller 16. In particular embodiments, the candle 30 can be configured to filter the communications for particular types of information and then forward the filtered information to one or more different external devices, such as 152. The information can also be processed in some manner by the candle 30 before it is forwarded.

The game controller 16 can be configured to receive requests for certain types of information. The format of the request and the information that is available can be fixed according to the regulated gaming software that the game controller 16 employs where the format of the request and the information that is available can vary according to what gaming software is used and what jurisdiction the game controller 16 is located. In one embodiment, the candle 30 can be configured to recognize the gaming software that is being used by a particular game controller 16 and then send requests for information from the game controller 16 in a format that is recognized by the game controller 16. As an example, the information requests from the candle and the responses by the controller can be sent over communication channel 180*d*.

Figure 21C:
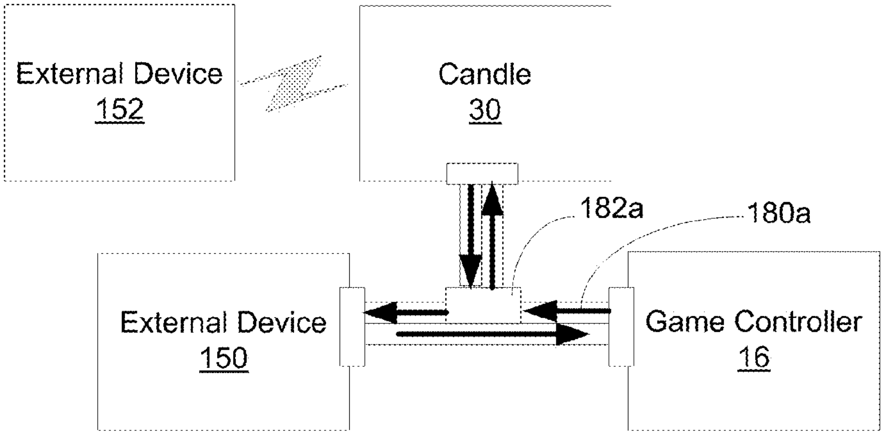
Figure 21D:
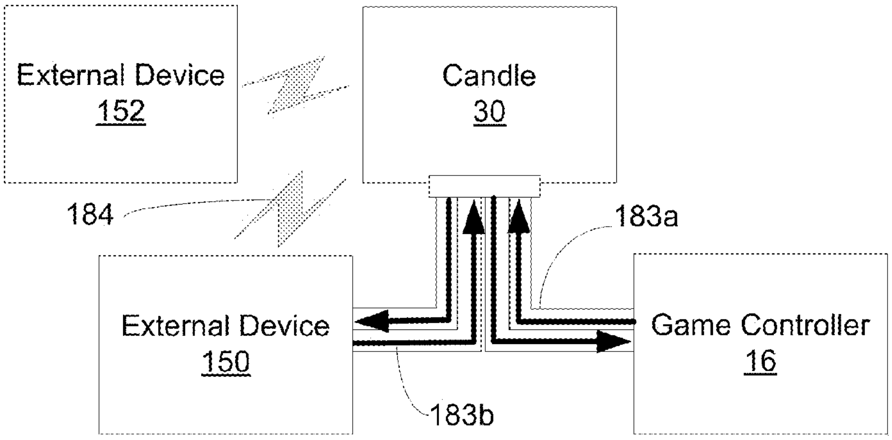

In another embodiment, as shown in FIG. 21C, a communication interface, such as 182*a*, can be placed on communication channel 180*a* to re-route communication from the game controller 16 to external device 150 through the candle 30. Communications in only one direction, i.e., from the game controller 16 to the external device 150 or from the external device to the game controller 16 can be re-routed in this manner. An example where communications are re-routed in both directions is shown in FIG. 21D.

After receiving the re-routed communication, the candle 30 alone or in conjunction with a remote external device, such as 152, can be configured to alter the re-routed communication in some manner before it received by the intended recipient. As an example, the game controller 16 can be configured to report a portion of its wagers to a progressive server, such as a link progressive server or a WAP server. The reporting can be part of a progressive game that is played on the gaming machine and implemented in the game controller's regulated game software. Thus, the reporting is fixed according to the rules implemented in the game controller's software.

The portion of the wagers reported by the game controller 16 can be used to fund a progressive jackpot. The candle 30 can be configured to receive the wager amount for the progressive jackpot and split off a part of it. A first part can be sent to the external device 150 to contribute to a progressive jackpot, which can be less than the amount originally sent from the game controller. For instance, the original message sent from the game controller can be modified to include the lower amount, which is then forwarded to the external device 150 in its modified form. From the point of view of the gaming machine, it is still contributing the same amount to the progressive jackpot associated with external device 150.

The part split from the original contribution by the candle 30 sent from the game controller 16 can be sent to the external device 152. The split part can be used to fund one or more separate progressive jackpots. The external device 152 and/or the candle 30 can be configured to determine conditions for awarding the one or more separate progressive jackpots. In one embodiment, new progressive jackpots can be awarded independently of the game outcomes generated by the game controller. One condition of the award may simply be that a gaming machine is currently being utilized for game play. In another embodiment, the candle 30 can be configured to receive game outcomes generated by the game controller 16. This information can be used by the candle 30 and/or the external device 152 as a component in an award determination.

The candle 30 can be configured to communicate with other devices on a gaming machine, such as a player tracking unit or a printer, such that a determined award can be received by a player. For example, via the player tracking unit, the candle 30 can be configured to provide the award as free play via an existing free play mode provided by the player tracking unit. As another example, via the printer, the candle 30 can be configured to command the printer to generate a ticket that is redeemable for the award amount or can be used for additional game play if the ticket is re-inserted into the gaming machine.

In FIG. 21D, an initial communication path between an external device 150 and a game controller 16 has been altered such that the candle 30 is interposed in the communication path between the two devices. Via communication paths 183*a* and 183*b*, a communication sent from the game controller 16 to the external device 150 or from the external device 150 to the game controller 16 can be intercepted at the candle 30 and altered in some manner prior to reaching its target destination in either direction. For instance, the game controller 16 can send a communication to the external device 150 which can be received, parsed and modified by the candle 30. Then, in some embodiments, the modified communication can be sent to the external device 150 or can be re-routed to another device. Further, the candle 30 can receive a communication in response from the external device 150 for the game controller 16. The candle 30 can parse and then modify the response communication in some manner. Then, the modified response communication can be sent to game controller 16 or blocked if necessary.

As an example, the candle 30 can be interposed between the game controller 16 and a printer (see e.g., FIG. 21I) and can also be interposed between the game controller 16 and external TITO server (e.g., the external device 150 can be a TITO server). The game controller 16 can receive a cashout command and in response generate a command to print out a ticket for some amount of credits on the gaming device or dispense coins from a coin hopper on the gaming machine. The game controller 16 can send the amount to the external device 150 that it intends to dispense. The candle 30 can intercept the request and in response generate an offer. The offer can be for a lottery ticket or some other item of value. The offer can be displayed on a display screen on the gaming device. The player can accept the offer. The offer can be for some portion of the cash out value. If the player does not accept the offer, the original message from the game controller 16 can be sent to the external device 150.

Next, when an offer has been accepted, the candle 30 can send a request for a validation number for a modified cashout ticket to the external device 150 via 183*b*. The modified cashout ticket can be less than the amount than was originally requested by the gaming controller. The external device 150 can send the validation number to game controller 16 and this message can be intercepted by the candle 30. The message sent to the game controller 16 by the candle 30 can be the message the game controller 16 would expect from the external device if the candle 30 was not in the communication path.

After receiving the message from the candle 30, the game controller 16 can attempt to print out a cashout ticket with the original amount. The candle 30 can intercept this message to the printer and replace it with the modified amount (The external device has been notified that the validation number it sent is associated with a lower amount.). The message with the modified amount can then be received by the printer and a ticket with the modified amount can be printed out. The candle 30 can then send a second message to the printer to print out one or more tickets for the remaining value associated with the offer accepted by the player. The candle 30 can communicate via a communication path such as 184 with the external device 150, which can be a TITO server, to get additional ticket validation numbers. In another embodiment, the candle 30 can also communicate with the external device 152 to get ticket validation numbers and report the transaction associated with the offer tickets.

In the end, the game controller 16 responds as if it has printed out a cashout ticket for the full amount, but the result is one cashout ticket for less than the full amount and a number of secondary tickets that cover the remainder. The TITO server, such as 150, is notified that the cashout value is less than the full amount and this is reflected on the cashout ticket so that the correct amount is reflected when the user attempts to use the cashout ticket. The accounting server records the amount of money taken off the device, which is the full amount reported by the game controller 16.

Figure 21E:
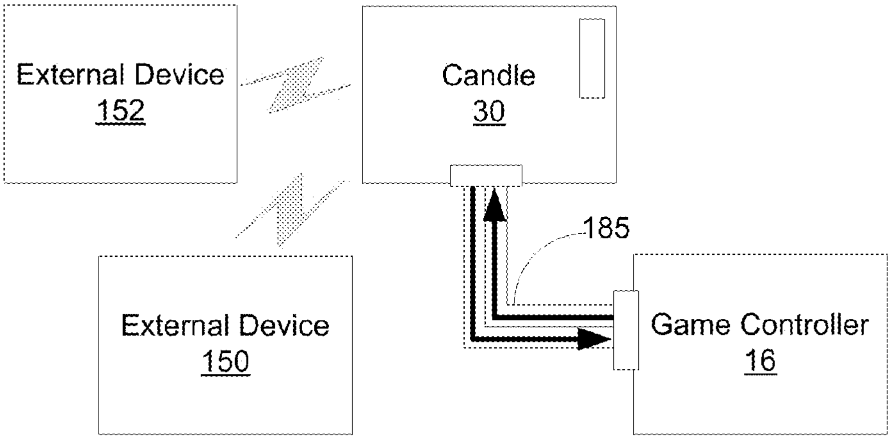

In FIG. 21E, a wireless connection between the candle 30 and the external device 150 and a wired connection 185 between the game controller 16 and the candle 30 is used in lieu of a wired connection between the game controller 16 and the external device, such as 180*a* in FIG. 21A. The communications addressed to the external device 150 from the game controller 16 and the communications addressed to the game controller 16 from the external device 150 are routed through the candle 30. The candle can be configured to parse the communications and send information associated with the communications to another external device, such as 152. Further, the candle 30 can be configured to intercept and modify communications to or from the game controller that are sent on this communication link.

Figure 21F:
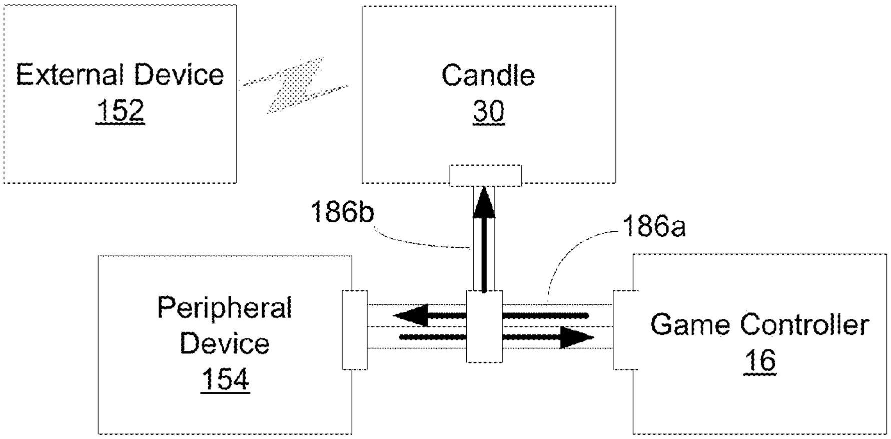

In FIG. 21F, a communication link 186*a*, such as wired link, between a candle 30 and a peripheral device (e.g., a printer, bill acceptor, light panel, button panel) is shown. A secondary communication link 186*b* can be set up that allows the candle 30 to monitor communications on the communications link. The communications can be monitored in a similar manner as the communications between a game controller 16 and external device 150 described with respect to FIG. 21A. The information in the communications can be parsed and/or processed in some manner. The raw or processed information can be sent to an external device, such as 152.

Figure 21G:
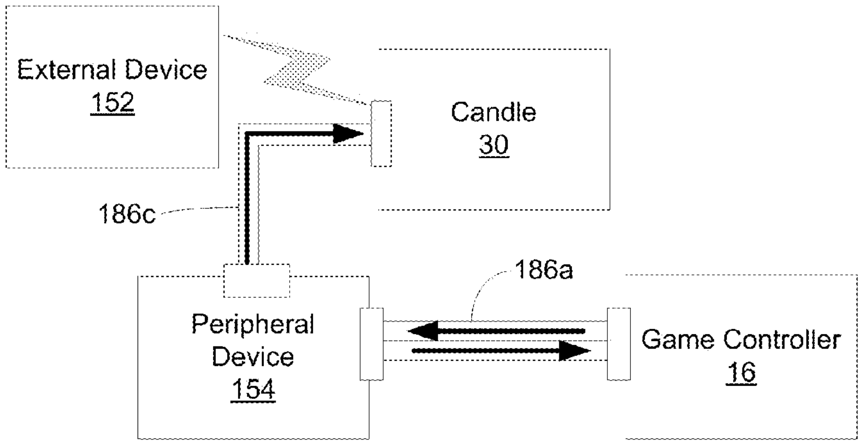

In FIG. 21G, a secondary communication link 186*c* is established between the candle 30 and the peripheral device 154. This communication link is in addition to the primary communication link 186*a* between the game controller 16 and the peripheral device 154. In this example, the secondary communication link 186*c* can be used to receive information about the peripheral device 154 and its activities. This information can be parsed and/or processed by the candle in some manner and sent to an external device, such as 152.

Figure 21H:
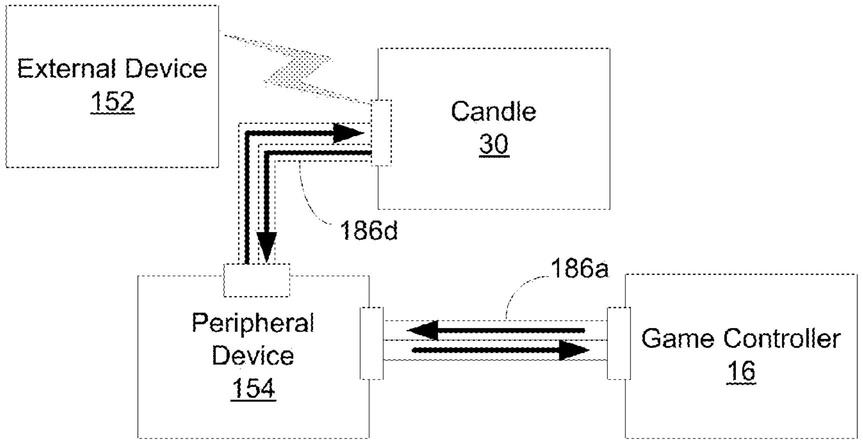

In FIG. 21H, the candle 30 can be configured to perform bi-directional communications with peripheral device 154 over the secondary communication channel 186*d*. The candle 30 can be configured to send requests for information and receive responses. This information can be collected and processed and sent to an external device 152. Further, the candle can be configured to send commands to the peripheral device 154, such as printer to print a ticket, and receive appropriate response commands from the peripheral device. The candle 30 can be configured to provide various services via communications with an external device 152. For instance, the candle 30 can be configured to receive information from the external device 152 that allows a custom verifiable ticket to be printed at a printer peripheral device 154. The dual-port links described with respect to FIG. 15A are examples of a secondary communication link between the candle and a peripheral device where bi-directional communications can be provided.

Figure 21I:
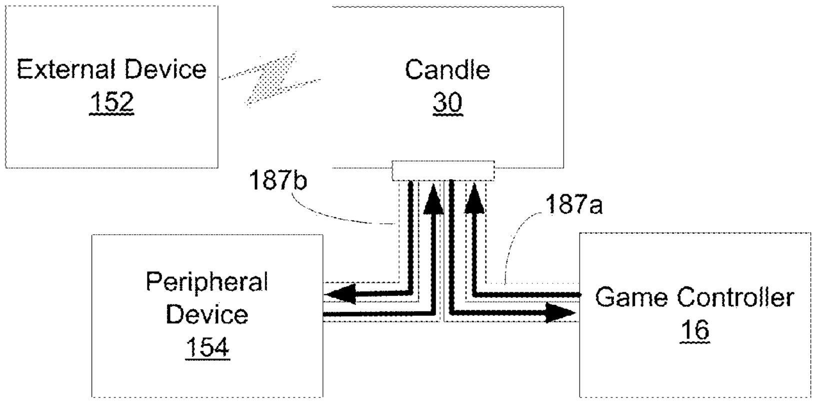

In FIG. 21I, a wired communication link between the game controller 16 and the peripheral device 154, such as 186*a*, is replaced with two communication links, 187*a* and 187*b*, that are each routed through the candle 30. The links 187*a* and 187*b* can each be wired or wireless links. The candle 30 can be configured to receive, parse and modify the communications between the two devices. Further, the candle 30 can be configured to report raw or processed data received from the two devices and send it to a remote device, such as external device 152.

Figure 21J:
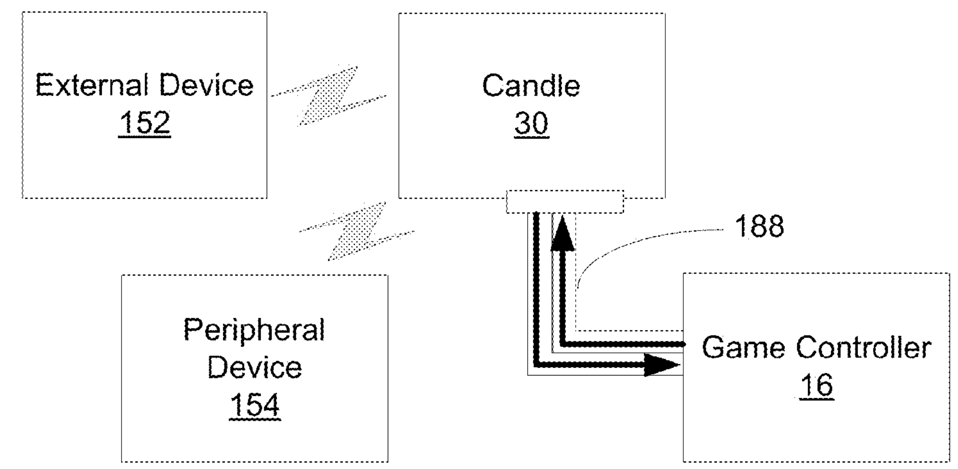

In FIG. 21J, a wired connection between the game controller and the peripheral device 154 is replaced with a connection 188 between the candle 30 and the game controller 16. In one embodiment, the candle 30 can be configured to wirelessly communicate to the peripheral device 150 any communications from the game controller 16 to the peripheral device and receive responses that are sent to the game controller 16 via communication link 188. The communication link is shown as a wired link but in other embodiments it can also be a wireless link. The candle 30 can be configured to parse, modify and process communications sent on this link, which can be sent to external device 152.

In another embodiment, a candle can be configured to emulate a device that has been disconnected. The peripheral device 154, such as a coin acceptor, a coin hopper or an audio device, can be removed or disabled on the gaming device. However, the candle 30 can be configured to emulate the removed or disabled device and respond to the game controller 16 as if it were still present. For example, in one embodiment, speakers on the gaming machine can be removed or disabled but the candle 30 can be configured to emulate the speakers and respond as if the speakers were still present. In another example, a coin hopper on the gaming machine can be removed or disabled. The candle 30 can be configured to emulate a coin hopper so that if the game controller sends a command to the coin hopper, such as a command to dispense coins, the candle 30 is configured to emulate the coin hopper and provide a correct response to the game controller 16 as if the game controller 16 is still connected to the coin hopper.

Figure 21K:
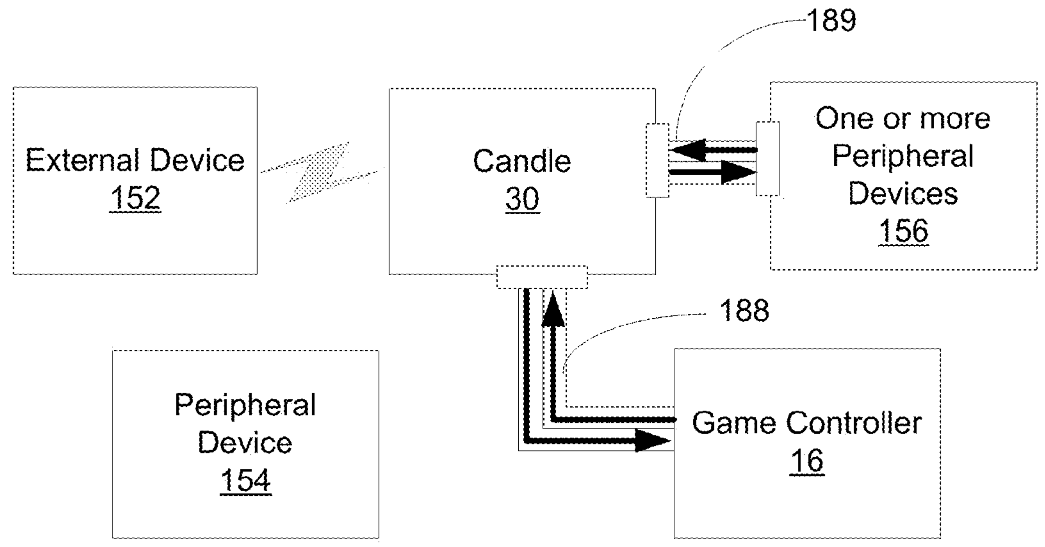

In FIG. 21K, a wired connection, such as 186*a*, between a peripheral device 154 and a game controller is replaced with a wired or wireless connection between the candle 30 and the game controller 16 where the communications with the peripheral device 154 are severed. The candle 30, however, can be configured to emulate the peripheral device 154 and respond appropriately to the game controller as if the peripheral device were still responding. Further, the candle 30 can be configured to translate one or more commands received from the game controller 16 for peripheral device 154 into one or more commands for additional peripheral devices, such as 156. The translated commands for the additional peripheral devices can be sent via one or more communication links, such as 189. In one embodiment, the additional peripheral devices can receive data and/or power from the candle 30 via one of its interfaces. For instance, link 189 can be a data and/or power link to a peripheral device plugged into one of the interfaces provided by the candle 30.

As an example of command translation, the game controller 16 can send a command to an audio device for outputting sound that has been disconnected. In response, the candle 30 can be configured to receive the command and control another audio device, such as an audio device on the candle 30 or another audio device coupled to the candle 30, such as a new audio device installed on the gaming machine, to output the sound requested by the game controller 16. Then, the candle 30 can be configured to respond to the game controller 16, via device emulation, as if the original audio device were still present.

In another example of command translation, the game controller 16 can send a command to a light device to output a light pattern. The lighting device can be disconnected. The candle 30 can receive the command and in response control another lighting device to output a desired light pattern which can be different from the original light pattern output on the disconnected lighting device. Further, the candle 30 can be configured to control an audio device to output accompanying sounds with the light pattern, which is different from the way that the game controller originally controlled just the lighting device.

The examples of communication and/or power links describe above with respect to FIGS. 21A-K can be used in combination with one another. For instance, an embodiment of a communication link between an external device and game controller can be combined with an embodiment of a communication link between a game controller and a peripheral device. Further, multiple links of the same or different types can be instantiated between a game controller and external devices or between a game controller and peripheral devices. Thus, the examples in FIGS. 21A-K are provided for the purposes of illustration and are not meant to be limiting in regards to all of the different possible communication configurations that can be implemented.

Figure 22:
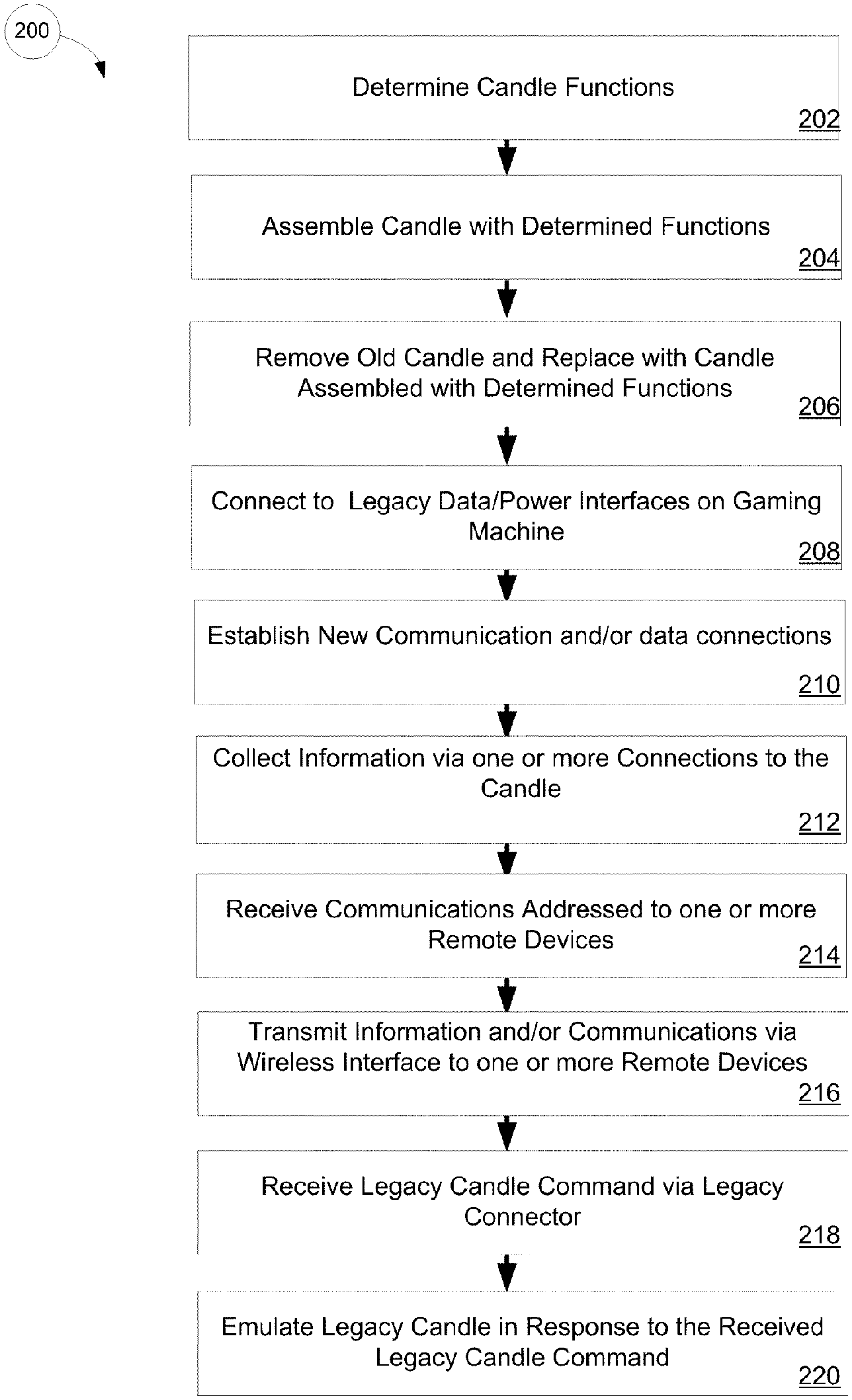
FIG. 22 is a method of reconfiguring a gaming machine with a candle in accordance with the described embodiments.

FIG. 22 is a method 200 of reconfiguring a gaming machine with a candle. In 202, the candle functions can be determined. In one embodiment, the candle functions can be provided by a number of modular boards where different combinations of boards can be used to provide different functions and thus, different candle configurations. Thus, a combination of boards can be selected to provide the determined candle functions. For instance, one modular board can be used to provide video control, video signal processing and communications with a display, such as a main display on a gaming machine. If video functions are desired, this board can be included in the candle configuration. If video functions are not desired, then in some embodiments, this board may not be included in the final candle configuration.

In 204, a candle configuration with at least the functions determined in 202 can be assembled. In 206, the old candle on the gaming device can be removed and replaced with the candle assembled in 204. In 208, the candle can be connected to the legacy communication and power connections associated with the removed candle. Via the legacy communication connection, the candle may be able to communicate with a game controller on a gaming device and receive commands from the game controller to perform legacy candle functions. The candle can include logic to emulate the legacy candle such that correct responses are generated for the game controller as if the legacy candle were still present.

In 210, new communications and/or data connections can be established within the gaming machine. This process can involve establishing new wired or wireless connections between the candle and the game controller or between the candle and the existing peripheral devices using a secondary connector associated with the candle. The wiring paths and wiring connections that are established can vary from gaming machine to gaming machine and can depend on where each device is placed in the gaming machine cabinet.

In one embodiment, the secondary connector can be used to establish power and/or data connections with a new peripheral device. For instance, an existing candle and existing peripheral device can be replaced simultaneously on the gaming machine. The existing peripheral device can be replaced with a new peripheral device or it can simply be disconnected. The new peripheral device can be coupled to the candle 30 such that it receives power and/or communicates with the candle via the secondary connector. The game controller may be able to control the new peripheral device via commands that are received and translated by the candle before they are sent to the new peripheral device.

In 212, the candle can be configured to collect information via one or more of its connections. For instance, the candle can be configured to collect information from a bill acceptor or a printer. As another example, the candle can be configured to monitor communications from a game controller. The candle can be configured to parse messages, collect data, modify commands and/or process collected data. Raw or processed data can be sent to a remote device, such as a remote server.

In 214, the candle can be configured to receive communications addressed for one or more remote devices via one or more new communication connections established in 210. For instance, the candle can receive communications from a game controller to a WAP server or from a game controller to a TITO server. The candle can be configured to receive the communications multiplex and prioritize the communication if necessary and in 216 send the communications via a wireless interface to the one or more remote devices. The one or more remote devices can include but are not limited to the remote device to which the game controller originally addressed the communication.

The candle can also be configured to receive wireless transmissions from one or more remote devices. The wireless transmissions can be addressed to the game controller or one or more peripheral devices on the gaming machine. The candle can be configured to route the received wireless communications to its intended recipient.

In 218, the candle can receive legacy candle commands via its legacy communication connection with the game controller. For instance, the legacy candle command can be to activate or de-activate a light segment on the candle. In 220, the candle can emulate the legacy candle in response to the received legacy candle command. The emulation can include translating the command into a series of actions on the candle that are consistent with the legacy command and responding to the game controller in a manner that is consistent with the legacy device. As an example, a legacy command to activate an incandescent light can be translated into a number of actions associated with activating LEDs on an LED board. In addition, the legacy command can be translated to include activation of an audio device on a gaming machine that was not possible with the legacy candle because the legacy candle did not include an audio device.

Vending Platforms including Vending Platform Enhancement Modules

Figure 23:
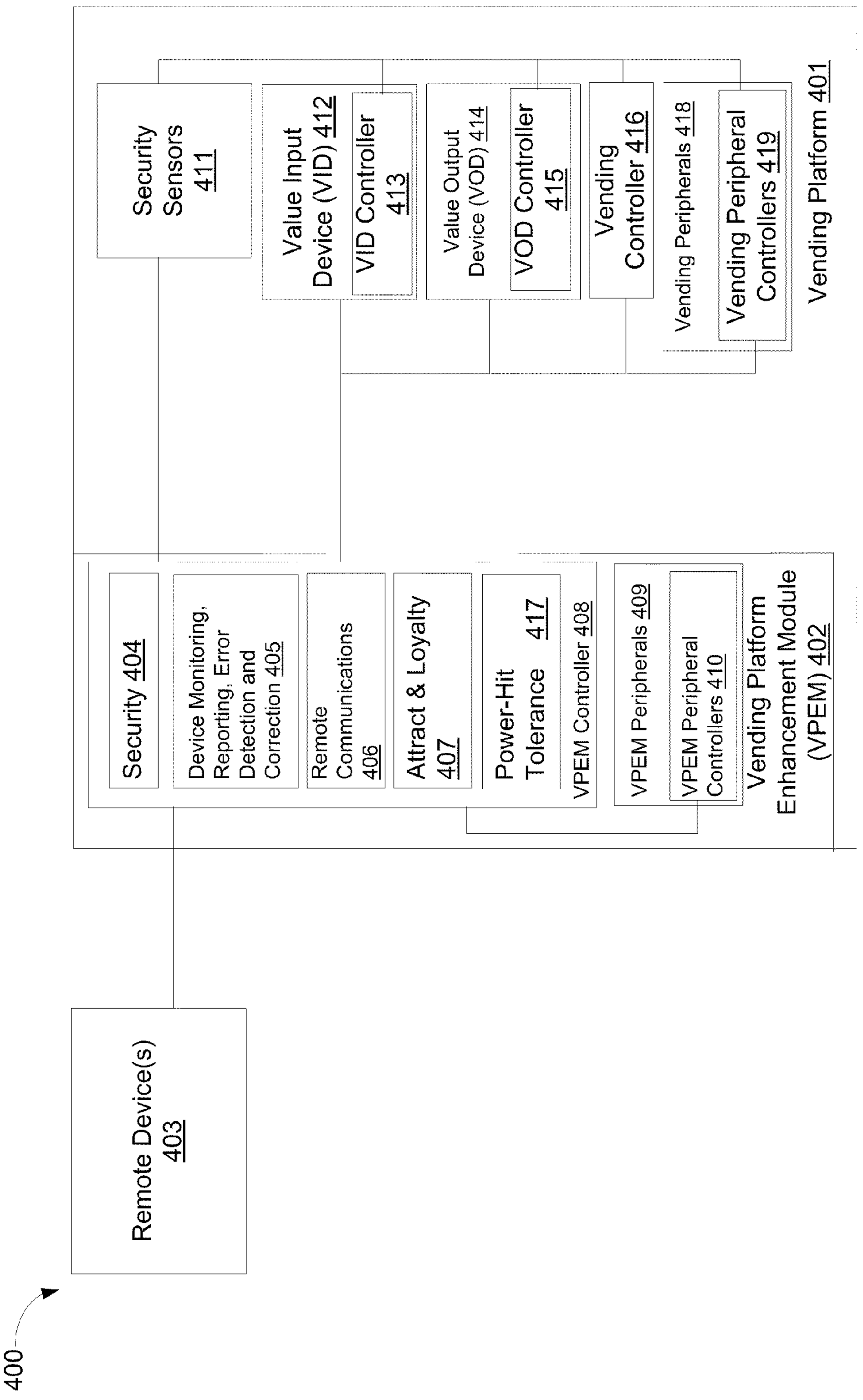
FIG. 23 is a block diagram of a vending system in accordance with the described embodiments.
Figure 24B:
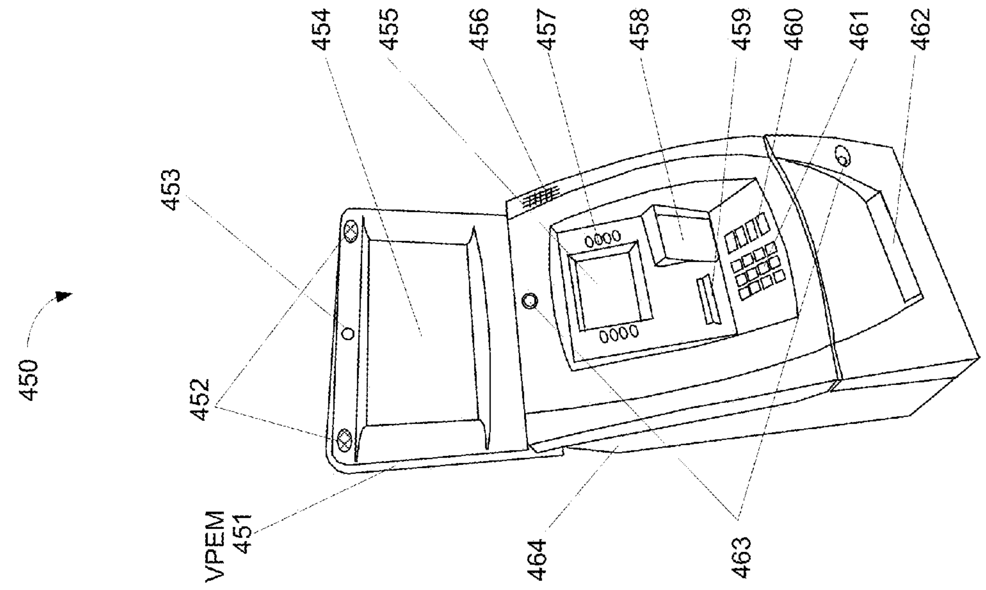
FIGS. 24A and 24B are perspective drawings of a vending platform and an ATM including a vending platform enhancement module (VPEM) in accordance with the described embodiments.
Figure 24A:
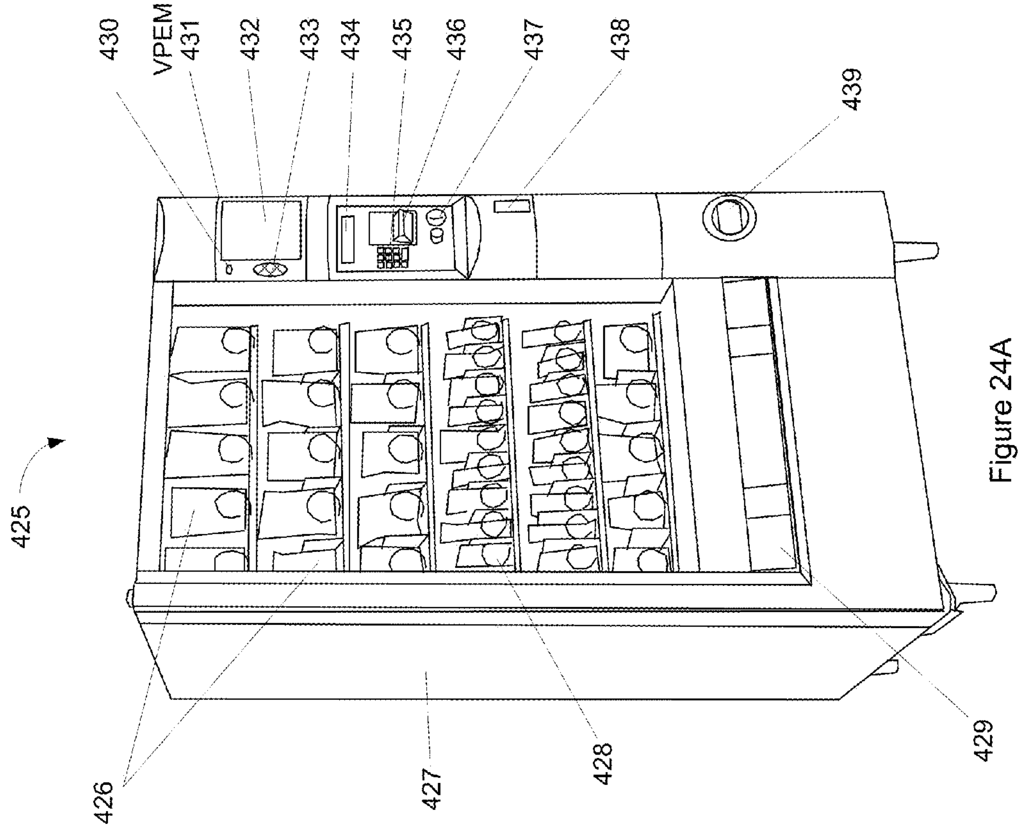

Next, non-gaming machine embodiments are described with respect to FIGS. 23, 24A and 24B. Non-gaming machine embodiments refer to devices that are not configured to control wager-based or lottery type games. One class of non-gaming machine embodiments is vending machines. Vending machines, like gaming machines, can include value input devices (VID)s and value output devices (VOD)s and a controller for controlling operation of the VIDs and VODs. Drink machines, food, merchandise, arcade machines, washing/drying machines and gas pumps are a few examples of vending machines in which embodiments of the devices described herein can be utilized. For this class of devices, value can be output as product, such as food, merchandise or gasoline, or a service, such as access to play of the arcade machine, a wash cycle or access to a movie rental. A few examples of VODs include pumps (e.g., for gas pumps) or merchandise dispensers (e.g., for vending machines.)

Another class of devices is cash machines, such as ATMs, ticket kiosks and change machines. These devices can also include VIDs and VODs. Often, these devices can be configured to receive and dispense cash. A ticket dispenser can be configured to receive tickets and redeem them for cash. A change machine can be configured to receive one unit of currency and exchange it for some other units of currency. Some devices, such as token dispensers can receive cash and dispense tokens.

Yet another class of devices is transportation kiosks. Transportation kiosks can be configured to print tickets or add value to instruments that are used to gain access to transportation. The transportation kiosks include VIDs that allow value, such as cash, to be exchanged for another item of value, such as a ticket that allows access to a transportation source. Often these devices can include printers for dispensing tickets.

A further class of devices that can incorporate the wireless communication devices described herein may not include value input or value output devices. For instance, exercise machines can be configured to utilize the wireless communication and networking capabilities described above. The networking capabilities may allow audio and video content to be delivered to the exercise machines. Further, the networking capabilities may allow exercise machines to be linked together for the purposes of group participation games. In addition, personal use data generated while a user is exercising can be uploaded to a remote server. Further, the status of components on the exercise can be monitored for maintenance purposes. Other classes of devices that can incorporate the wireless communications described herein are medical devices or other types of devices, such as device in an industrial setting where a high-level of reliability and performance is desired. For instance, it may be desirable to monitor the performance of health monitoring devices in a hospital, such devices that monitor a person's vital signs.

FIG. 23 is a block diagram of a vending system 400. The vending system 401 can include a vending platform and a remote device 403. A vending controller 416 can be configured to control at least one value input device, such as value input device (VID) 412, at least one value output device, such as value output device (VOD) 414 and vending peripherals 418. The vending controller 416 can control these devices via communications with associated controllers, such as VID controller 413, VOD controller 415 and vending peripheral controllers 419.

Examples of VIDs, VODs and vending peripherals vary depending on the type of vending platform and class of device as described above. Two examples of device configurations are described as follows with respect to FIGS. 24*a* and 24*b*. A few examples of VIDs can include but are not limited to coin acceptors, bill acceptors, card readers, envelope acceptors and a wireless interface to receive transaction information from a wireless device, such as a cell phone. A few examples of VODs can include but are not limited to drink dispensers, such as a can dispenser, a product dispenser, such as coiled rings in a vending machine, a pump, such as a gasoline pump, cash dispensers, coin dispensers, printers and card writers. A few examples of peripherals devices can include but are not limited to key pads, displays, input buttons, audio devices, refrigerators and lighting elements.

A vending platform enhancement module (VPEM) 402 can be coupled to the vending platform. In one embodiment, the VPEM module 402 can be added as a retrofit device to an existing vending platform. Retrofitting of a gaming machine was described above. The VPEM 402 can include a VPEM controller 408 and VPEM peripherals 409. A VPEM peripheral controller 410 can be associated with each VPEM peripheral 409. A few examples of possible VPEM peripherals are a sound device, a display, a camera, a microphone, a motion detector and lighting elements. In general, the VPEM 402 can include one or more of the peripheral devices described above with respect to the candle devices and the gaming platform enhancement module (GPEM) (see FIG. 16A).

The VPEM controller 408 can be configured to perform functions, such as but not limited to security 404, device monitoring, reporting, error detection and correction 405, remote communications 406, attract and loyalty program functions and power-hit tolerance 417. To provide these functions, the VPEM controller 408 can be configured to communicate with one or more of security sensors 411, the VID controller 413, the VOD controller 415, the vending controller 416 and the vending peripheral controllers 419. Further, the VPEM controller 408 can be configured to communicate with one or more remote device 403 via a wireless communication interface.

The security function 404 can involve monitoring any security sensors on the vending platform 401, such as security sensor 411. Further, the VPEM 402 can include devices that can be utilized to provide security functions, such as a camera, a microphone and security sensors associated with the VPEM 402. The VPEM controller 408 can be configured to send security information including detected security events to a remote device, such as 403. For instance, the VPEM controller can be configured to send image data generated using a camera on the VPEM 402 or error events received from one of the devices on the vending platform 401, such as a bill validator, which may indicate a security event has occurred.

The device monitoring, reporting, error detection and error detection 405 functions can be similar to the functions described with respect to FIGS. 16A and 16B. However, the functions can vary depending on the platform configuration. For instance, if a vending platform includes a refrigerator, then sensors can be associated with monitoring the performance of the refrigerator, such as a temperature and a condition of a motor. If a device, such as an ATM, includes an envelope acceptor for deposits, then the envelope acceptor can have sensors that allow operational status to be determined.

In one embodiment, a vending machine can be configured to dispense a number of merchandise items, such as food items. The VPEM 402 can be configured to monitor the dispensing devices, such that a real-time inventory can be determined for the device. In one embodiment, the real-time inventory can be determined by a remote device, such as 403, based upon information received from the VPEM 402. For example, based upon what is loaded into the machine and what is dispensed from the machine, a real-time inventory of the items currently in the machine can be determined. In addition, the shelf life of particular items can be tracked. This information can be used to generate stocking orders for the vending platform that can be carried out by a technician. The stocking orders can include items to load into the machine and items to remove from the machine. In one embodiment, the VPEM 402 or a remote device can be configured to automatically order needed items.

As described above with respect to FIGS. 16A and 16B, the VPEM 402 can also be configured to monitor the VIDs and VODs to determine how much cash has been accepted and dispensed at the vending platform 401. For a vending platform that dispenses merchandise, the information related to what merchandise has been dispensed and their associated costs combined with the cash accepted and dispensed from the vending platform can be used to determine in real-time how much revenue the vending platform is generating.

The remote communications 406 can involve sending information generated by the VPEM 402 and/or received from the other devices, such as VID 412, VOD 415, vending controller 416 and the vending peripherals 418 to a remote device. If the VPEM 402 includes a content output device, such as speaker, a display or a wireless interface that allows the VPEM 402 to communicate with a hand-held device, such as a smart phone, then an attract and/or loyalty function 407 can be implemented. The attract function can involve outputting content intended to draw a user to the platform 401.

The loyalty function 407 can be associated with maintaining a customer base by rewarding repeat customers. In one embodiment, a user's cell phone could include an application that allows a purchase that they have made to be identified and associated with an individual. For instance, the VPEM 402 can be configured to send purchase information to the application on the user's cell phone. Then, the application could be configured to send the purchase information to a remote device. Based upon the purchase information, rewards can be provided to the user associated with the application.

In another embodiment, the user's cell phone can be configured to send identification information to the VPEM 402. For instance, the cell phone can be configured to transmit credit information to the VPEM 401 that allows an item or service to be purchased. The credit information may be used to identify the user. As another example, the cell phone can include an application that allows identification information to be transmitted to the VPEM 402. This information can be collected by the VPEM 402 and associated with a transaction. The identification information and the transaction information can be sent to a remote device and associated with a user's account as part of a loyalty program.

The power-hit tolerance 417 can allow for security monitoring and communications when power is lost to the vending platform. For instance, if the vending platform was unplugged, then the VPEM 402 may be able to send this information to a remote device using a back-up power source. Further, the VPEM 402 can be configured to monitor security sensors, such as 411, on the vending platform 401 when power is cut-off to the vending platform. Again, information received from the security sensors and information indicating power has been lost can be sent to a remote device, such as 403.

Next, a few examples of devices that can include a VPEM, such as 402, are described. In particular, with respect to FIGS. 24A and 24B, a vending machine including a VPEM and an ATM including a VPEM are described. FIG. 24A is a perspective drawing of a vending machine 425. The vending machine includes a cabinet 427 with a door.

The door includes a glass panel that allows merchandise 426 stocked within the machine 425 to be viewed. The merchandise 426 can be dispensed via dispensing mechanism 428. Dispensing mechanisms can be provided for each row of merchandise which can be individually controlled. The dispensing mechanism can be monitored by the VPEM 431 for inventory monitoring purposes. A slot 429 can be provided in the door that allow dispensed merchandise to be retrieved. The door can include a lock 438 that allows the interior of the machine including a merchandise area and cash storage area to be accessed. A security sensor can be associated with the lock.

The vending machine 425 can include a bill acceptor 435 for accepting currency and a coin acceptor 437 for accepting coins. The received bills or coins can be used to purchase items. The vending machine 425 can be configured to dispense change using a coin dispenser. The change can be dispensed to slot 439. A key pad 435 can be used to select merchandise to purchase. A display 434 can be provided to indicate what item has been selected for purchase.

A VPEM 431 can be integrated into the vending machine 425. The VPEM 431 can include a display 432, a camera and an audio device 433. These devices can be used to implement attract and loyalty functions associated. In one embodiment, the display can be used to output advertising.

FIG. 24B is a perspective drawing of an ATM 450. The ATM includes a cabinet 464 where access to the interior of the cabinet is provided by locks 463. The locks can be monitored by security sensors that are coupled to the VPEM 451. A display 455 is mounted to the front of the cabinet. Input buttons are located on the side of the 457. The input buttons can be used to make selections based upon information output to the display 455.

A card reader 458 and envelope acceptor 459 are located below the display 455. A key pad 461 can be used to enter numbers used to verify the use of a card read by card reader 458. Additional input buttons 460 that allow the number to be entered or a transaction to be cancelled can be provided next to the key pad 461. A cash dispenser is located below the key pad 461. The cash dispenser is configured to dispense cash via slot 462.

A VPEM 451 is mounted on top of the ATM. In one embodiment, the VPEM 451 can be added as a retrofit to an existing ATM. The VPEM 451 includes a display 454, speakers 452 and a camera 453. In one embodiment, the display 454 can include a touch sensor mounted over the display. An antenna can form a portion of the outer surface of the VPEM 451 or the antenna can be mounted internally within the VPEM 451. The VPEM 451 can be configured to monitor one or more devices on the ATM such as the card reader 458 or the cash dispenser. As previously described, it can be configured to communicate with an ATM controller and a remote device via a wireless communication interface.

In one embodiment, a VPEM 451 with this form factor can be utilized on a gaming machine where the display 454 can be used to display lighting patterns associated with a candle. The display 454 may even be configured to display an image of a candle in different lighting configurations. In other embodiments, a cylindrically shaped component with lighting elements, such as the cylindrical portion of a candle, can be mounted on top of the VPEM 451 above the display 454. Then, the display and candle combination can be mounted on top of a gaming machine.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A retrofit candle device comprising:

a housing including a translucent portion and an opaque portion;

an attachment interface for mounting the retrofit candle device to an exterior surface of a gaming machine cabinet, said attachment interface compatible with an attachment interface of a legacy candle device that is being replaced;

a plurality of peripheral devices including a plurality of lighting elements wherein the lighting elements are disposed within the translucent portion of the housing and wherein light from the plurality of lighting elements is visible through the translucent portion when said plurality of lighting elements are activated;

a first legacy communication interface for coupling the retrofit candle device to a first wired communication connection within the gaming machine cabinet, the first wired communication connection for sending legacy candle control commands from a game controller within the gaming machine cabinet to the legacy candle device;

a second legacy communication interface for coupling the retrofit candle device to a second wired communication connection within the gaming machine cabinet, said second wired communication connection configured to transmit communications from the game controller to a first remote device via a first legacy network wherein the communications to the first remote device are routed through the retrofit candle device via the second legacy communication interface;

a wiring harness wherein a portion of the wiring harness, including the first legacy communication interface and the second legacy communication interface, extends from a bottom of the housing;

a first wireless communication interface for wirelessly communicating with a remote server wherein the communications to the first remote device are sent wirelessly to the remote server bypassing a portion of the first legacy network;

a candle controller, including a processor and a memory, coupled to the wiring harness, configured to: 1) receive legacy candle control commands from the game controller and in response control the plurality of lighting elements in accordance with the legacy candle control commands and 2) receive the communications from the game controller to the first remote device via the second legacy communication interface, encrypt the communications and send the encrypted communications via the first wireless communication interface to the remote server and 3) control the plurality of peripheral devices; and a secure portion of the housing including one or more anti-tampering mechanism, said candle controller disposed within the secure portion of the housing.

2. The retrofit candle device of claim 1, further comprising: one or more antennas for sending and receiving wireless communications via the first wireless communication interface.

3. The retrofit candle device of claim 2, wherein at least one antenna is located on an outer surface of the retrofit candle device.

4. The retrofit candle device of claim 1, further comprising: a legacy power interface for receiving power via a legacy power connection within the gaming machine cabinet for the legacy candle device.

5. The retrofit candle device of claim 4, further comprising: power conversion circuitry for converting power received via the legacy power connection to a power format different than received via the legacy power connection.

6. The retrofit candle device of claim 1, further comprising: a power interface for providing power to a peripheral device separate from the retrofit candle device.

7. The retrofit candle device of claim 1, further comprising a third legacy communication interface for coupling the retrofit candle device to a third wired communication connection within the gaming machine cabinet, said third wired communication connection configured to transmit communications from the game controller to a second remote device via a second legacy network wherein the communications to the second remote device are routed through the retrofit candle device via the third legacy communication interface.

8. The retrofit candle device of claim 7, wherein the candle controller is further configured to receive the communications from the game controller to the second remote device via the third legacy communication interface, encrypt the communications and send the encrypted communications via the first wireless communication interface to the remote server to bypass a portion of the second legacy network.

9. The retrofit candle device of claim 8, wherein the candle controller is further configured to multiplex the communications received from the second legacy communication interface and the third legacy communication interface and send the multiplexed communications wirelessly via the first wireless communication interface to the remote server.

10. The retrofit candle device of claim 1, further comprising: a second wireless communication interface for communicating wirelessly with a portable device proximate to the retrofit candle device.

11. The retrofit candle device of claim 1, further comprising: a back-up power source wherein the retrofit candle device in response to a power interruption to the gaming machine is configured to transmit communications via the first wireless communication interface using the back-up power source.

12. The retrofit candle device of claim 1, further comprising: a second communication interface for communicating with a bill acceptor coupled to the gaming machine cabinet.

13. The retrofit candle device of claim 12, wherein the candle controller is further configured to receive status information from the bill acceptor including information regarding accepted instruments and rejected instruments and to send the status information to the remote server via the first wireless interface.

14. The retrofit candle device of claim 12, wherein the candle controller is further configured to receive image data from the bill acceptor associated with accepted and rejected instruments and send the image data to the remote server via the first wireless interface.

15. The retrofit candle device of claim 1, wherein the candle controller is further configured to initialize the retrofit candle device with different numbers of stages.

16. The retrofit candle device of claim 1, wherein the candle controller is further configured to emulate a plurality of different legacy candle devices.

17. The retrofit candle device of claim 1, where the candle controller is further configured to control an output of video data to one or more of 1) a game display on which a wager-based game is displayed on the gaming machine or 2) a secondary display on the gaming machine.

18. The retrofit candle device of claim 1, wherein the plurality of peripheral devices further includes one or more cameras coupled to the candle controller and disposed within the housing.

19. The retofit candle device of claim 18, wherein the candle controller is further configured to send video data or still images captured from the one or more cameras to a remote device.

20. The retrofit candle device of claim 1, wherein the candle controller is further configured to communicate with a printer on the gaming machine and send a command to the printer on the gaming machine to print a ticket.

21. The retrofit candle device of claim 1, wherein the candle controller is further configured to receive operational data from 1) a value input device or 2) a value output device located on the gaming machine and send the operational data to a remote device.

22. The retrofit candle device of claim 21, wherein the operational data includes information regarding successful and unsuccessful value transactions generated using the value input device or the value output device.

23. The retrofit candle device of claim 21, wherein the candle controller is further configured to send a command instructing the value input device or the value output device on the gaming machine to perform a power reset.

24. The retrofit candle device of claim 21, wherein the candle controller is further configured to receive firmware, software or data for the value input device or the value output device from a remote device and send the firmware, the software or the data to the value input device or the value output device.

25. The retrofit candle device of claim 1, wherein the plurality of peripheral devices further includes a speaker.

26. A gaming machine comprising:

a gaming machine cabinet;

a game controller, mounted within the gaming machine cabinet, configured to 1) control a wager-based game on the gaming machine; 2) control a legacy candle device, 3) send communications to a first remote device via a first legacy network;

a retrofit candle device comprising:

a housing including a translucent portion and an opaque portion;

an attachment interface for mounting the retrofit candle device to an exterior suface of the gaming machine cabinet, said attachment interface compatible with an attachment interface of the legacy candle device that is being replaced;

a plurality of peripheral devices including a plurality of lighting elements wherein the lighting elements are disposed within the translucent portion of the housing wherein light from the plurality of lighting elements is visible through the translucent portion when said plurality of lighting elements are activated;

a first legacy communication interface for coupling the retrofit candle device to a first wired communication connection within the gaming machine cabinet, the first wired communication connection for sending legacy candle control commands from the game controller to the legacy candle device;

a second legacy communication interface for coupling the retrofit candle device to a second wired communication connection within the gaming machine cabinet, said second wired communication connection configured to transmit communications from the game controller to the first remote device via the first legacy network wherein the communications to the first remote device are routed through the retrofit candle device via the second legacy communication interface;

a wiring harness wherein a portion of the wiring harness, including the first legacy communication interface and the second legacy communication interface, extends from a bottom of the housing and into the gaming machine cabinet;

a first wireless communication interface for wirelessly communicating with a remote server wherein the communications to the remote device are sent wirelessly to the remote server bypassing a portion of the first legacy network;

a candle controller, including a processor and a memory, coupled to the wiring harness, configured to: 1) receive legacy candle control commands from the game controller and in response control the plurality of lighting elements in accordance with the legacy candle control commands and 2) receive the communications from the game controller to the first remote device via the second legacy communication interface, encrypt the communications and send the encrypted communications via the first wireless communication interface to the remote server and 3) control the plurality of peripheral devices; and a secure portion of the housing including one or more anti-tampering mechanism, said candle controller disposed within the secure portion of the housing; and a secure portion of the housing including one or more anti-tampering mechanism, said candle controller disposed within the secure portion of the housing.

27. The gaming machine of claim 26, wherein the retrofit candle device further comprises a third legacy communication interface for coupling the retrofit candle device to a third wired communication connection within the gaming machine cabinet, said third wired communication connection configured to transmit communications from the game controller to a second remote device via a second legacy network wherein the communications to the second remote device are routed through the retrofit candle device via the third legacy communication interface.

28. The gaming machine of claim 27, wherein the candle controller is further configured to multiplex the communications received from the second legacy communication interface and the third legacy communication interface and send the multiplexed communications wirelessly via the first wireless communication interface to the remote server.

29. A method of enhancing functions on a gaming machine including a legacy candle device, the method comprising:

removing the legacy candle device mounted to a gaming cabinet of the gaming machine;

attaching a retrofit candle device to an exterior surface of the gaming machine using a mounting interface compatible with a mounting interface used by the removed legacy candle device wherein the retrofit candle includes a housing including a translucent portion and an opaque portion wherein a plurality of lighting elements are disposed within the translucent portion of the housing such that light from the plurality of lighting elements is visible through the translucent portion when said plurality of lighting elements are activated in response to commands received from a candle controller wherein the candle controller is disposed within a secure portion of the housing including one or more anti-tampering mechanisms;

attaching within the gaming machine cabinet a first portion of a wiring harness of the retrofit candle device to a first communication interface associated with the legacy candle device wherein the candle controller is configured to receive control commands from a game controller via the first communication interface addressed to the legacy candle device wherein the control commands specify a lighting state to be implemented on the legacy candle device;

establishing within the gaming machine cabinet a new communication pathway using a second portion of the wiring harness of the retrofit candle device wherein the new communication pathway is formed between the second portion of the wiring harness and a peripheral device that communicates with the game controller;

receiving in the candle controller a communication from the peripheral device or a communication from the game controller addressed to a remote server via the new communication pathway; and sending under control of the candle controller via a wireless interface in the retrofit candle device a wireless communication to a remote device, said wireless communication including status information from the peripheral device or the communication from the game controller addressed to the remote server.

30. The method of claim 29, wherein the remote server is one of a link progressive server, a player tracking server, a wide-area progressive server or a ticket-in/ticket-out server.

31. The method of claim 29, further comprising in the retrofit candle device receiving a legacy candle command from the game controller for the legacy candle device and in response generating a lighting condition on the retrofit candle device consistent with the legacy candle command.

32. The method of claim 31, further comprising: in the retrofit candle device generating a response to the legacy command consistent with the legacy candle device and sending the response to the game controller.

33. The method of claim 29, wherein the retrofit candle device is configurable to emulate a plurality of different types of legacy candle devices.

34. The method of claim 29, further comprising: wherein the retrofit candle device is configured to receive a configuration command from the remote device via the wireless interface.

* * * * *

UNITED STATES PATENT AND TRADEMARK OFFICE

CERTIFICATE OF CORRECTION

PATENT NO. : 8,083,592 B2
APPLICATION NO. : 12/943792
DATED : December 27, 2011
INVENTOR(S) : William R. Wells It is certified that error appears in the above-identified patent and that said Letters Patent is hereby corrected as shown below:

IN THE CLAIMS:
Column 63, line 50, claim 26, Change “suface” to --surface--

Signed and Sealed this
Nineteenth Day of June, 2012

David J. Kappos
*Director of the United States Patent and Trademark Office*